United States Patent
Kubota et al.

(10) Patent No.: US 8,958,162 B2
(45) Date of Patent: Feb. 17, 2015

(54) ZOOM LENS SYSTEM AND IMAGE PICKUP APPARATUS USING THE SAME

(71) Applicant: Olympus Imaging Corp., Tokyo (JP)

(72) Inventors: Yuki Kubota, Tokyo (JP); Masato Miyata, Tokyo (JP); Nobumasa Kanbayashi, Nagano (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/660,342

(22) Filed: Oct. 25, 2012

(65) Prior Publication Data
US 2013/0050567 A1    Feb. 28, 2013

Related U.S. Application Data

(63) Continuation of application No. 12/661,173, filed on Mar. 11, 2010, now Pat. No. 8,325,423.

(30) Foreign Application Priority Data

Mar. 17, 2009    (JP) .................................. 2009-063961

(51) Int. Cl.
| | | |
|---|---|---|
| *G02B 15/14* | (2006.01) | |
| *G02B 13/18* | (2006.01) | |
| *G02B 3/02* | (2006.01) | |
| *G02B 15/173* | (2006.01) | |

(52) U.S. Cl.
CPC .................................. G02B 15/173 (2013.01)
USPC .......................................... 359/687; 359/715

(58) Field of Classification Search
USPC .................................................. 359/687, 715
See application file for complete search history.

(56) References Cited

U.S. PATENT DOCUMENTS

| | | |
|---|---|---|
| 6,580,565 B2 | 6/2003 | Ozaki |
| 6,646,814 B2 | 11/2003 | Uzawa et al. |
| 6,867,925 B1 | 3/2005 | Sato |
| 6,975,461 B2 | 12/2005 | Eguchi |
| 2002/0118467 A1 | 8/2002 | Ozaki |
| 2003/0197950 A1 | 10/2003 | Eguchi |
| 2007/0242368 A1 | 10/2007 | Itoh |
| 2008/0111909 A1* | 5/2008 | Miyajima ..................... 359/695 |

FOREIGN PATENT DOCUMENTS

| | | |
|---|---|---|
| JP | 2000-347102 | 12/2000 |
| JP | 2001-242379 | 9/2001 |
| JP | 2002-072087 | 3/2002 |
| JP | 2002-196241 | 7/2002 |
| JP | 2003-207715 | 7/2003 |
| JP | 2003-315676 | 11/2003 |
| JP | 2004-061676 | 2/2004 |
| JP | 2004-252204 | 9/2004 |
| JP | 2006-259215 | 9/2006 |
| JP | 2007-271711 | 10/2007 |
| JP | 2007-316146 | 12/2007 |
| JP | 2008-233485 | 10/2008 |

* cited by examiner

*Primary Examiner* — Alicia M Harrington
(74) *Attorney, Agent, or Firm* — Kenyon & Kenyon LLP

(57) ABSTRACT

A zoom lens system includes in order from an object side to an image side a first lens unit having a positive refracting power; a second lens unit having a negative refracting power; a third lens unit having a positive refracting power; and a fourth lens unit having a positive refracting power. At the time of zooming from a wide angle end to a telephoto end, each of distances between the first lens unit and the second lens unit, between the second lens unit and the third lens unit, and between the third lens unit and the fourth lens unit is changed, and the first lens unit is moved. The first lens unit includes a lens component having positive refracting power, a total number of lens components included in the first lens unit is one, and the third lens unit includes five lens elements.

16 Claims, 27 Drawing Sheets

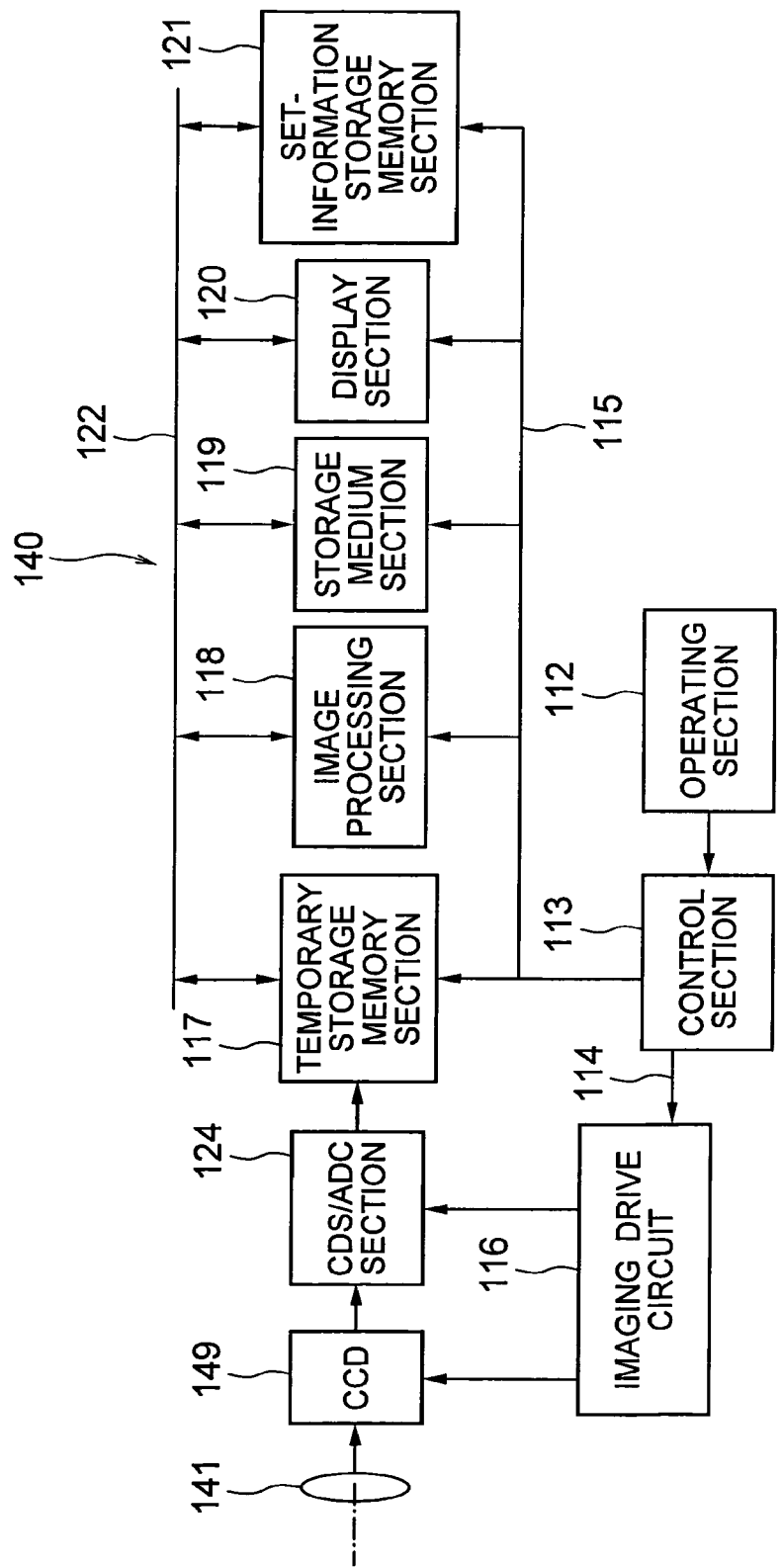

ZOOM LENS SYSTEM AND IMAGE PICKUP APPARATUS USING THE SAME

CROSS-REFERENCE TO RELATED APPLICATION

The present application is a continuation of U.S. patent application Ser. No. 12/661,173 filed on Mar. 11, 2010, which is based upon and claims the benefit of priority from the prior Japanese Patent Application No. 2009-063961 filed on Mar. 17, 2009. The entire contents of U.S. patent application Ser. No. 12/661,173 are incorporated herein by reference.

BACKGROUND OF THE INVENTION

1. Field of the Invention

The present invention relates to a zoom lens system. Moreover, the present invention relates to an image pickup apparatus including a video camera and a digital camera.

2. Description of the Related Art

In recent years, replacing a camera in which, a film is used, a digital camera in which, an object is photographed by using an image pickup element such as a CCD (Charge Coupled Device) and a CMOS (Complementary Metal Oxide Semiconductor) sensor has become mainstream.

Furthermore, there are several categories of digital cameras in a wide range from a high-function type for professional use to a compact popular type.

From among these categories, a user of a digital camera of the popular type seeks to enjoy photography by capturing readily various scenes at any time and anywhere. Therefore, a digital camera having a small size, and which can be carried conveniently is preferred.

For carrying out slimming and small-sizing, an image pickup element is to be made small. Here, in an image pickup element which is small-size, for letting the number of pixels to be same as the number of pixels of the image pickup element before small-sizing, it is necessary to make a pitch of pixels small. Therefore, in the image pickup element which is small-size, insufficiency of sensitivity has to be covered by an optical system. Consequently, an optical system having a bright F value is necessary.

Whereas, a zooming ratio of about three times and an angle of field at a wide angle end of about 63° of a zoom lens system which is used in a digital camera of a compact type, are common.

As such optical system, an optical system which includes in order from an object side, a first lens unit having a positive refracting power, a second lens unit having a negative refracting power, a third lens unit having a positive refracting power, and a fourth lens unit having a positive refracting power, and in which, distances between the lens units change at the time of zooming from a wide angle end to a telephoto end, has been known. An example of a conventional technology of such optical system is disclosed in Japanese Patent Application Laid-open Publication Nos. 2004-252204, 2003-315676, and 2001-242379.

A zoom lens system disclosed in Japanese Patent Application Laid-open Publication No. 2004-252204 is a zoom lens system in which, the F value is about 2.8 at the wide angle end, the zooming ratio is about three, and the angle of field at the wide angle end is about 63°.

A zoom lens system disclosed in Japanese Patent Application Laid-open Publication No. 2003-315676 is a zoom lens system in which, the zooming ratio of four and more has been secured, but the F value is about 2.8 at the wide angle end, and the angle of field at the wide angle end is about 63°.

A zoom lens system disclosed in Japanese Patent Application Laid-open Publication No. 2001-242279, is a comparatively bright zoom lens system having the F value of about 2.0 at the wide angle end, but is a zoom lens system having the zooming ratio of about three, and the angle of field at the wide angle end of about 63°.

SUMMARY OF THE INVENTION

To solve the abovementioned problems, and to achieve the object, a zoom lens system according to the present invention comprises in order from an object side to an image side a first lens unit having a positive refracting power,
a second lens unit having a negative refracting power,
a third lens unit having a positive refracting power, and
a fourth lens unit having a positive refracting power, and
at the time of zooming from a wide angle end to a telephoto end, distances between the lens units change, and the third lens unit comprises a first cemented lens component having a concave image-side surface on the image side, and a second cemented lens component having a concave object-side surface on the object side, which is disposed immediately after the image side of the first cemented lens component, and the first cemented lens component includes a positive lens, and a negative lens having a concave image-side surface which is disposed on the image side of the positive lens, and the second cemented lens component includes a negative lens having a concave object-side surface on the object side, and a positive lens which is disposed on the image side of the negative lens.

Moreover, an image pickup apparatus according to another aspect of the present invention comprises
the abovementioned zoom lens system, and
an image pickup element, which is disposed on an image side of the zoom lens system, and which converts an image formed by the zoom lens system, to an electric image.

BRIEF DESCRIPTION OF THE DRAWINGS

FIG. 1A shows a state at a wide angle end, FIG. 1B shows an intermediate focal length state, and FIG. 1C shows a state at a telephoto end;

FIG. 27 is a structural block diagram of an internal circuit of main components of a digital camera.

DETAILED DESCRIPTION OF THE PREFERRED EMBODIMENTS

Figure 1A:
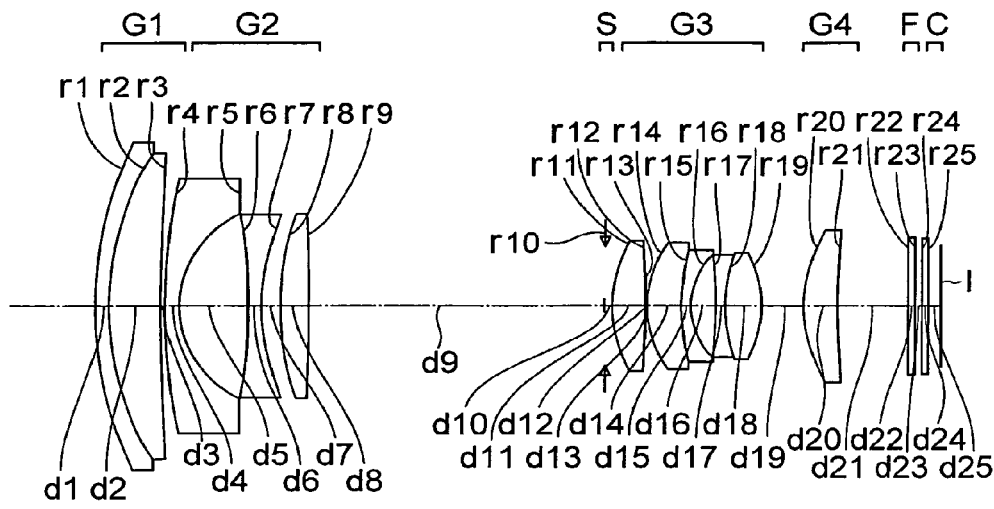
FIG. 1A, FIG. 1B, and FIG. 1C are lens cross-sectional views at a time of infinite object point focusing of a first embodiment of a zoom lens system of the present invention, where.

A zoom lens system according to a first aspect of the present invention includes in order from an object side to an image side a first lens unit having a positive refracting power, a second lens unit having a negative refracting power, a third lens unit having a positive refracting power, and a fourth lens unit having a positive refracting power, and at the time of zooming from a wide angle end to a telephoto end, distances between the lens units change, and the third lens unit includes a first cemented lens component ($L_{32}$) having a concave image-side surface on the image side, and a second cemented lens component ($L_{33}$) having a concave object-side surface on the object side, which is disposed immediately after the image side of the first cemented lens component, and the first cemented lens component ($L_{32}$) includes a positive lens ($L_{32p}$), and a negative lens ($L_{32n}$) having a concave image-side surface which is disposed on the image side of the positive lens, and the second cemented lens component ($L_{33}$) includes a negative lens ($L_{33n}$) having a concave object-side surface on the object side, and a positive lens ($L_{33p}$) which is disposed on the image side of the negative lens.

A lens component means a lens body which is divided by a refracting surface in contact with air, and a cemented lens component means a lens body having a refracting surface of a cemented surface in the lens component.

Moreover, signs indicated in brackets are signs which are associated with the corresponding lens components and lenses in the embodiments. However, a technological range of the present invention is not restricted by the embodiments.

A reason for and an effect of adopting such arrangement will be described below.

In the present invention, for making it easy to secure a sufficient zooming ratio, an arrangement which includes in order from the object side, a first lens unit having a positive refracting power, a second lens unit having a negative refracting power, a third lens unit having a positive refracting power, and a fourth lens unit having a positive refracting power, and in which, zooming is carried out from the wide angle end to the telephoto end by changing distances between the lens units is adopted.

By adopting such an arrangement, it is possible to secure a zooming function of the second lens unit and the third lens unit, and to prevent an amount of movement of each lens unit from becoming substantial while suppressing an a fluctuation in aberration at the time of zooming, thereby leading to a compactness of an optical system.

In this arrangement, in the third lens unit, an axial light beam becomes thick as compared to an axial light beam in the other lens units. Therefore, for achieving an optical system in which, the F value is brightened, it is effective to let an arrangement which enables to carry out a favorable aberration correction in the third lens unit.

Therefore, in the present invention, the third lens unit is let to have an arrangement having the first cemented lens component having the concave image-side surface on the image side, and the second cemented lens component having the concave object-side surface which is disposed immediately after the image side of the first cemented lens component. Moreover, the first cemented lens component includes the positive lens, and the negative lens having a concave image-side surface which is disposed on the image side of the positive lens, and the second cemented lens component includes the negative lens having a concave object-side surface on the object side, and the positive lens which is disposed on the image side of the negative lens.

By making such an arrangement, it is possible to make small a curvature of each lens surface or a refracting power of each lens in the third lens unit, and accordingly, it is possible to suppress an occurrence of aberration. Moreover, an arrangement is let to be such that a surface on the image side of the first cemented lens component and a surface on the object side of the second cemented lens component are facing concave surfaces, and the arrangement is let to be the above-mentioned lens arrangement. Accordingly, a spherical aberration, a chromatic aberration, and Petzval's sum from the wide angle end up to the telephoto end can be corrected favorably. Moreover, it is advantageous for securing brightness, an angle of field, and a zooming ratio.

Furthermore, in the zoom lens system of the present invention, it is preferable that the first cemented lens component has a meniscus shape convex to the object side, and the second cemented lens component has a meniscus shape convex to the image side.

By making such an arrangement, a symmetry of the first cemented lens component and the second cemented lens components is more favorable, and it is advantageous for shortening the overall length and for securing the zooming ratio by securing the positive refracting power of the third lens unit.

Moreover, in the abovementioned invention, it is preferable that the first cemented lens component and the second cemented lens component satisfy the following conditional expression (1).

$$-0.9 < SF_{3n} < -0.1 \quad (1)$$

where, $SF_{3n}$ is defined by $SF_{3n} = (32R_{1r} + 33R_{2f})/(32R_{1r} - 33R_{2f})$, where $32R_{1r}$ denotes a radius of curvature on the image side of the first cemented lens component in the third lens unit, and $33R_{2f}$ denotes a radius of curvature on the object side of the second cemented lens component in the third lens unit.

Conditional expression (1) is an expression which specifies a preferable shape factor of an air lens having a biconvex shape which is formed by the first cemented lens component and the second cemented lens component.

By making an arrangement such that a lower limit in conditional expression (1) is not surpassed, a negative refracting power of a surface on the object side of the second cemented lens component is secured. Accordingly, the negative refracting power can be divided (shared) favorably with the surface on the object side of the first cemented lens component. As a result, it is advantageous for reduction of a high-order aberration such as the spherical aberration when the brightness is secured.

By making an arrangement such that an upper limit in conditional expression (1) is not surpassed, the negative refracting power of the surface on the object side of the second cemented lens component is suppressed to be moderate. Accordingly, it becomes easy to impart a sufficient positive refracting power to the third lens unit, and it is advantageous for small sizing, making zooming ratio high, and making a focal length short.

Moreover, a zoom lens system according to a second aspect for solving the abovementioned problems includes in order from an object side to an image side, a first lens unit having a positive refracting power, a second lens unit having a negative refracting power, a third lens unit having a positive refracting power, and a fourth lens unit having a positive refracting power, and at the time of zooming from a wide angle end to a telephoto end, distances between the lens units change, and the third lens unit includes a first cemented lens component ($L_{32}$), and a second cemented lens component ($L_{33}$) which is disposed on the image side of the first cemented lens component ($L_{32}$), and the first cemented lens component ($L_{32}$) includes a positive lens ($L_{32p}$), and a negative lens ($L_{32n}$) which is disposed on the image side of the positive lens ($L_{32p}$), and the second cemented lens component ($L_{33}$) includes a negative lens ($L_{33n}$), and a positive lens ($L_{33p}$) which is disposed on the image side of the negative lens ($L_{33n}$), and the first cemented lens component ($L_{32}$) and the second cemented lens component ($L_{33}$) satisfy the following conditional expression (2).

$$50 < vd_3 < 120 \quad (2)$$

where, $vd_3$ is defined by $vd_3 = (vdL_{32p} + vdL_{33p}) - (vdL_{32n} + vdL_{33n})$ where, $vdL_{32p}$ denotes Abbe constant for d-line of the positive lens of the first cemented lens component in the third lens unit, $vdL_{33p}$ denotes Abbe constant for d-line of the positive lens of the second cemented lens component in the third lens unit, $vdL_{32n}$ denotes Abbe constant for d-line of the negative lens of the first cemented lens component in the third lend unit, and $vdL_{33n}$ denotes Abbe constant for d-line of the negative lens of the second cemented lens component in the third lens unit.

An effect which is same as in the zoom lens system according to the abovementioned first aspect will be omitted.

Conditional expression (2) is an expression which specifies a glass material which is preferable for a correction of the chromatic aberration, and particularly, for a correction of a longitudinal chromatic aberration which becomes conspicuous when the brightness is secured.

For correction favorably within the third lens unit, the chromatic aberration which occurs due to a substantial positive refracting power in the third lens unit, it is effective to use a glass material having a comparatively small chromatic dispersibility in an appropriate range for the positive lens in the second cemented lens component, and to use a glass material having a comparatively substantial chromatic dispersibility in an appropriate range for the negative lens in the second cemented lens component.

Concretely, it is effective to let a difference between the Abbe's number for the positive lens and the Abbe's number for the negative lens to be conditional expression (2).

By making an arrangement such that a lower limit in conditional expression (2) is not surpassed, it is advantageous for correction of the chromatic aberration, for securing a sufficient optical performance, and for designing a zoom lens system having an improved performance.

Even in the zoom lens system according to the abovementioned first aspect, it is preferable that the first cemented lens component and the second cemented lens component satisfy the abovementioned conditional expression (2).

In one of the abovementioned zoom lens systems, it is preferable that one of the following arrangements is satisfied simultaneously.

It is preferable that the first cemented lens component and the second cemented lens component are disposed side-by-side living a space between the first cemented lens component and the second cemented lens component, and satisfy the following conditional expression (3).

$$0.08 < D_3/f_3 < 0.20 \quad (3)$$

where, $D_3$ denotes a distance on an optical axis between the first cemented lens component and the second cemented lens component in the third lens unit, and $f_3$ denotes a focal length of the third lens unit.

Conditional expression (3) is an expression which specifies a preferable air distance between the surface on the image side of the first cemented lens component and the surface on the object side of the second cemented lens component.

By making an arrangement such that a lower limit in conditional expression (3) is not surpassed, an axial distance between the first cemented lens component and the second cemented lens component is secured. Accordingly, it is advantageous for reduction of various aberrations in the third lens unit, and it becomes easy to achieve a favorable image forming performance.

By making an arrangement such that an upper limit in conditional expression (3) is not surpassed, an axial thickness of the third lens unit can be suppressed easily, which is advantageous for small sizing.

Moreover, it is preferable that the second cemented lens component is disposed nearest to the image side, in the third lens unit, and the positive lens in the second cemented lens component has an aspheric image-side surface which is convex on the image side.

By letting a surface of emergence nearest to the image side of the third lens unit to be an aspheric surface, a correction of coma aberration which occurs off-axis becomes easy, and it is easy to achieve a favorable image forming performance.

Moreover, by letting the aspheric surface to have a convex shape, it is possible to reduce an effect on the image forming performance due to a manufacturing error.

Moreover, it is preferable that the lens unit includes in order from the object side, a positive single lens ($L_{31}$) having a positive refracting power, the first cemented lens component ($L_{32}$), and the second cemented lens component ($L_{33}$), and the positive single lens ($L_{31}$) includes at least one aspheric surface.

By disposing a single lens having a positive refracting power nearest to the object side of the third lens unit, it is possible to make further smaller the refracting power of each lens or a curvature of each lens surface in the third lens unit. Accordingly, it is possible to suppress an occurrence of aberration. Moreover, by letting the single lens having a positive refracting power to have at least one aspheric surface, it is possible to correct more effectively the spherical aberration which occurs in the third lens unit.

Moreover, it is preferable that the zoom lens system satisfies the following conditional expressions (4) and (5).

$$0.26 < UY_{1G}/f_w < 0.28 \quad (4)$$

$$0.25 < UY_{3G}/f_3 < 0.5 \quad (5)$$

where, $f_w$ denotes a focal length of the overall zoom lens system at the wide angle end, $UY_{1G}$ denotes a height from an optical axis of axial marginal light rays at a surface on the object side of the first lens unit, at the wide angle end, $UY_{3G}$ denotes a height from an optical axis of axial marginal rays at a surface on the object side of the third lens unit, at the wide angle end, and $f_3$ is a focal length of the third lens unit.

Conditional expression (4) is an expression related to a preferable F value at the wide angle end.

By making an arrangement such that a lower limit in conditional expression (4) is not surpassed, it is advantageous for reduction of a noise in an image and for photographing an image having a low focal depth.

By making an arrangement such that an upper limit in conditional expression (4) is not surpassed, it is advantageous for reducing the number of lenses for securing the image forming performance.

Conditional expression (5) is a preferable condition for making it easy to adjust appropriately an amount of aberration which occurs in the third lens unit.

By making an arrangement such that a lower limit in conditional expression (5) is not surpassed, it is easy to secure brightness which satisfies conditional expression (4).

By making an arrangement such that a higher limit in conditional expression (5) is not surpassed, it is possible to make small an effective diameter of the third lens unit, to carry out the aberration correction easily, and it is advantageous for securing the favorable image forming performance with conditional expression (4) already satisfied.

An arrangement may be made such that the following conditional expression (6) is satisfied instead of conditional expression (5), or, in addition to conditional expression (5).

$$0.60 < UY_{3G}/f_w < 1.00 \quad (6)$$

where, $f_w$ denotes the focal length of the overall zoom lens system at the wide angle end, and $UY_{3G}$ denotes the height from an optical axis of axial marginal rays at a surface on the object side of the third lens unit, at the wide angle end.

By making an arrangement such that a lower limit in conditional expression (6) is not surpassed, it is easy to secure the brightness which satisfies conditional expression (4).

By making an arrangement such that an upper limit in conditional expression (6) is not surpassed, it is possible to make small the effective diameter of the third lens unit, and it becomes easy to carry out the aberration correction, and it is advantageous for securing the favorable image forming performance with conditional expression (4) already satisfied.

When the zoom lens system includes a focusing mechanism, although the corresponding values of the conditional expression change, in this case, the corresponding values are let to be values in a state of being focused at the farthest distance. Moreover, when it is possible to adjust the brightness, values are let to be values in a brightest state. Similar is a case for the following conditional expressions.

For achieving an efficient and favorable optical performance while realizing compactness, it is preferable that the zoom lens system of the present invention satisfies one of the following arrangements apart from the above-mentioned arrangements.

From a point of view of balance of the optical performance and compactness, it is preferable that the following conditional expression (7) is satisfied for the refracting power of the first lens unit.

$$7.0 < f_1/f_w < 10 \quad (7)$$

where, $f_1$ denotes a focal length of the first lens unit, and $f_w$ denotes the focal length of the overall zoom lens system at the wide angle end.

By making an arrangement such that a lower limit in conditional expression (7) is not surpassed, it is possible to reduce an occurrence of aberration at the wide angle end by suppressing the refracting power of the first lens unit, which becomes advantageous for securing the favorable optical performance.

By making an arrangement such that an upper limit in conditional expression (7) is not surpassed, it is advantageous for compactness of the overall length of the zoom system by securing the refracting power of the first lens unit, and presumably for compactness of a lens barrel.

Regarding a refracting power of the second lens unit, it is preferable that the following conditional expressions (8) and (9) are satisfied.

$$1.6 < |f_2/f_w| < 2.1 \quad (8)$$

$$3.5 < (\beta_{2t}/\beta_{2w}) \times (\beta_{3t}/\beta_{3w}) \times (\beta_{4t}/\beta_{4w}) < 5.0 \quad (9)$$

where, $f_2$ denotes a focal length of the second lens unit, $f_w$ denotes the focal length of the overall zoom lens system at the wide angel end, $\beta_{2w}$ and $\beta_{2t}$ denote a lateral magnification of the second lens unit, at the wide angle end and the telephoto end respectively, $\beta_{3w}$ and $\beta_{3t}$ denote a lateral magnification of the third lens unit, at the wide angle end and the telephoto end respectively, and $\beta_{4w}$ and $\beta_{4t}$ denote a lateral magnification of the fourth lens unit, at the wide angle end and the telephoto end respectively.

Conditional expression (9) is an expression which specifies a preferable zooming ratio in a system from the first lens unit up to the fourth lens unit.

By making an arrangement such that a lower limit in conditional expression (9) is not surpassed, it is advantageous for securing the zooming ratio of the overall zoom lens system, and it is possible to adjust to an angle of field of photography corresponding to various photographic scenes.

By making an arrangement such that an upper limit in conditional expression (9) is not surpassed, it is easy to reduce an amount of movement of the lens units, and it is advantageous for making the size small while suppressing a fluctuation in aberration.

By making an arrangement such that a lower limit in conditional expression (8) is not surpassed, the negative refracting power is suppressed to be moderate, and it is advantageous for aberration correction.

By making an arrangement such that conditional expression (9) is satisfied and an upper limit in conditional expression (8) is not surpassed, it is possible to secure sufficiently the negative refracting power of the second lens unit, and it is advantageous for reduction of the amount of movement for the zooming, and presumably, for compactness of the lens barrel.

Regarding a refracting power of the third lens unit, it is preferable that the following conditional expression (10) is satisfied.

$$2.0 < f_3/f_w < 3.0 \quad (10)$$

where, $f_3$ denotes the focal length of the third lens unit, and $f_w$ denotes the focal length of the overall zoom lens system at the wide angle end.

By making an arrangement such that a lower limit in conditional expression (10) is not surpassed, the refracting power of the third lens unit is suppressed to be moderate, and it is advantageous for the aberration correction.

By making an arrangement such that an upper limit in conditional expression (10) is not surpassed, it is possible to secure a zooming effect in the third lens unit, and it is advantageous for shortening the overall length at the time of zooming to the telephoto end. Moreover, it becomes easy to suppress an amount of fluctuation in an exit-pupil position. Accordingly, it is easy to suppress an adverse effect on shading which is due to a fluctuation in an angle of incidence on an image pickup element such as a CCD at an off-axis image-plane position.

Regarding a refracting power of the fourth lens unit, it is preferable that the following conditional expression (11) is satisfied.

$$3.4 < f_4/f_w < 5.5 \quad (11)$$

where, $f_4$ denotes a focal length of the fourth lens unit, and $f_w$ denotes the focal length of the overall zoom lens system at the wide angle end.

By making an arrangement such that a lower limit in conditional expression (11) is not surpassed, and by making an arrangement such that an upper limit in conditional expression (11) is not surpassed, the refracting power of the fourth lens unit becomes appropriate, and it becomes easy to suppress an excessive correction and an insufficient correction of an astigmatism and a distortion in a total zoom range.

The fourth lens unit may be formed of a plastic material. A main function of the fourth lens unit is to make incidence light rays efficiently on an electronic image pickup element such as a CCD and a CMOS by disposing the exit-pupil position at an appropriate position. For such function, when a power is set within a range as in the abovementioned conditional expression (9), a comparatively substantial power is not necessary, and it is also possible to form the fourth lens unit by using a glass material having a low refractive index, such as a plastic lens.

When a plastic lens is used in the fourth lens unit, a cost is suppressed to be low, and it is possible to provide a zoom lens system at a low cost.

Regarding the overall length of the zoom length system for the focal length of the overall zoom lens system at the wide angle end, it is preferable that the following conditional expression (12) is satisfied.

$$9.0 < L_w/f_w < 10.2 \quad (12)$$

where, $L_w$ denotes a distance along an optical axis from a surface on the object side of the first lens unit up to an image plane at the wide angle end when a back focus is let to be an air conversion distance, and $f_w$ denotes the focal length of the overall zoom lens system at the wide angle end.

By making an arrangement such that a lower limit in conditional expression (12) is not surpassed, it is possible to secure a distance between the second lens unit and the third lens unit, and it is advantageous for securing a space for zooming.

By making an arrangement such that an upper limit in conditional expression (12) is not surpassed, the overall length of the zoom lens system at the wide angle end is suppressed, and it is advantageous for small sizing in a direction of thickness of the lens barrel. Moreover, it is possible to lower a height of light rays in the first lens unit, and it is advantageous for making a lens diameter small.

Moreover, it is preferable that the second lens unit includes in order from the object side, a negative meniscus lens component, a negative lens component, and a positive lens component.

By making such an arrangement, thereby by bringing positions of principal points of the second lens unit toward the image side, it is easy to secure space for zooming at the telephoto end. Moreover, it is possible to make high a lateral magnification in the second lens unit, which is advantageous for securing a zooming effect by the second lens unit.

At this time, regarding a proportion of the zooming effect of the second lens unit and the third lens unit, it is preferable that the following conditional expression (13) is satisfied.

$$0.5 < (\beta_{2t}/\beta_{2w})/(\beta_{3t}/\beta_{3w}) < 1.0 \qquad (13)$$

$$3.5 < (\beta_{2t}/\beta_{2w}) \times (\beta_{3t}/\beta_{3w}) \times (\beta_{4t}/\beta_{4w}) < 5.0 \qquad (9)$$

where, $\beta_{2w}$ and $\beta_{2t}$ denote a lateral magnification of the second lens unit, at the wide angle end and the telephoto end respectively, $\beta_{3w}$ and $\beta_{3t}$ denote a lateral magnification of the third lens unit, at the wide angle end and the telephoto end respectively, and $\beta_{4w}$ and $\beta_{4t}$ denote a lateral magnification of the fourth lens unit, at the wide angle end and the telephoto end respectively.

The description of conditional expression (9) will be omitted as it has already being described.

By making an arrangement such that a lower limit in conditional expression (13) is not surpassed, it is easy to suppress an amount of movement of the third lens unit, and it is advantageous for making a barrel size small. Moreover, it is easy to suppress the refracting power of the third lens unit, and it is advantageous for correction of aberration, particularly, a longitudinal aberration such as the spherical aberration at the telephoto end.

By making an arrangement such that conditional expression (9) is satisfied, and an upper limit in conditional expression (13) is not surpassed, it is possible to reduce a zooming load of the second lens unit, and it is easy to suppress an increase in the overall length, and an increase in a diameter of a front lens. Moreover, it is advantageous for correction of an aberration by the second lens unit, such as a correction of various longitudinal aberrations such as a curvature of field and the chromatic aberration of magnification at the telephoto end.

Regarding a zooming effect of the second lens unit, it is preferable that the following conditional expression (14) is satisfied.

$$1.4 < \beta_{2t}/\beta_{2w} < 2.1 \qquad (14)$$

where, $\beta_{2w}$ and $\beta_{2t}$ denote lateral magnification of the second lens unit, at the wide angle end and the telephoto end respectively.

By making an arrangement such that a lower limit in conditional expression (14) is not surpassed, it is easy to suppress a load of a zooming effect on the other lens units. By suppressing the zooming load of the third lens unit, it is easy to suppress an occurrence of the longitudinal aberration such as the spherical aberration at the telephoto end. By suppressing the zooming load of the fourth lens unit, it is possible to make small the refracting power of the fourth lens unit to be moderate, and it is advantageous for reduction of the astigmatism over the entire area.

By making an arrangement such that an upper limit in conditional expression (14) is not surpassed, it becomes easy to suppress the refracting power of the second lens unit. Accordingly, it becomes easy to suppress the occurrence of an aberration, particularly various oblique aberrations in the second lens unit, such as the chromatic aberration of magnification and the curvature of field at the telephoto end.

Moreover, regarding the zooming effect of the third lens unit, it is preferable that the following conditional expression (15) is satisfied.

$$1.8 < \beta_{3t}/\beta_{3w} < 2.9 \qquad (15)$$

where, $\beta_{3w}$ and $\beta_{3t}$ denote a lateral magnification of the third lens unit, at the wide angle end and the telephoto end respectively.

By making an arrangement such that a lower limit in conditional expression (15) is not surpassed, it becomes easy to suppress the load of the zooming effect of the other lens units.

By suppressing the zooming load of the second lens unit, it becomes easy to suppress the occurrence of various oblique aberrations such as the chromatic aberration of magnification and the curvature of field at the telephoto end. By suppressing the zooming load of the fourth lens unit, it is possible to make small the refracting power of the fourth lens unit to be moderate, and it is advantageous for reduction of astigmatism over the entire range.

By making an arrangement such that an upper limit in conditional expression (15) is not surpassed, it becomes easy to suppress the refracting power of the third lens unit. Accordingly, it becomes easy to suppress the occurrence of aberration in the third lens unit, particularly the longitudinal aberration such as the spherical aberration at the telephoto end.

Moreover, regarding the zooming effect of the fourth lens unit, it is preferable that the following conditional expression (16) is satisfied.

$$0.6 < \beta_{4t}/\beta_{4w} < 1.3 \qquad (16)$$

where, $\beta_{4w}$ and $\beta_{4t}$ denote a lateral magnification of the fourth lens unit, at the wide angle end and the telephoto end.

By making an arrangement such that a lower limit in conditional expression (16) is not surpassed, it becomes easy to suppress the load of the zooming effect of the other lens units, and it becomes easy to carry out the correction of various aberrations in a balanced manner. By suppressing the zooming load of the second lens unit, it becomes easy to suppress the occurrence of various oblique aberrations such as the chromatic aberration of magnification and the curvature of field at the telephoto end. By suppressing the zooming load of the third lens unit, it becomes easy to suppress the occurrence of the longitudinal aberration such as the spherical aberration at the telephoto end.

By making an arrangement such that an upper limit in conditional expression (16) is not surpassed, it becomes easy to suppress a fluctuation in the aberration due to an increase in the zooming of the fourth lens unit. Moreover, when the fourth lens unit is let to be a focusing lens unit, it becomes easy to suppress a fluctuation in the curvature of field at the time of focusing.

Regarding an air distance on an optical axis between the second lens unit and the third lens unit at the wide angle end for a focal length of the overall zoom lens system at the wide angle end, it is preferable that the following conditional expression (17) is satisfied.

$$2.8 < D_{2w}/f_w < 4.2 \qquad (17)$$

$$3.5 < (\beta_{2t}/\beta_{2w}) \times (\beta_{3t}/\beta_{3w}) \times (\beta_{4t}/\beta_{4w}) < 5.0 \qquad (9)$$

where, $D_{2w}$ denotes an air distance on an optical axis between the second lens unit and the third lens unit at the wide angle end, $f_w$ denotes the focal length of the overall zoom lens system at the wide angle end, $\beta_{2w}$ and $\beta_{2t}$ denote a lateral magnification of the second lens unit, at the wide angle end and the telephoto end respectively, $\beta_{3w}$ and $\beta_{3t}$ denote a lateral magnification of the third lens unit, at the wide angle end and the telephoto end respectively, and $\beta_{4w}$ and $\beta_{4t}$ denote a lateral magnification of the fourth lens unit, at the wide angle end and the telephoto end respectively.

The description of conditional expression (9) will be omitted as it has already been described.

By making an arrangement such that a lower limit in conditional expression (17) is not surpassed, it is possible to secure an amount of change in a distance between the second lens unit and the third lens unit, and it is advantageous for securing the zooming ratio.

By satisfying conditional expression (9), and by making an arrangement such that an upper limit in conditional expression (17) is not surpassed, the first lens unit and the second lens unit are brought closer to the third lens unit, and since it is possible to lower a height of off-axis light rays, it is advantageous for making small a lens diameter.

Regarding a preferable amount of movement of the third lens unit for the focal length of the overall zoom lens system at the wide angle end, it is preferable that the following conditional expression (18) is satisfied.

$$1.3 < \Delta 3G/f_w < 2.4 \quad (18)$$

where, $\Delta 3G$ denotes an amount of movement of the third lens unit from the wide angle end to the telephoto end, and $f_w$ denotes the focal length of the overall zoom lens system at the wide angle end.

By making an arrangement such that a lower limit in conditional expression (18) is not surpassed, even when the refracting power of the third lens unit is suppressed, it becomes easy to secure the zooming ratio in the third lens unit, and it is advantageous for the aberration correction.

By making an arrangement such that an upper limit in conditional expression (18) is not surpassed, the overall diameter of the zoom lens system at the telephoto end is suppressed, leading to small sizing in the direction of thickness of the lens barrel.

Moreover, it is preferable that the zoom lens system according to the present invention includes an aperture stop which is disposed immediately before the object side of the third lens unit, and that the aperture stop, at the time of zooming from the wide angle end to the telephoto end, moves integrally with the third lens unit.

By disposing the aperture stop immediately before the object side of the third lens unit which is involved importantly in an effect of image formation, it is possible to make the size small in a radial direction while securing the refracting power of the third lens unit. Moreover, when such an arrangement is made, a change in a height of light rays at the time of zooming in the third lens unit being small, a stable image forming performance throughout the zoom range is achieved.

Moreover, it is preferable that the first lens unit includes one lens component.

Similarly as in the second lens unit, in the first lens unit, a height from a position on an optical axis of off-axis light rays increases. When the number of lens components in the first lens unit becomes large, the position of the exit pupil becomes far when seen from the object side. Therefore, the height of the off-axis light rays in the first lens unit goes on becoming higher and higher, and a longitudinal thickness for securing an edge thickness is required to be more. Naturally, when the number of lenses increases, the longitudinal thickness of the first lens unit becomes substantial. Therefore, forming the first lens unit by one lens component is advantageous for making the lens barrel compact.

The first lens unit may include a cemented lens component of a negative lens and a positive lens. When the first lens unit is let to be a cemented lens, it is possible to carry out effectively the correction of longitudinal chromatic aberration which becomes remarkable at the time of making focus long at the telephoto end by making the zooming ratio high. Moreover, it is possible to suppress degradation of optical performance in relative decentering of the plurality of lenses due to an assembling error, and it is possible to contribute to an improvement in the yield and lowering of cost.

Moreover, in a case of forming the first lens unit by one lens component, it is preferable that conditional expressions (19) and (20) are satisfied.

$$0.725 < IH/f_w < 0.8 \quad (19)$$

$$-1.0 < D_{2w}/L_{11r} < 1.0 \quad (20)$$

where,

IH denotes the maximum light ray height of off-axis rays at an image plane, $f_w$ denotes a focal length of the overall zoom lens system at the wide angle end, $D_{2w}$ denotes an air distance on an optical axis between the second lens unit and the third lens unit at the wide angle end, and $L_{11r}$ denotes a radius of curvature of a surface nearest to the image side of the first lens unit.

Conditional expression (19) is an expression which specifies a preferable ratio of an image height to a focal length at the wide angle end. It is the maximum value within a range which may be obtained when a value of the image height changes.

By making an arrangement such that a lower limit in conditional expression (19) is not surpassed, it is advantageous for securing an angle of field at the wide angle end.

By making an arrangement such that an upper limit in conditional expression (19) is not surpassed, it is possible to suppress an increase in the number of lenses of the first lens unit and the second lens unit for correction of an oblique aberration and securing an amount of light.

By making an arrangement such that a lower limit in conditional expression (20) is not surpassed, a surface on the image side of the first lens unit is not let to be a strong convex surface. Accordingly, it is advantageous for reduction of the oblique aberration near the wide angle end.

By making an arrangement such that an upper limit in conditional expression (20) is not surpassed, a surface on the image side of the first lens unit is not let to be a strong concave surface. Accordingly, it is advantageous for reduction of the longitudinal aberration near the telephoto end.

Moreover, in the second lens unit, a difference in a height of off-axis light rays at the wide angle end and a height of off-axis light rays at the telephoto end becomes substantial. Therefore, by disposing a lens having an aspheric surface in the second lens unit, an aberration correction at the wide angle end and the telephoto end becomes easy.

Moreover, in the fourth lens unit, a difference in a height of off-axis light rays at the wide angle end and a height of off-axis light rays at the telephoto end becomes substantial. Or, it is easy to separate a longitudinal light beam and an off-axis light beam.

Therefore, by disposing a lens having an aspheric surface in the fourth lens unit, an aberration correction at the wide angle end and the telephoto end, and a correction of the curvature of field become easy.

At the time of zooming from the wide angle end to the telephoto end, it is preferable to move the first lens unit such that the first lens unit is on the object side at the telephoto end, than at the wide angle end. At this time, the first lens unit may be moved only toward the object side, or may be moved toward the image side in a convex trajectory. The second lens unit may be moved only toward the image side, or may be moved toward the image side in a convex trajectory (locus).

It is preferable to move the third lens unit only toward the object side. The fourth lens unit 4 may be moved only toward the object side, or may be moved toward the image side. Or, the fourth lens unit may be moved toward the image side in a convex trajectory (locus).

Moreover, for cutting unnecessary light such as ghost and flare, a flare aperture apart from an aperture stop may be disposed. The flare aperture may be disposed at any of locations namely, toward the object side of the first lens unit, or between the first lens unit and the second lens unit, or between the second lens unit and the third lens unit, and between the fourth lens unit and the image plane. An arrangement may be made such that flare light rays are cut by a frame member, or another member may be arranged. Moreover, a direct painting, a direct coating, or sticking a seal on the optical system may be carried out. A shape thereof may be any shape such as an elliptical shape, a rectangular shape, a polygonal shape, and a range surrounded by a function curve. Moreover, not only a harmful light beam, but also a beam such as a coma flare around an image plane may be cut.

Moreover, the ghost and the flare may be reduced by applying an antireflection coating to each lens. A multi coating is desirable as it enables to reduce the ghost and the flare effectively. Moreover, an infrared coating may be applied to lens surfaces and a cover glass etc.

Moreover, it is preferable to carry out focusing in the fourth lens unit. When the focusing is carried out in the fourth lens unit, a lens weight being light, and a load exerted on a motor is small. Furthermore, since the overall length does not change at the time of focusing and a drive motor can be disposed at an interior of a lens frame, it is advantageous for making the lens frame compact.

The focusing in the fourth lens unit as described above is desirable. However, the focusing may be carried out in the first lens unit, the second lens unit, and the third lens unit. Moreover, the focusing may be carried out by drawing out the entire lens system toward the object side. The focusing may be carried out by drawing out a part of the lens or by carrying over.

Moreover, there may be let to be an image pickup apparatus which includes a zoom lens system described in one of the abovementioned items, and an image pickup element, which is disposed on an image side of the zoom lens system, and which converts an image formed by the zoom lens system to an electric image.

Moreover, a shading of brightness around an image may be reduced by shifting a micro lens of the CCD. For instance, a design of the micro lens of the CCD may be changed according to an angle of incidence of light rays at each image height. Moreover, a degradation amount around the image may be corrected by image processing.

Moreover, a distortion may be corrected by carrying out image processing electrically after taking a picture, upon causing distortion intentionally in the optical system.

Moreover, letting the zoom lens system to be a four-unit zoom lens system is advantageous for further small sizing. An arrangement may be made such that the astigmatism is corrected even more favorably by disposing an aspheric lens having a small refracting power, immediately before an image pickup surface.

Moreover, it is preferable that a plurality of the abovementioned arrangements and conditional expressions are satisfied simultaneously.

Regarding the conditional expressions, when the upper limit value and the lower limit value are restricted as described below, further effect can be assured.

Only the lower limit value or only the upper limit value in the conditional expressions may be restricted.

It is more preferable to let conditional expression (1) be as follows.

$$-0.85 < SF_{3n} < -0.25 \quad (1')$$

It is even more preferable to let conditional expression (1) be as follows.

$$-0.80 < SF_{3n} < -0.5 \quad (1'')$$

It is more preferable to let conditional expression (2) be as follows.

$$55 < \nu d_3 < 115 \quad (2')$$

It is even more preferable to let conditional expression (2) be as follows.

$$60 < \nu d_3 < 112 \quad (2'')$$

It is more preferable to let conditional expression (3) be as follows.

$$0.09 < D_3/f_3 < 0.18 \quad (3')$$

It is even more preferable to let conditional expression (3) be as follows.

$$0.09 < D_3/f_3 < 0.15 \quad (3'')$$

It is more preferable to let conditional expression (5) be as follows.

$$0.26 < UY_{3G}/f_3 < 0.45 \quad (5')$$

It is even more preferable to let conditional expression (5) be as follows.

$$0.27 < UY_{3G}/f_3 < 0.40 \quad (5'')$$

It is more preferable to let conditional expression (6) be as follows.

$$0.65 < UY_{3G}/f_w < 0.95 \quad (6')$$

It is even more preferable to let conditional expression (6) be as follows.

$$0.70 < UY_{3G}/f_w < 0.90 \quad (6'')$$

It is more preferable to let conditional expression (7) be as follows.

$$7.5 < f_1/f_w < 9.5 \quad (7')$$

It is even more preferable to let conditional expression (7) be as follows.

$$8.0 < f_1/f_w < 9.2 \quad (7'')$$

It is more preferable to let conditional expression (8) be as follows.

$$1.65 < |f_2/f_w| < 2.05 \quad (8')$$

It is even more preferable to let conditional expression (8) be as follows.

$$1.70 < |f_2/f_w| < 2.00 \quad (8'')$$

It is more preferable to let conditional expression (10) be as follows.

$$2.2 < f_3/f_w < 2.9 \quad (10')$$

It is even more preferable to let conditional expression (10) be as follows.

$$2.4 < f_3/f_w < 2.8 \quad (10'')$$

It is more preferable to let conditional expression (11) be as follows.

$$3.6 < f_4/f_w < 5.25 \quad (11')$$

It is even more preferable to let conditional expression (11) be as follows.

$$3.8 < f_4/f_w < 5.00 \quad (11'')$$

It is more preferable to let conditional expression (12) be as follows.

$$9.2 < L_w/f_w < 10.0 \quad (12')$$

It is even more preferable to let conditional expression (12) be as follows.

$$9.4 < L_w/f_w < 9.8 \quad (12'')$$

It is more preferable to let conditional expression (13) be as follows.

$$0.55 < (\beta_{2t}/\beta_{2w})/(\beta_{3t}/\beta_{3w}) < 0.95 \quad (13')$$

It is even more preferable to let conditional expression (13) be as follows.

$$0.60 < (\beta_{2t}/\beta_{2w})/(\beta_{3t}/\beta_{3w}) < 0.90 \quad (13'')$$

It is more preferable to let conditional expression (14) be as follows.

$$1.5 < \beta_{2t}/\beta_{2w} < 2.0 \quad (14')$$

It is even more preferable to let conditional expression (14) be as follows.

$$1.6 < \beta_{2t}/\beta_{2w} < 1.9 \quad (14'')$$

It is more preferable to let conditional expression (15) be as follows.

$$1.9 < \beta_{3t}/\beta_{3w} < 2.8 \quad (15')$$

It is even more preferable to let conditional expression (15) be as follows.

$$2.0 < \beta_{3t}/\beta_{3w} < 2.7 \quad (15'')$$

It is more preferable to let conditional expression (16) be as follows.

$$0.7 < \beta_{4t}/\beta_{4w} < 1.2 \quad (16')$$

It is even more preferable to let conditional expression (16) be as follows.

$$0.8 < \beta_{4t}/\beta_{4w} < 1.1 \quad (16'')$$

It is more preferable to let conditional expression (17) be as follows.

$$3.0 < D_{2w}/f_w < 4.0 \quad (17')$$

It is even more preferable to let conditional expression (17) be as follows.

$$3.2 < D_{2w}/f_w < 3.8 \quad (17'')$$

It is more preferable to let conditional expression (18) be as follows.

$$1.4 < \Delta 3G/f_w < 2.3 \quad (18')$$

It is even more preferable to let conditional expression (18) be as follows.

$$1.5 < \Delta 3G/f_w < 2.2 \quad (18'')$$

It is more preferable to let conditional expression (20) be as follows.

$$-0.8 < D_{2w}/L_{11r} < 0.8 \quad (20')$$

It is even more preferable to let conditional expression (20) be as follows.

$$-0.5 < D_{2w}/L_{11r} < 0.5 \quad (20'')$$

Exemplary embodiments of the zoom lens system and the image pickup apparatus according to the present invention will be described below in detail. However, the present invention is not restricted to the embodiments described below.

Each of the embodiments is a zoom lens system having a high image forming performance with a brightness having the F value of about 1.8 at the wide angle end, a wide angle of field of about 75° at the wide angle end, and a zooming ratio of about four times, which is suitable for slimming when a lens barrel is collapsed, and which is compact. Moreover, it is a low-price zoom lens system in which, an exit pupil can be easily moved away from an image plane, and which is suitable for an image pickup element such as a CCD and a CMOS.

Moreover, focusing from a long-distance object to a short-distance is carried out by drawing out the fourth lens unit toward the object side.

When not in use, an optical axis of the third lens unit may be separated from an optical axis of the other lens units by moving parallel to a direction of short side of an image pickup surface, and may be accommodated in a collapsed state to be positioned at a lower side (or at an upper side) of the fourth lens unit.

A lower side (or an upper side) of the lenses forming the fourth lens unit may subjected to D-cut parallel to a longitudinal direction of the image pickup surface.

Moreover, a thirteenth surface in numerical data is a virtual surface.

Furthermore, two parallel plates are a low pass filter on which an infrared-cutting coat is applied, and a transparent cover member which is positioned at a front surface of the image pickup surface of the image pickup element.

Moreover, the last surface in the diagrams is an image surface, at which, the image pickup surface of the image pickup element is positioned.

By installing such zoom lens system in an image pickup apparatus such as a digital camera, the image pickup apparatus becomes an image pickup apparatus having an improved performance.

Figure 1B:
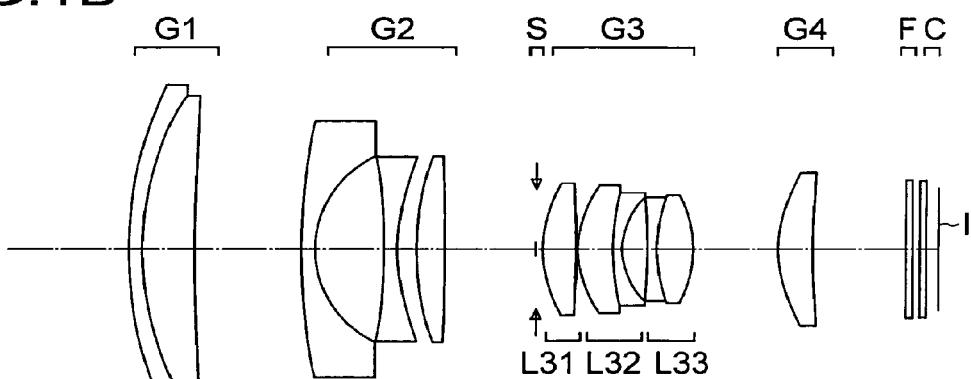
Figure 1C:
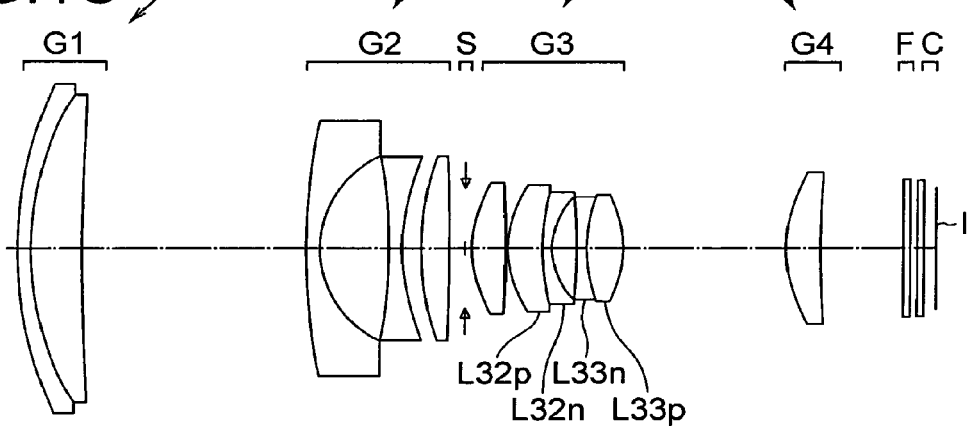

A zoom lens system according to a first embodiment, as shown in FIG. 1A, FIG. 1B, and FIG. 1C, includes in order from an object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1, first moves toward the image side, and upon inverting a direction of movement between the wide angle end and an intermediate focal length state, moves toward object side. The first lens unit G1 is positioned on the object side at the telephoto end, than at the wide angle end.

The second lens unit G2, first moves toward the image side, and upon inverting the direction of movement between the intermediate focal length state and the telephoto end, moves toward the object side. The second lens unit G2 is positioned on the image side at the telephoto end, than at the wide angle end.

The third lens unit G3 moves only toward the object side.

The fourth lens unit G4, first moves toward the object side, and upon inverting the direction of movement between the intermediate focal length state and the telephoto end, moves toward the image side. The fourth lens unit G4 is positioned on the object side at the telephoto end, than at the wide angle end.

In order from the object side, the first lens unit G1 includes a cemented lens of a negative meniscus lens having a convex surface directed toward the object side and a positive meniscus lens having a convex surface directed toward the object side.

The second lens unit G2 includes a negative meniscus lens having a convex surface directed toward the object side, a biconcave negative lens, and a biconvex positive lens.

The third lens unit G3 includes a biconvex positive lens, a cemented lens of a positive meniscus lens having a convex surface directed toward the object side and a negative meniscus lens having a convex surface directed toward the object side, and a cemented lens of a biconcave negative lens and a biconvex positive lens.

The fourth lens unit G4 includes a positive meniscus lens having a convex surface directed toward the object side.

An aspheric surface is used for six surfaces namely, both surfaces of the biconcave negative lens in the second lens unit G2, both surfaces of the biconvex positive lens on the object side and a surface on the image side of the biconvex positive lens on the object side in the third lens unit G3, and a surface on the object side of the positive meniscus lens having a convex surface directed toward the object side in the fourth lens unit G4.

Figure 2A:
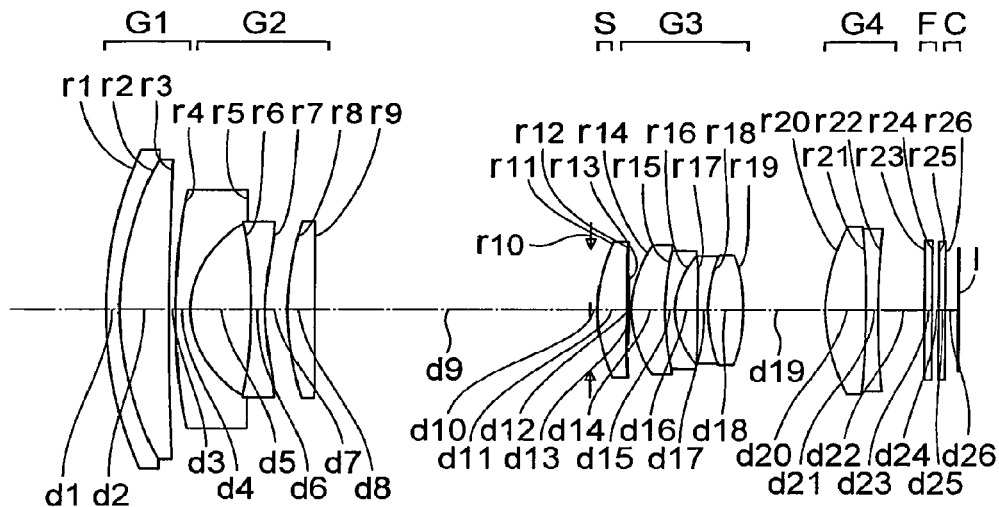
FIG. 2A, FIG. 2B, and FIG. 2C are diagrams similar to FIG. 1A, FIG. 1B, and FIG. 1C respectively, of a second embodiment of the zoom lens system of the present invention.
Figure 2B:
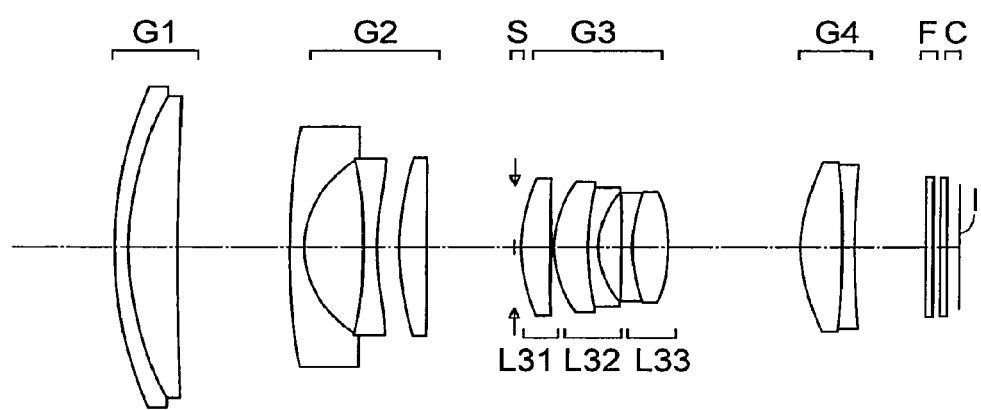
Figure 2C:
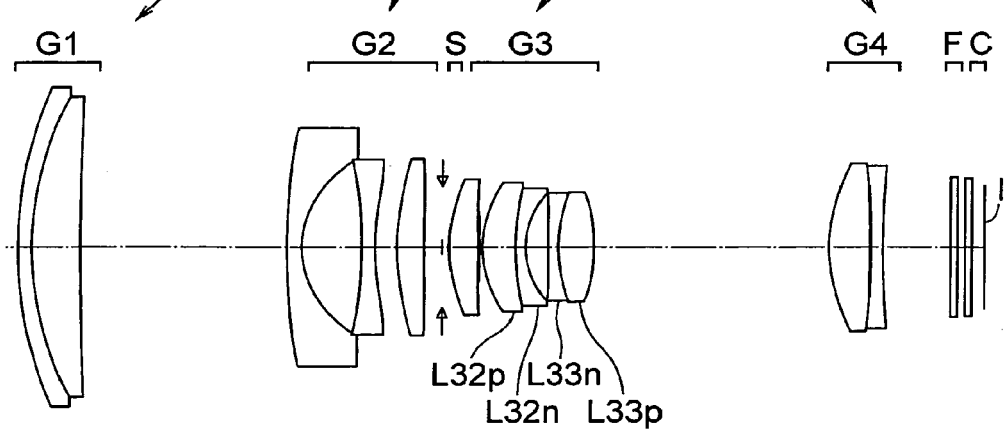

A zoom lens system according to a second embodiment, as shown in FIG. 2A, FIG. 2B, and FIG. 2C, includes in order from an object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1, first moves toward the image side, and upon inverting a direction of movement between the wide angle end and an intermediate focal length state, moves toward the object side. The first lens unit G1 is positioned on the object side at the telephoto end, than at the wide angle end.

The second lens unit G2, first moves toward the image side, and upon inverting the direction of movement at the intermediate focal length state, moves toward the object side. The second lens unit G2 is positioned on the image side at the telephoto end, than at the wide angle end.

The third lens unit G3 moves only toward the object side.

The fourth lens unit G4, first moves toward the object side, and upon inverting the direction of movement between the intermediate focal length state and the telephoto end, moves toward the image side. The fourth lens unit G4 is positioned on the object side at the telephoto end, than at the wide angle end.

In order from the object side, the first lens unit G1 includes a cemented lens made of a negative meniscus lens having a convex surface directed toward the object side and a positive meniscus lens having a convex surface directed toward the object side.

The second lens unit G2 includes a negative meniscus lens having a convex surface directed toward the object side, a biconcave negative lens, and a biconvex positive lens.

The third lens unit G3 includes a biconvex positive lens, a cemented lens of a positive meniscus lens having a convex surface directed toward the object side and a negative meniscus lens having a convex surface directed on the object side, and a cemented lens of a biconcave negative lens and a biconvex positive lens.

The fourth lens unit G4 includes a cemented lens of a biconvex positive lens and a biconcave negative lens.

An aspheric surface is used for six surfaces namely, both surfaces of the biconcave negative lens in the second lens unit G2, both surfaces of the biconvex positive lens on the object side and a surface on the image side of the biconvex positive lens on the object side in the third lens unit G3, and a surface on the object side of the biconvex positive lens in the fourth lens unit G4.

Figure 3A:
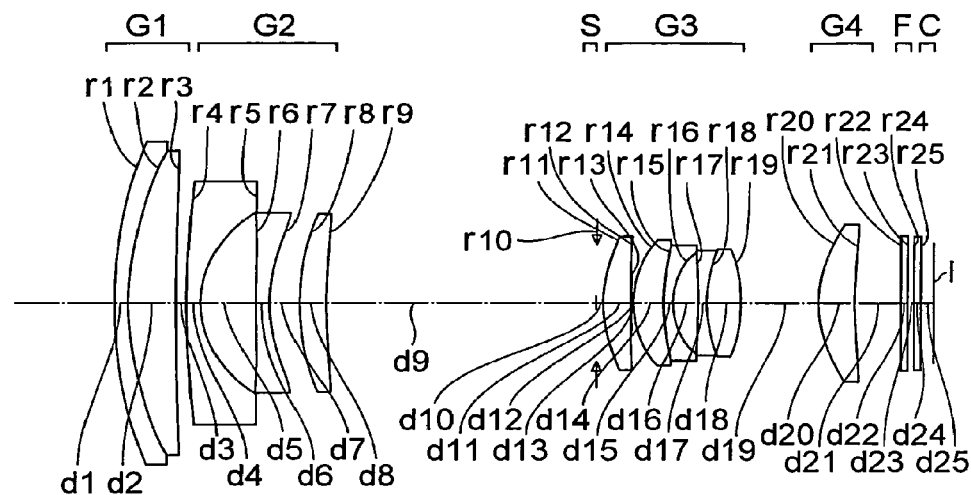
FIG. 3A, FIG. 3B, and FIG. 3C are diagrams similar to FIG. 1A, FIG. 1B, and FIG. 1C respectively, of a third embodiment of the zoom lens system of the present invention.
Figure 3B:
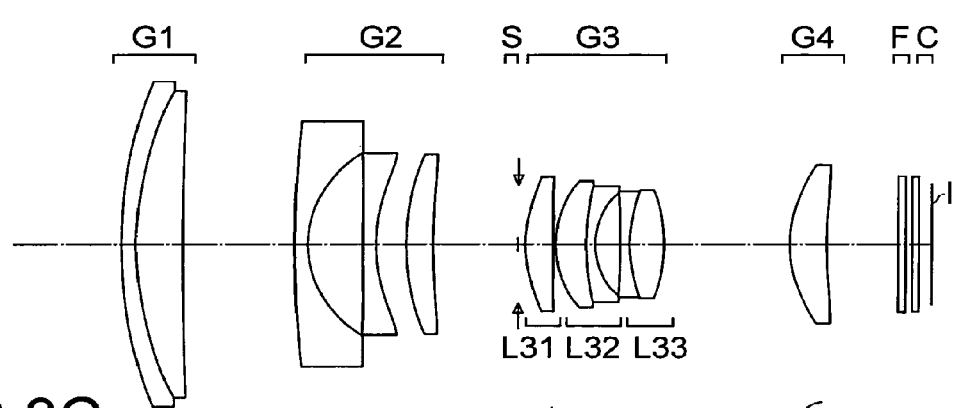
Figure 3C:
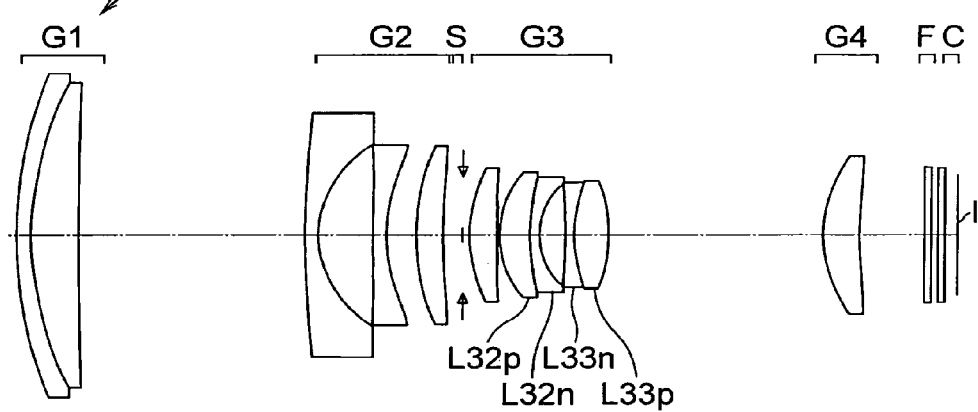

A zoom lens system according to a third embodiment, as shown in FIG. 3A, FIG. 3B, and FIG. 3C, includes in order from an object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1, first moves toward the image side, and upon inverting a direction of movement between the wide angle end and an intermediate focal length state, moves toward the object side. The first lens unit G1 is positioned on the object side at the telephoto end, than at the wide angle end.

The second lens unit G2, first moves toward the image side, and upon inverting the direction of movement at the intermediate focal length state, moves toward the object side. The second lens unit G2 is positioned on the image side at the telephoto end, than at the wide angle end.

The third lens unit G3 moves only toward the object side.

The fourth lens unit G4, first moves toward the object side, and upon inverting the direction of movement between the intermediate focal length state and the telephoto end, moves toward the image side. The fourth lens unit G4 is positioned on the object side at the telephoto end, than at the wide angle end.

In order from the object side, the first lens unit G1 includes a cemented lens made of a negative meniscus lens having a convex surface directed toward the object side and a positive meniscus lens having a convex surface directed toward the object side.

The second lens unit G2 includes a negative meniscus lens having a convex surface directed toward the object side, a biconcave negative lens, and a positive meniscus lens having a convex surface directed toward the object side.

The third lens unit G3 includes a biconvex positive lens, a cemented lens of a positive meniscus lens having a convex surface directed toward the object side and a negative meniscus lens having a convex surface directed toward the object side, and a cemented lens of a biconcave negative lens and a biconvex positive lens.

The fourth lens unit G4 includes a positive meniscus lens having a convex surface directed toward the object side.

An aspheric surface is used for six surfaces namely, both surfaces of the biconcave negative lens in the second lens unit G2, both surfaces of the biconvex positive lens on the object side and a surface on the image side of the biconvex positive lens on the image side in the third lens unit G3, and a surface on the object side of the positive meniscus lens having the convex surface directed toward the object side in the fourth lens unit G4.

Figure 4A:
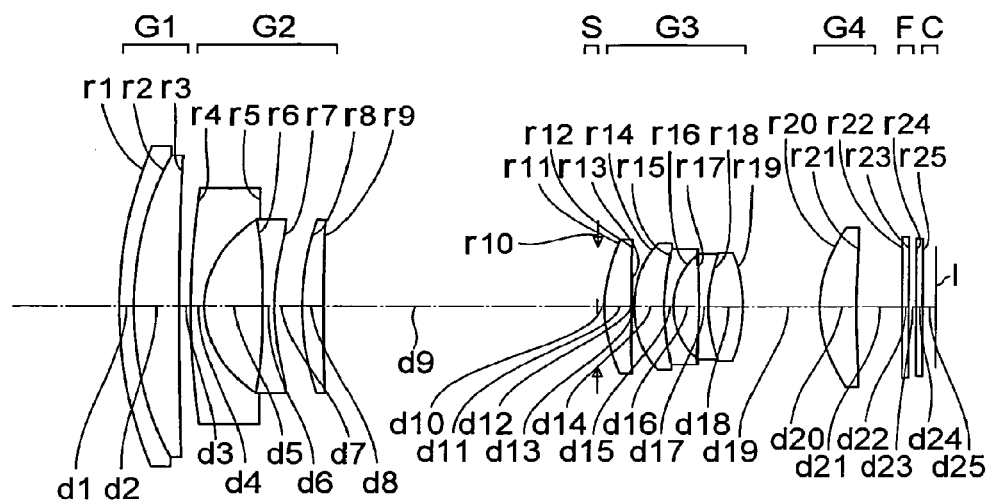
FIG. 4A, FIG. 4B, and FIG. 4C are diagrams similar to FIG. 1A, FIG. 1B, and FIG. 1C respectively, of a fourth embodiment of the zoom lens system of the present invention.
Figure 4B:
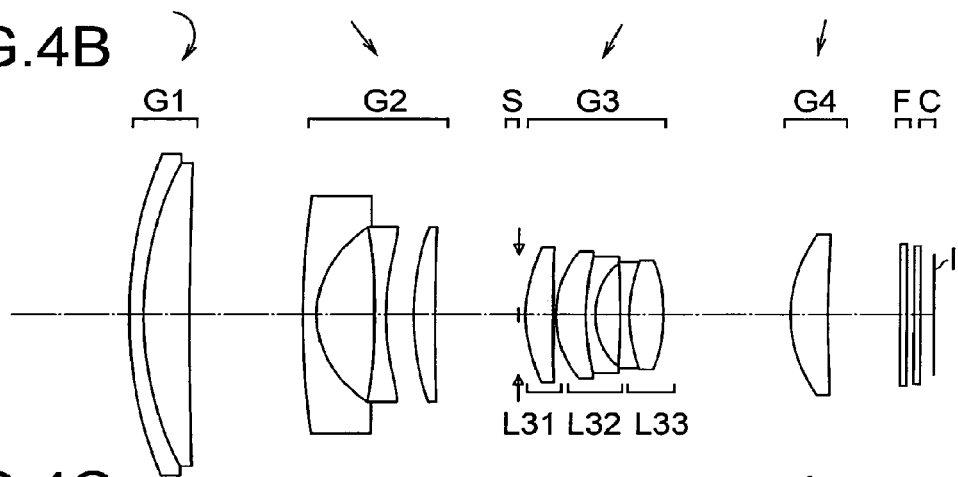
Figure 4C:
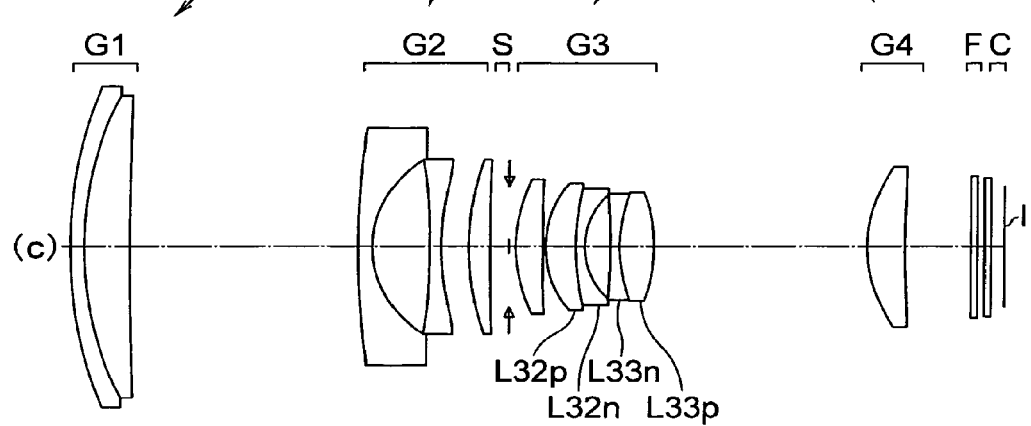

A zoom lens system according to a fourth embodiment, as shown in FIG. 4A, FIG. 4B, and FIG. 4C, includes in order from an object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1, first moves toward the image side, and upon inverting a direction of movement between the wide angle end and an intermediate focal length state, moves toward the object side. The first lens unit G1 is positioned on the object side at the telephoto end, than at the wide angle end.

The second lens unit G2, first moves toward the image side, and upon inverting the direction of movement at the intermediate focal length state, moves toward the object side. The second lens unit G2 is positioned on the image side at the telephoto end, than at the wide angle end.

The third lens unit G3 moves only toward the object side.

The fourth lens unit G4, first moves toward the object side, and upon inverting the direction of movement between the intermediate focal length state and the telephoto end, moves toward the image side. The fourth lens unit G4 is positioned on the object side at the telephoto end, than at the wide angle end.

In order from the object side, the first lens unit G1 includes a cemented lens of a negative meniscus lens having a convex surface directed toward the object side and a positive meniscus lens having a convex surface directed toward the object side.

The second lens unit G2 includes a negative meniscus lens having a convex surface directed toward the object side, a biconcave negative lens, and a negative meniscus lens having a convex surface directed toward the object side.

The third lens unit G3 includes a biconvex positive lens, a cemented lens of a positive meniscus lens having a convex surface directed toward the object side and a negative meniscus lens having a convex surface directed toward the object side, and a cemented lens of a biconcave negative lens and a biconvex positive lens.

The fourth lens unit G4 includes a positive meniscus lens having a convex surface directed toward the object side.

An aspheric surface is used for six surfaces namely, both surfaces of the biconcave negative lens in the second lens unit G2, both surfaces of the biconvex positive lens on the object side and a surface on the image side of the biconvex positive lens on the image side in the third lens unit G3, and a surface on the object side of the positive meniscus lens having the convex surface directed toward the object side in the fourth lens unit G4.

Figure 5A:
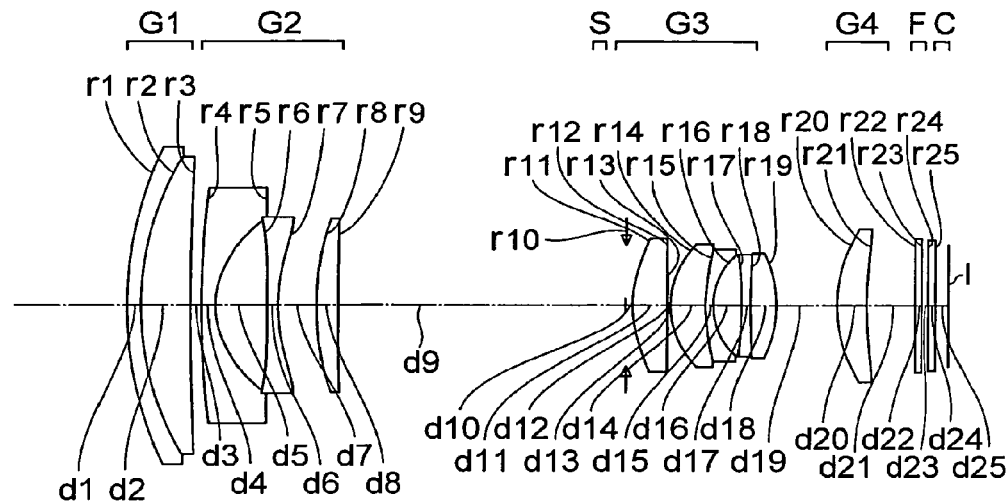
FIG. 5A, FIG. 5B, and FIG. 5C are diagrams similar to FIG. 1A, FIG. 1B, and FIG. 1C respectively, of a fifth embodiment of the zoom lens system of the present invention.
Figure 5B:
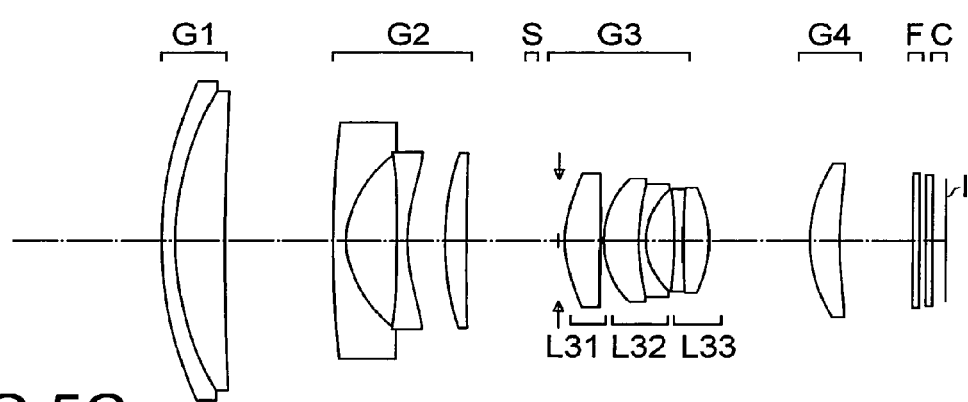
Figure 5C:
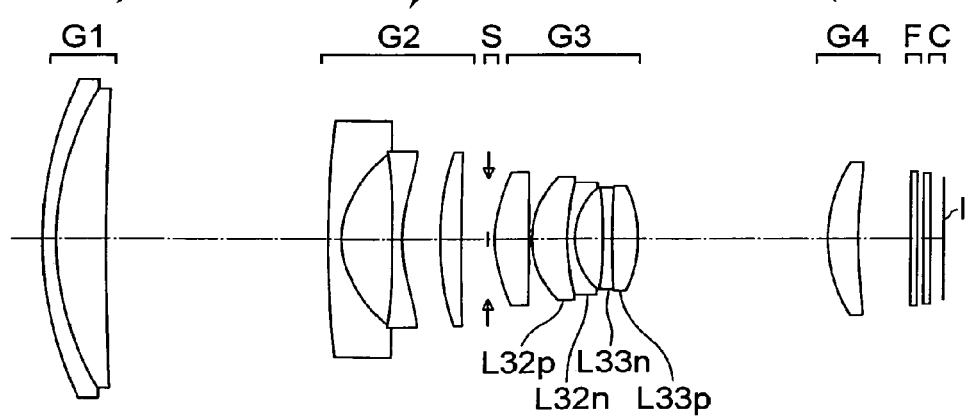

A zoom lens system according to a fifth embodiment, as shown in FIG. 5A, FIG. 5B, and FIG. 5C, includes in order from an object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1, first moves toward the image side, and upon inverting a direction of movement between the wide angle end and the intermediate focal length state, moves toward the object side. The first lens unit G1 is positioned on the object side at the telephoto end, than at the wide angle end.

The second lens unit G2, first moves toward the image side, and upon inverting the direction of movement between the intermediate focal length state and the telephoto end, moves toward the object side. The second lens unit G2 is positioned on the image side at the telephoto end, than at the wide angle end.

The third lens unit G3 moves only toward the object side.

The fourth lens unit G4, first moves toward the object side, and upon inverting the direction of movement between the intermediate focal length state and the telephoto end, moves toward the image side. The fourth lens unit G4 is positioned on the object side at the telephoto end, than at the wide angle end.

In order from the object side, the first lens unit G1 includes a cemented lens of a negative meniscus lens having a convex surface directed toward the object side and a positive meniscus lens having a convex surface directed toward the object side.

The second lens unit G2 includes a negative meniscus lens having a convex surface directed toward the object side, a biconcave negative lens, and a positive meniscus lens having a convex surface directed toward the object side.

The third lens unit G3 includes a biconvex positive lens, a cemented lens of a positive meniscus lens having a convex surface directed toward the object side and a negative meniscus lens having a convex surface directed toward the object side, and a cemented lens of a biconcave negative lens and a biconvex positive lens.

The fourth lens unit G4 includes a positive meniscus lens having a convex surface directed toward the object side.

An aspheric surface is used for six surfaces namely, both surfaces of the biconcave negative lens in the second lens unit G2, both surfaces of the biconvex positive lens on the object side and a surface on the image side of the biconvex positive lens on the image side in the third lens unit G3, and a surface on the object side of the positive meniscus lens having the convex surface directed toward the object side in the fourth lens unit G4.

Figure 6A:
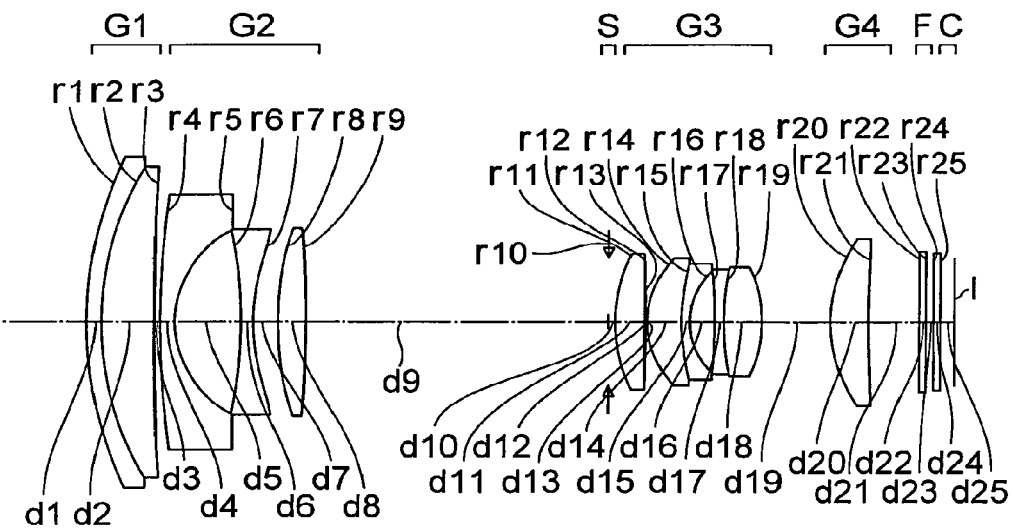
FIG. 6A, FIG. 6B, and FIG. 6C are diagrams similar to FIG. 1A, FIG. 1B, and FIG. 1C respectively, of a sixth embodiment of the zoom lens system of the present invention.
Figure 6B:
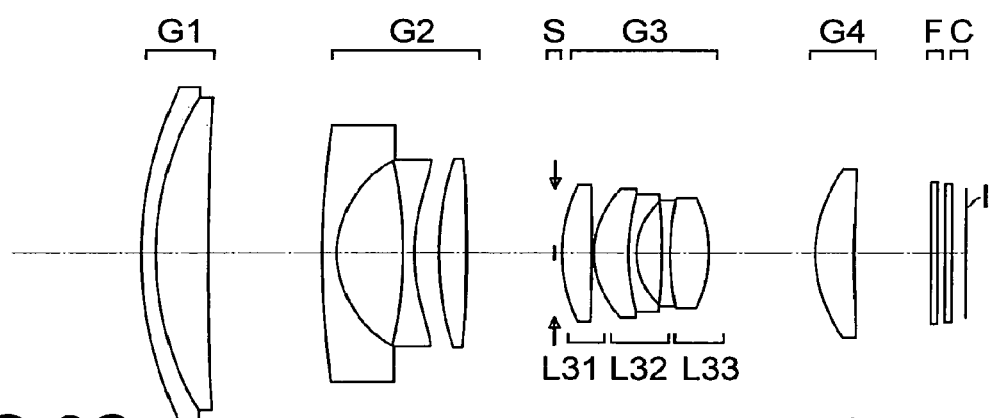
Figure 6C:
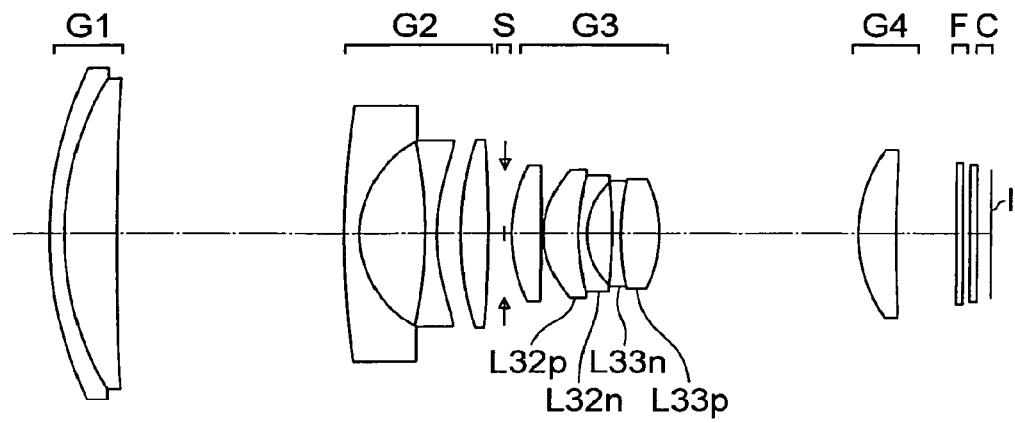

A zoom lens system according to a sixth embodiment, as shown in FIG. 6A, FIG. 6B, and FIG. 6C, includes in order from an object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1, first moves toward the image side, and upon inverting a direction of movement between the wide angle end and the intermediate focal length state, moves toward the object side. The first lens unit G1 is positioned on the object side at the telephoto end, than at the wide angle end.

The second lens unit G2, first moves toward the image side, and upon inverting the direction of movement between the intermediate focal length state and the telephoto end, moves toward the object side. The second lens unit G2 is positioned on the image side at the telephoto end, than at the wide angle end.

The third lens unit G3 moves only toward the object side.

The fourth lens unit G4, first moves toward the object side, and upon inverting the direction of movement between the intermediate focal length state and the telephoto end, moves toward the image side. The fourth lens unit G4 is positioned on the object side at the telephoto end, than at the wide angle end.

In order from the object side, the first lens unit G1 includes a cemented lens of a negative meniscus lens having a convex surface directed toward the object side and a positive meniscus lens having a convex surface directed toward the object side.

The second lens unit G2 includes a negative meniscus lens having a convex surface directed toward the object side, a biconcave negative lens, and a biconvex positive lens.

The third lens unit G3 includes a biconvex positive lens, a cemented lens of a positive meniscus lens having a convex surface directed toward the object side and a negative meniscus lens having a convex surface directed toward the object side, and a cemented lens of a biconcave negative lens and a biconvex positive lens.

The fourth lens unit G4 includes a positive meniscus lens having a convex surface directed toward the object side.

An aspheric surface is used for six surfaces namely, both surfaces of the biconcave negative lens in the second lens unit G2, both surfaces of the biconvex positive lens on the object side and a surface on the image side of the biconvex positive lens on the image side in the third lens unit G3, and a surface on the object side of the positive meniscus lens having the convex surface directed toward the object side in the fourth lens unit G4.

Figure 7A:
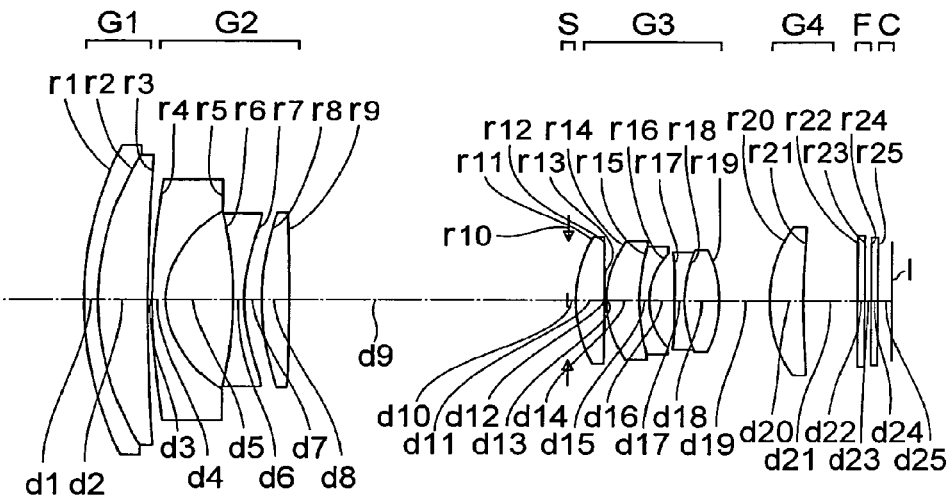
FIG. 7A, FIG. 7B, and FIG. 7C are diagrams similar to FIG. 1A, FIG. 1B, and FIG. 1C respectively, of a seventh embodiment of the zoom lens system of the present invention.
Figure 7B:
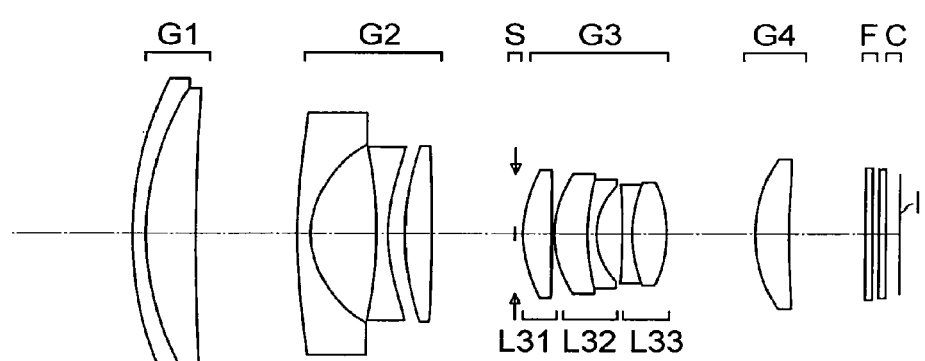
Figure 7C:
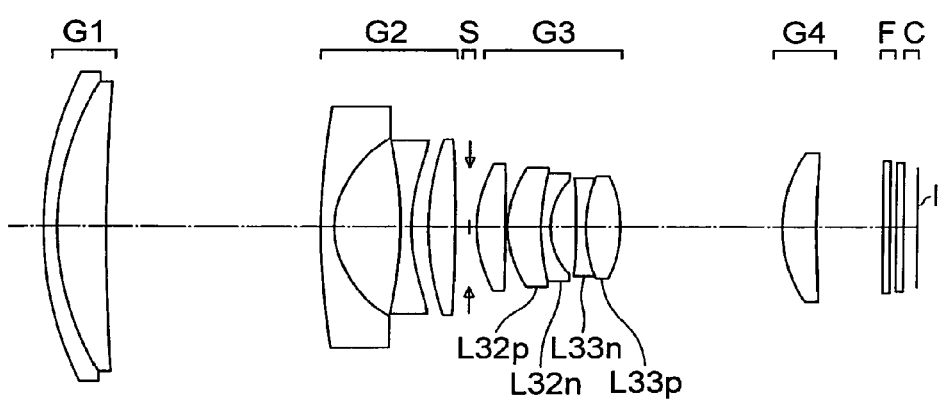

A zoom lens system according to a seventh embodiment, as shown in FIG. 7A, FIG. 7B, and FIG. 7C, includes in order from an object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1, first moves toward the image side, and upon inverting a direction of movement between the wide angle end and the intermediate focal length state, moves toward the object side. The first lens unit G1 is positioned on the object side at the telephoto end, than at the wide angle end.

The second lens unit G2, first moves toward the image side, and upon inverting the direction of movement between the intermediate focal length state and the telephoto end, moves toward the object side. The second lens unit G2 is positioned on the image side at the telephoto end, than at the wide angle end.

The third lens unit G3 moves only toward the object side.

The fourth lens unit G4, first moves toward the object side, and upon inverting the direction of movement between the intermediate focal length state and the telephoto end, moves toward the image side. The fourth lens unit G4 is positioned on the object side at the telephoto end, than at the wide angle end.

In order from the object side, the first lens unit G1 includes a cemented lens of a negative meniscus lens having a convex surface directed toward the object side and a positive meniscus lens having a convex surface directed toward the object side.

The second lens unit G2 includes a negative meniscus lens having a convex surface directed toward the object side, a biconcave negative lens, and a biconvex positive lens.

The third lens unit G3 includes a biconvex positive lens, a cemented lens of a positive meniscus lens having a convex surface directed toward the object side and a negative meniscus lens having a convex surface directed toward the object side, and a cemented lens of a biconcave negative lens and a biconvex positive lens.

The fourth lens unit G4 includes a positive meniscus lens having a convex surface directed toward the object side.

An aspheric surface is used for six surfaces namely, both surfaces of the biconcave negative lens in the second lens unit G2, both surfaces of the biconvex positive lens on the object side and a surface on the image side of the biconvex positive lens on the image side in the third lens unit G3, and a surface on the object side of the positive meniscus lens having the convex surface directed toward the object side.

Figure 8A:
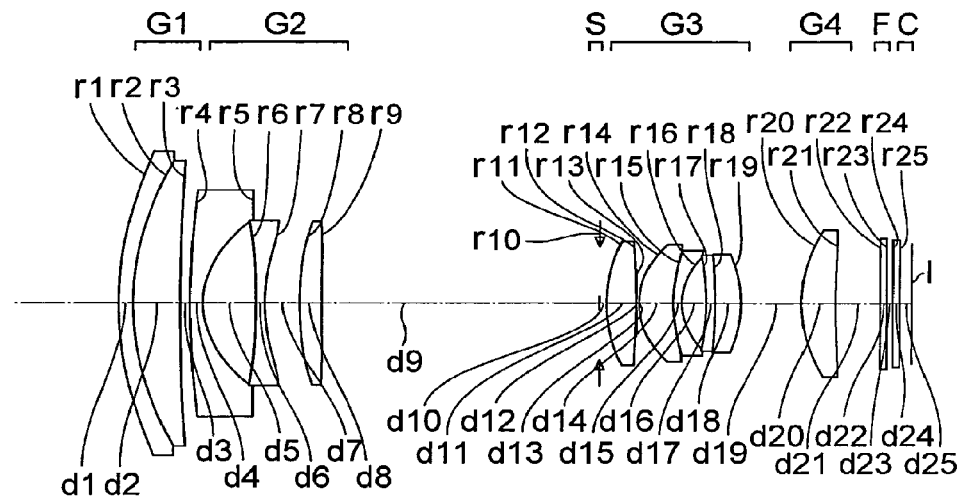
FIG. 8A, FIG. 8B, and FIG. 8C are diagrams similar to FIG. 1A, FIG. 1B, and FIG. 1C respectively, of an eighth embodiment of the zoom lens system of the present invention.
Figure 8B:
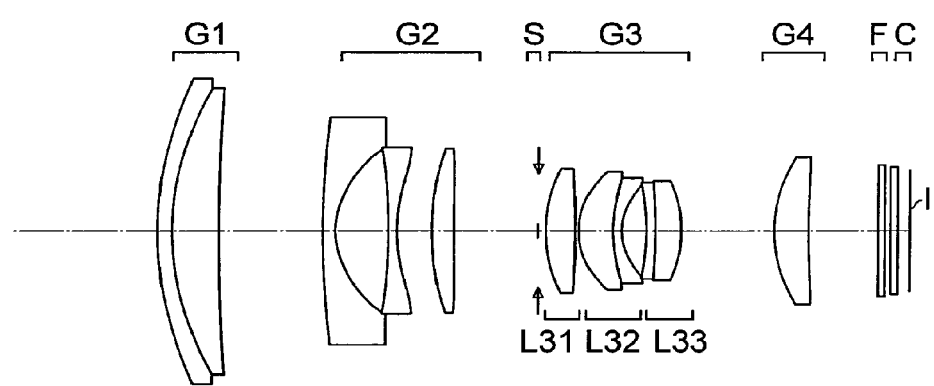
Figure 8C:
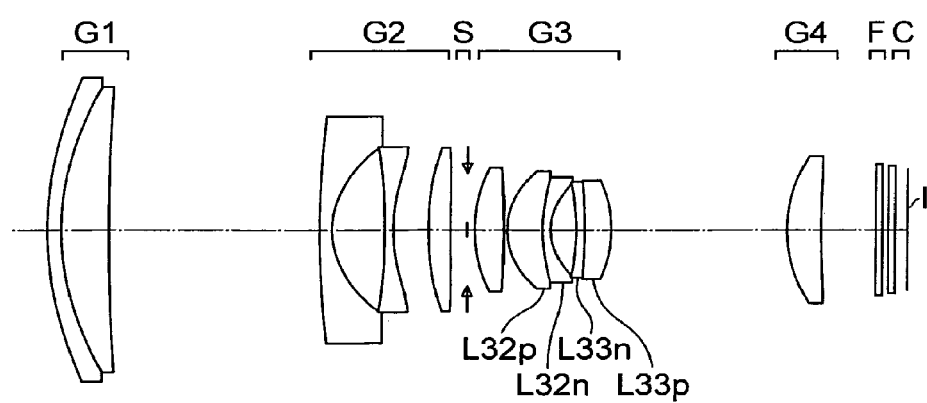

A zoom lens system according to an eighth embodiment, as shown in FIG. 8A, FIG. 8B, and FIG. 8C, includes in order from an object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1, first moves toward the image side, and upon inverting a direction of movement between the wide angle end and the intermediate focal length state, moves toward the object side. The first lens unit G1 is positioned on the object side at the telephoto end, than at the wide angle end.

The second lens unit G2, first moves toward the image side, and upon inverting a direction of movement between the intermediate focal length state and the telephoto end, moves toward the object side. The second lens unit G2 is positioned on the image side at the telephoto end, than at the wide angle end.

The third lens unit G3 moves only toward the object side. The fourth lens unit G4, first moves toward the object side, and upon inverting the direction of movement between the intermediate focal length state and the telephoto end, moves toward the object side. The fourth lens unit G4 is positioned on the object side at the telephoto end, than at the wide angle end.

In order from the object side, the first lens unit G1 includes a cemented lens of a negative meniscus lens having a convex surface directed toward the object side and a positive meniscus lens having a convex surface directed toward the object side.

The second lens unit G2 includes a negative meniscus lens having a convex surface directed toward the object side, a negative meniscus lens having a convex surface directed toward the object side, and a positive meniscus lens having a convex surface directed toward the object side.

The third lens unit G3 includes a biconvex positive lens, a cemented lens of a positive meniscus lens having a convex surface directed toward the object side and a negative meniscus lens having a convex surface directed toward the object side, and a cemented lens of a negative meniscus lens having a convex surface directed toward the image side and a positive meniscus lens having a convex surface directed toward the image side.

The fourth lens unit G4 includes a positive meniscus lens having a convex surface directed toward the object side.

An aspheric surface is provided to six surfaces namely, both surfaces of the negative meniscus lens having the convex surface directed toward the object side in the second lens unit G2, both surfaces of the biconvex positive lens on the object side and a surface on the image side of the positive meniscus lens having the convex surface directed toward the image side in the third lens unit G3, and a surface on the object side of the positive meniscus lens having the convex surface directed toward the object side in the fourth lens unit G4.

Figure 9A:
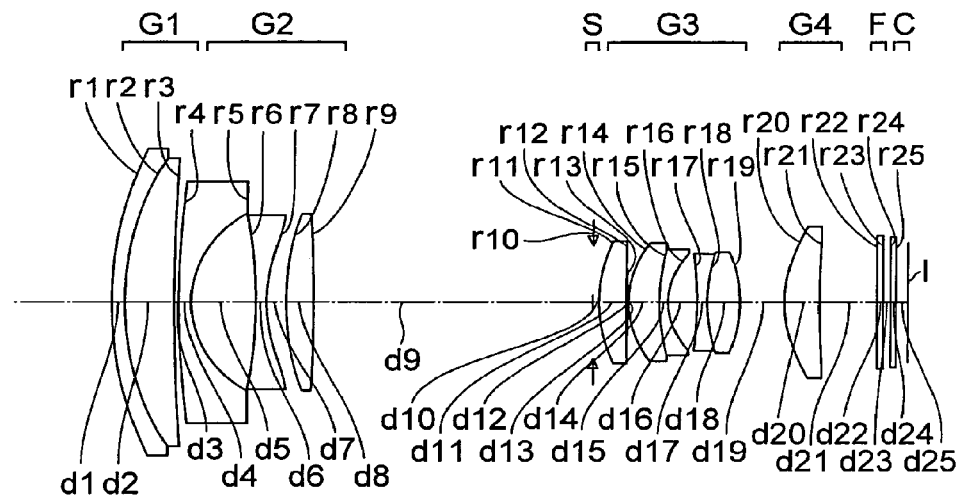
FIG. 9A, FIG. 9B, and FIG. 9C are diagrams similar to FIG. 1A, FIG. 1B, and FIG. 1C respectively, of a ninth embodiment of the zoom lens system of the present invention.
Figure 9B:
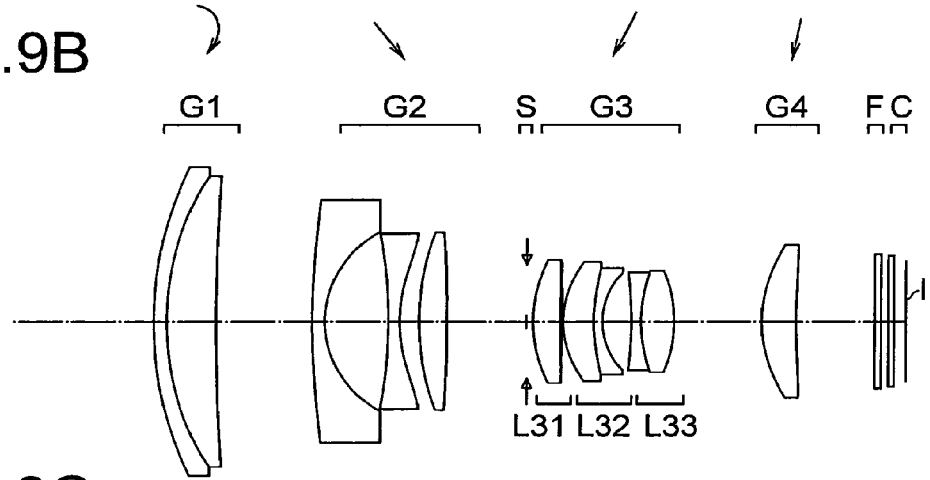
Figure 9C:
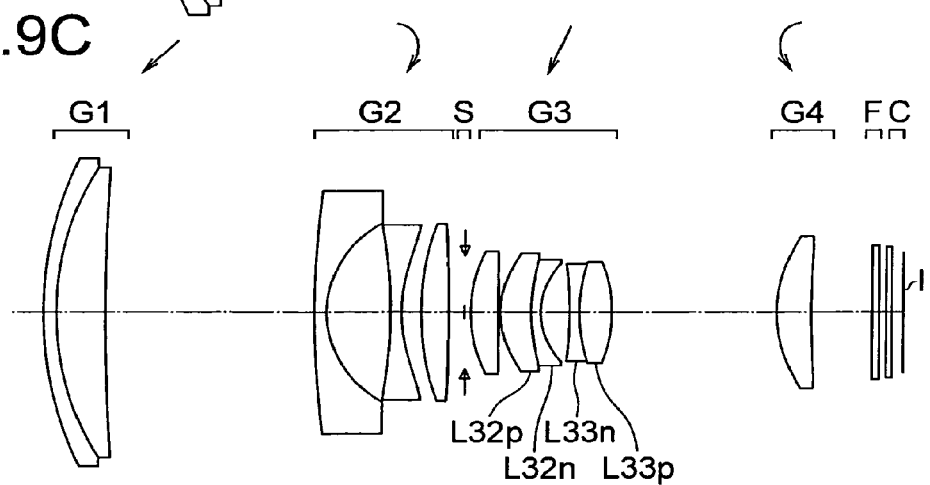

A zoom lens system according to a ninth embodiment, as shown in FIG. 9A, FIG. 9B, and FIG. 9C, includes in order from an object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1, first moves toward the image side, and upon inverting a direction of movement between the wide angle end to the intermediate focal length state, moves toward the object side. The first lens unit G1 is positioned on the object side at the telephoto end, than at the wide angle end.

The second lens unit G2, first moves toward the image side, and upon inverting a direction of movement between the intermediate focal length state and the telephoto end, moves toward the object side. The second lens unit G2 is positioned on the image side at the telephoto end, than at the wide angle end.

The third lens unit G3 moves only toward the object side.

The fourth lens unit G4, first moves toward the object side, and upon inverting the direction of movement between the intermediate focal length state and the telephoto end, moves toward the object side. The fourth lens unit G4 is positioned on the object side at the telephoto end, than at the wide angle end.

In order from the object side, the first lens unit G1 includes a cemented lens of a negative meniscus lens having a convex surface directed toward the object side and a positive meniscus lens having a convex surface directed toward the object side.

The second lens unit G2 includes a negative meniscus lens having a convex surface directed toward the object side, a biconcave negative lens, and a biconvex positive lens.

The third lens unit G3 includes a biconvex positive lens, a cemented lens of a positive meniscus lens having a convex surface directed toward the object side and a negative meniscus lens having a convex surface directed toward the object side, and a cemented lens of a biconcave negative lens and a biconvex positive lens.

The fourth lens unit G4 includes a positive meniscus lens having a convex surface directed toward the object side.

An aspheric surface is used for six surfaces namely, both surfaces of the biconcave negative lens in the second lens unit G2, both surfaces of the biconvex positive lens on the object side and a surface on the image side of the biconvex positive lens on the image side in the third lens unit G3, and a surface on the object side of the positive meniscus lens having the convex surface directed toward the object side in the fourth lens unit G4.

Figure 10A:
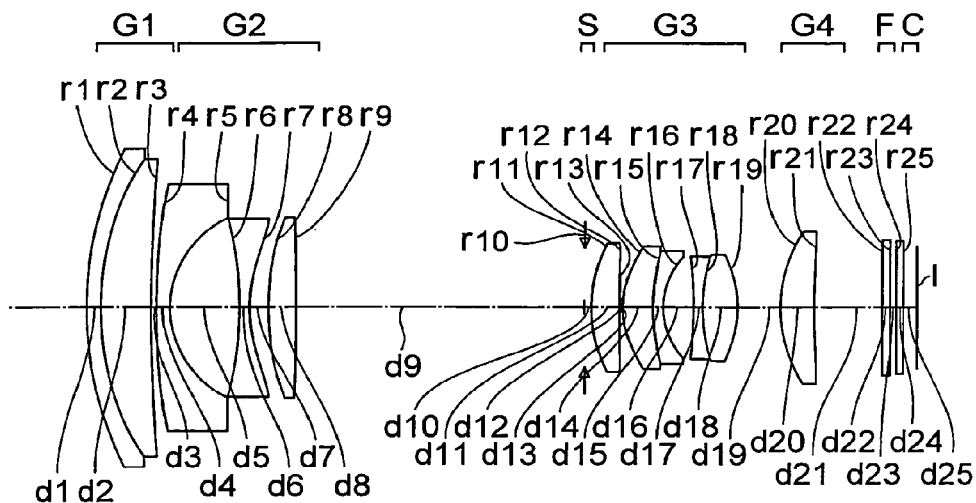
FIG. 10A, FIG. 10B, and FIG. 10C are diagrams similar to FIG. 1A, FIG. 1B, and FIG. 1C respectively, of a tenth embodiment of the zoom lens system of the present invention.
Figure 10B:
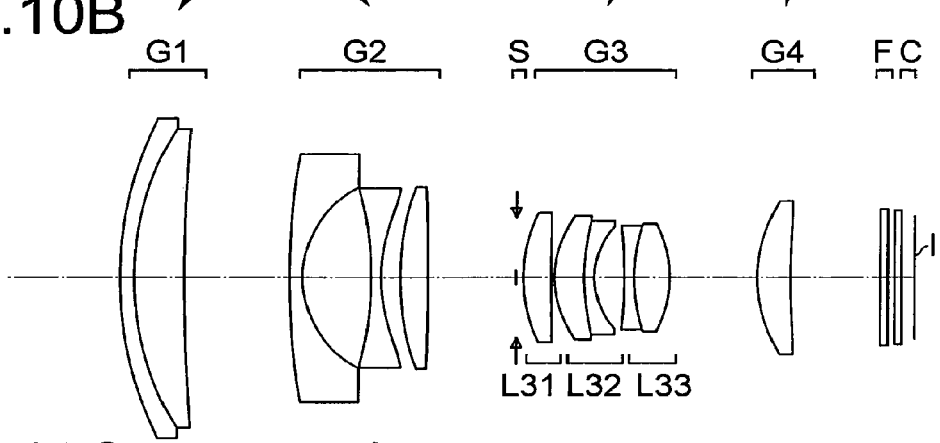
Figure 10C:
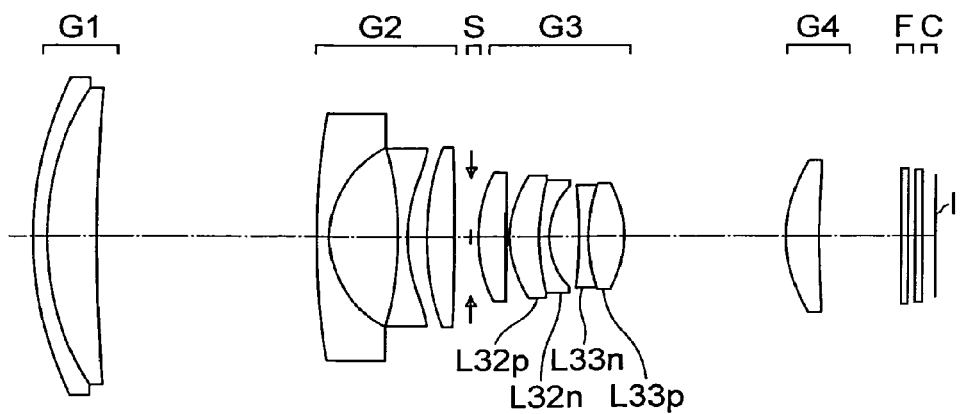

A zoom lens system according to a tenth embodiment, as shown in FIG. 10A, FIG. 10B, and FIG. 10C, includes in order from an object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1, first moves toward the image side, and upon inverting a direction of movement between the wide angle end and the intermediate focal length state, moves toward the object side. The first lens unit G1 is positioned on the object side at the telephoto end, than at the wide angle end.

The second lens unit G2, first moves toward the image side, and upon inverting a direction of movement between the intermediate focal length state and the telephoto end, moves toward the object side. The second lens unit G2 is positioned on the image side at the telephoto end, than at the wide angle end.

The third lens unit G3 moves only toward the object side.

The fourth lens unit G4, first moves toward the object side, and upon inverting a direction of movement between the intermediate focal length state and the telephoto end, moves toward the object side. The fourth lens unit G4 is positioned on the object side at the telephoto end, than at the wide angle end.

In order from the object side, the first lens unit G1 includes a cemented lens of a negative meniscus lens having a convex surface directed toward the object side and a positive meniscus lens having a convex surface directed toward the object side.

The second lens unit G2 includes a negative meniscus lens having a convex surface directed toward the object side, a biconcave negative lens, and a biconvex positive lens.

The third lens unit G3 includes a biconvex positive lens, a cemented lens of a positive meniscus lens having a convex surface directed toward the object side and a negative meniscus lens having a convex surface directed toward the object side, and a cemented lens of a biconcave negative lens and a biconvex positive lens.

The fourth lens unit G4 includes a positive meniscus lens having a convex surface directed toward the object side.

An aspheric surface is used for six surfaces namely, both surfaces of the biconcave negative lens in the second lens unit G2, both surfaces of the biconvex positive lens on the object side and a surface on the image side of the biconvex positive lens on the image side in the third lens unit G3, and a surface on the object side of the positive meniscus lens having the convex surface directed toward the object side in the fourth lens unit G4.

Figure 11A:
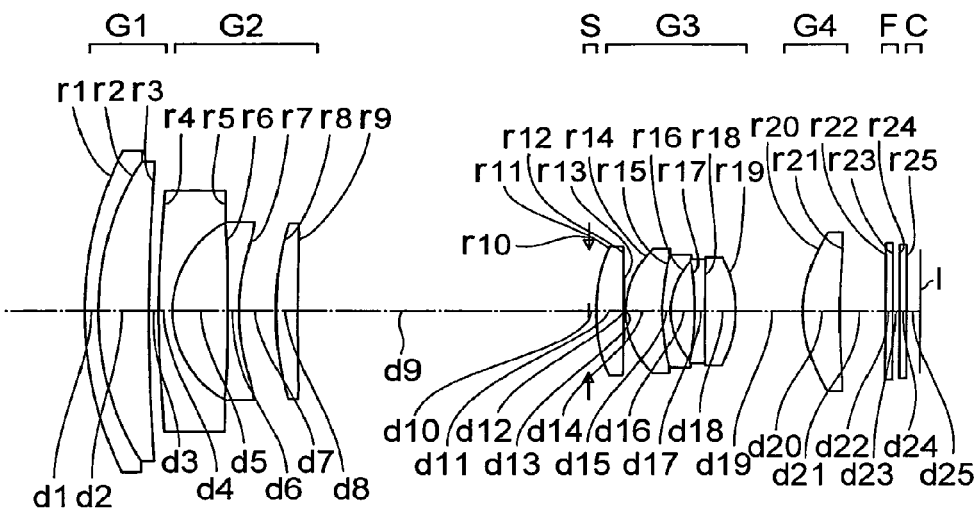
FIG. 11A, FIG. 11B, and FIG. 11C are diagrams similar to FIG. 1A, FIG. 1B, and FIG. 1C respectively, of an eleventh embodiment of the zoom lens system of the present invention.
Figure 11B:
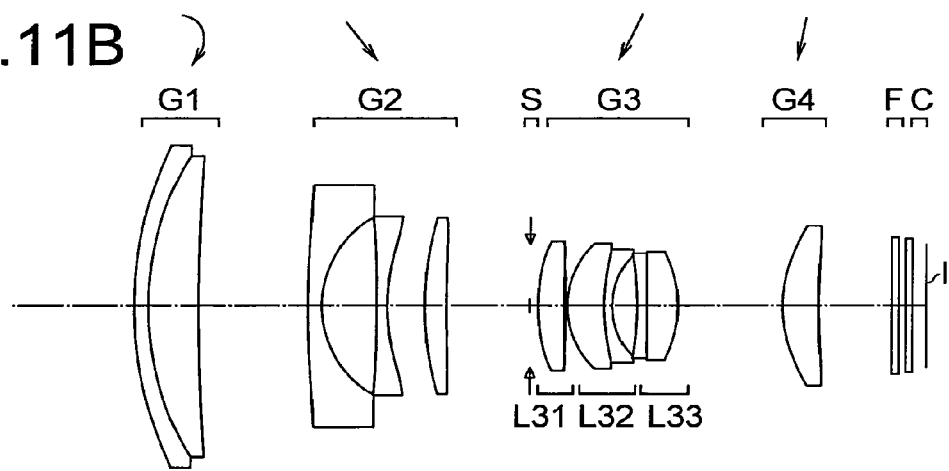
Figure 11C:
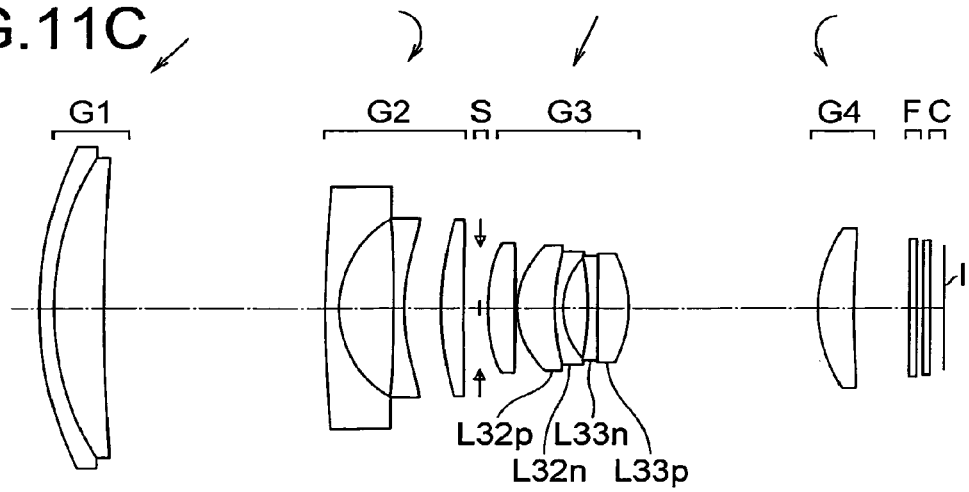
Figure 12A:
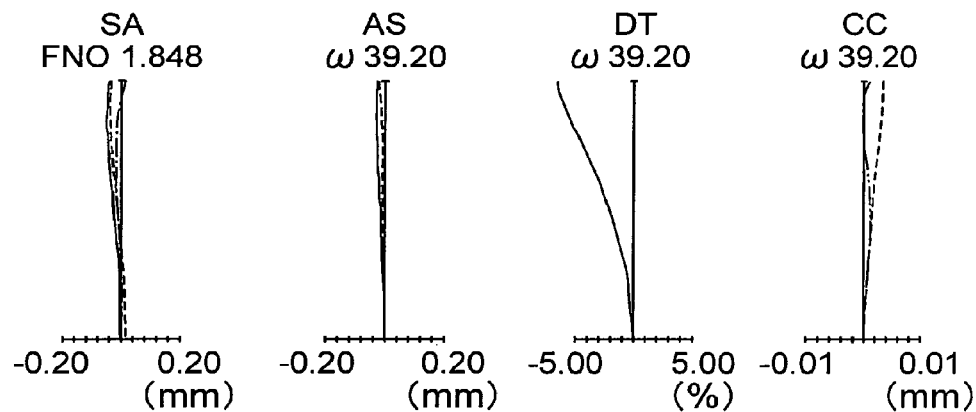
FIG. 12A, FIG. 12B, and FIG. 12C are aberration diagrams at the time of infinite object point focusing, of the first embodiment.
Figure 12B:
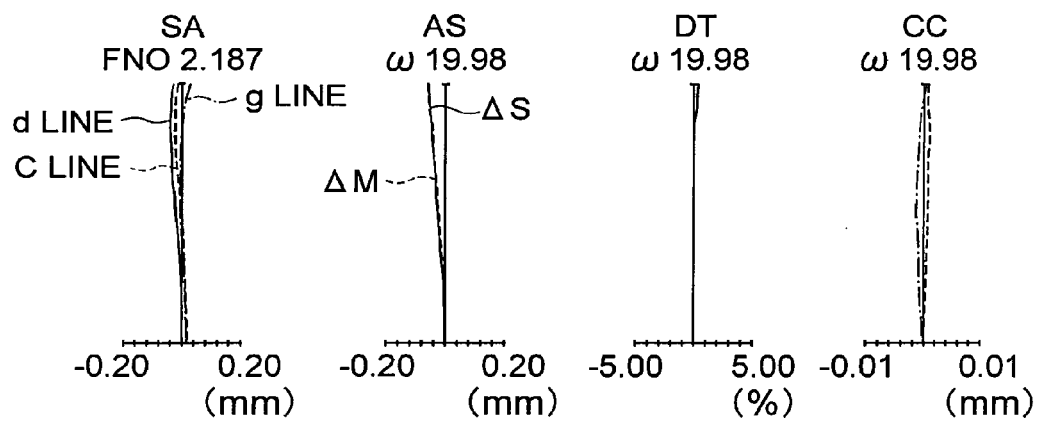
Figure 12C:
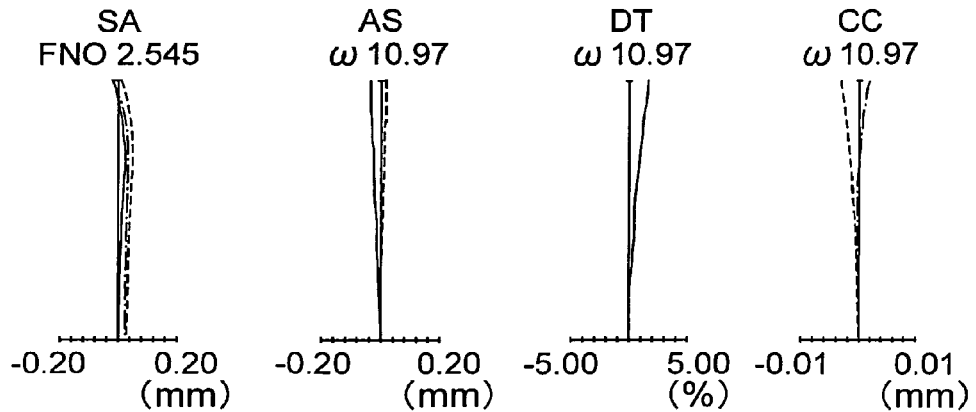
Figure 13A:
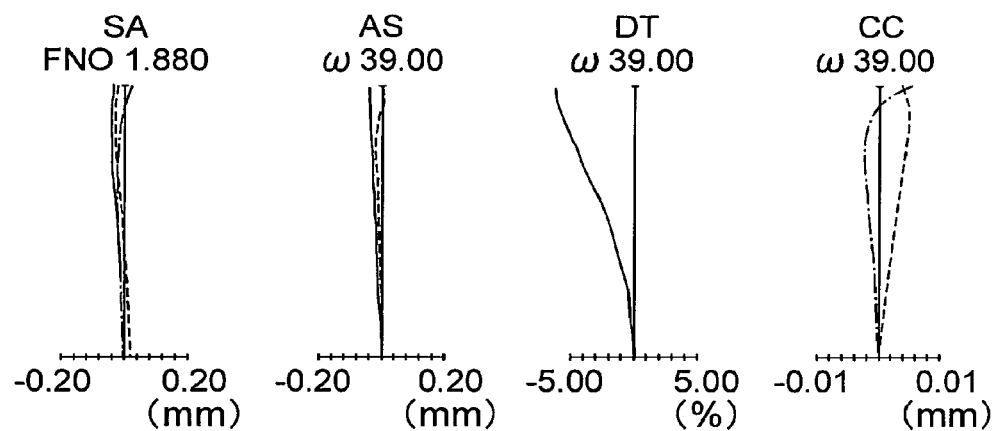
FIG. 13A, FIG. 13B, and FIG. 13C are aberration diagrams at the time of infinite object point focusing, of the second embodiment.
Figure 13B:
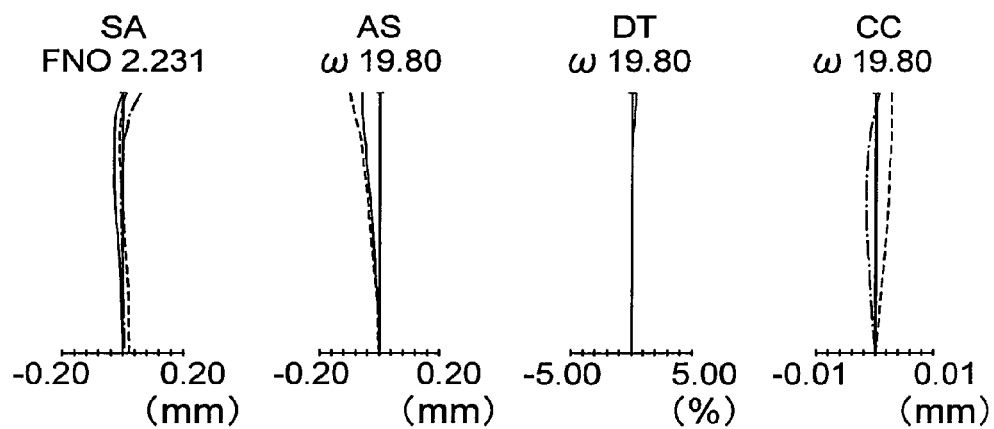
Figure 13C:
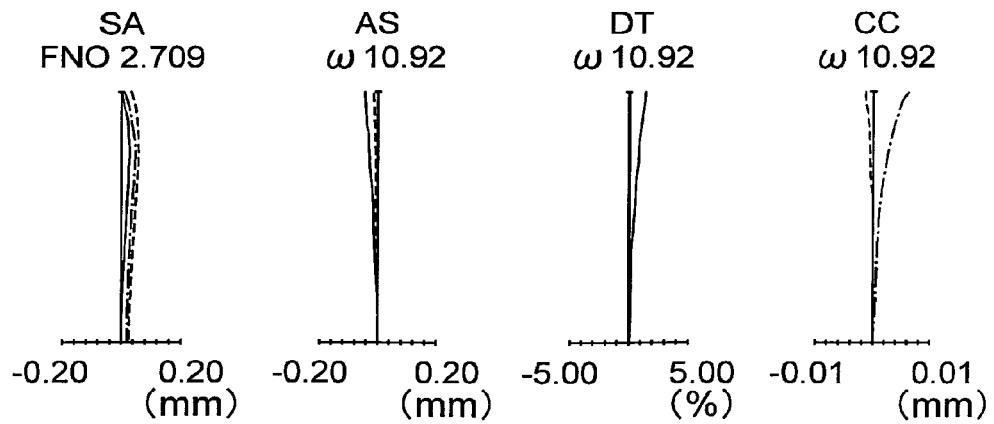
Figure 14A:
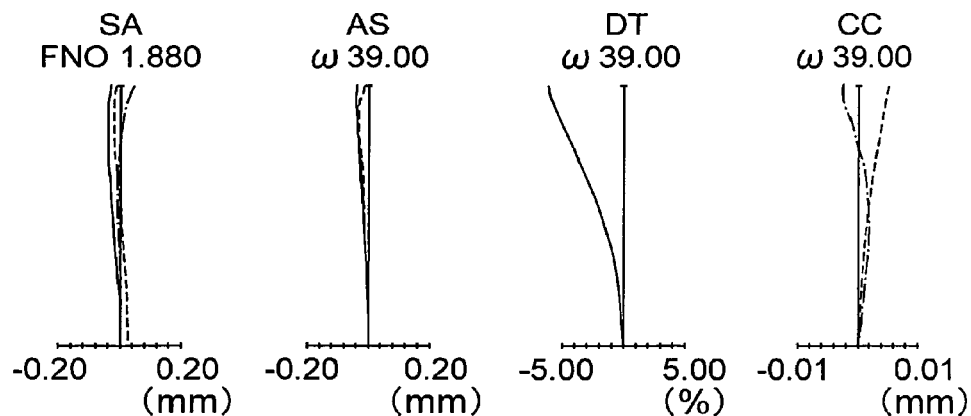
FIG. 14A, FIG. 14B, and FIG. 14C are aberration diagrams at the time of infinite object point focusing, of the third embodiment.
Figure 14B:
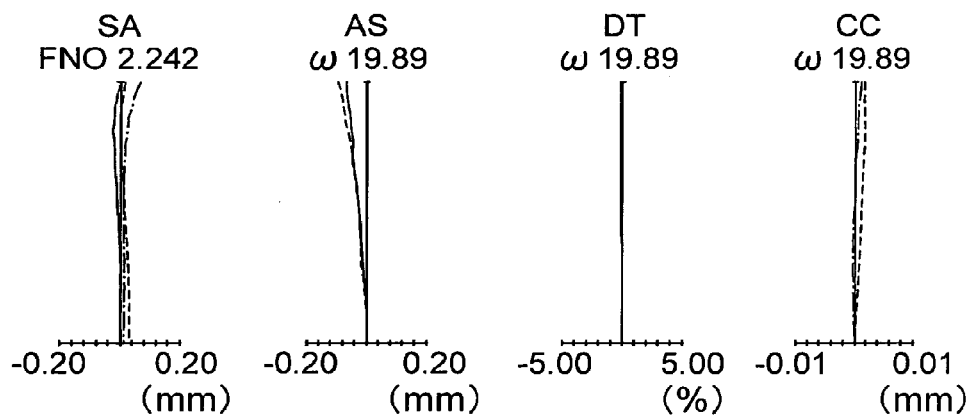
Figure 14C:
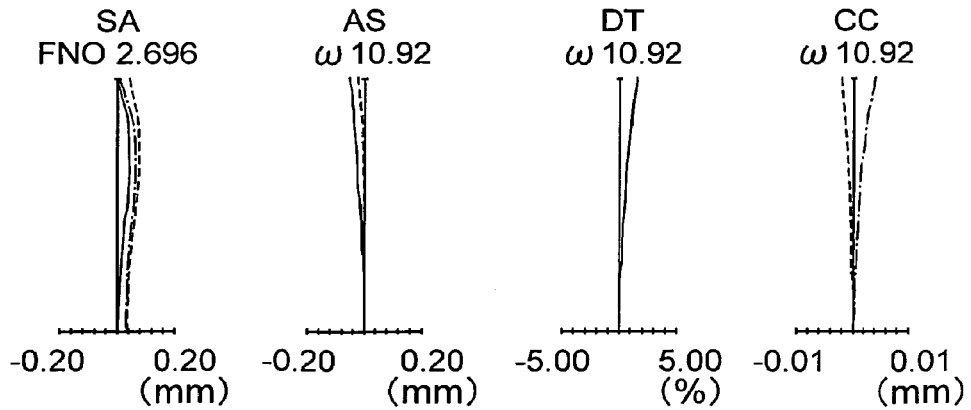
Figure 15A:
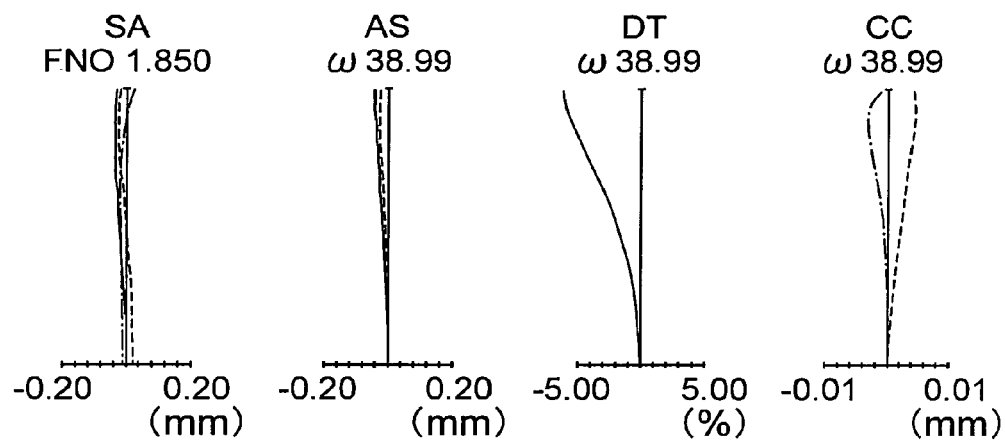
FIG. 15A, FIG. 15B, and FIG. 15C are aberration diagrams at the time of infinite object point focusing, of the fourth embodiment.
Figure 15B:
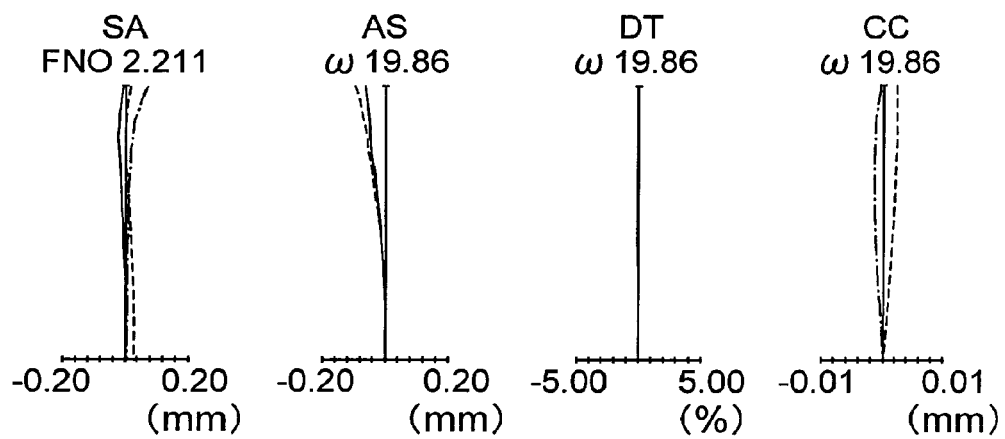
Figure 15C:
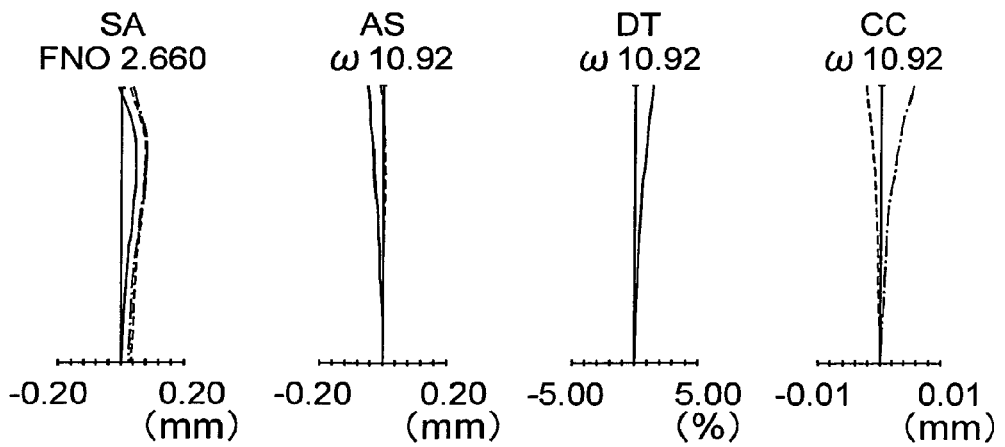
Figure 16A:
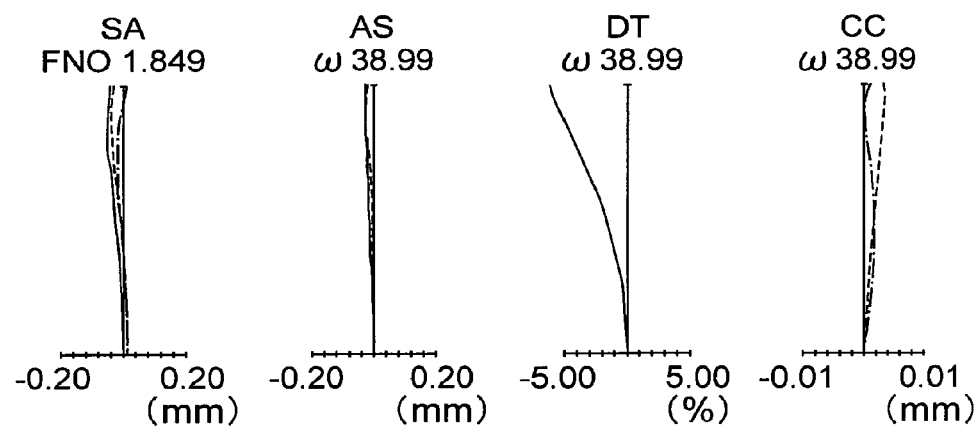
FIG. 16A, FIG. 16B, and FIG. 16C are aberration diagrams at the time of infinite object point focusing, of the fifth embodiment.
Figure 16B:
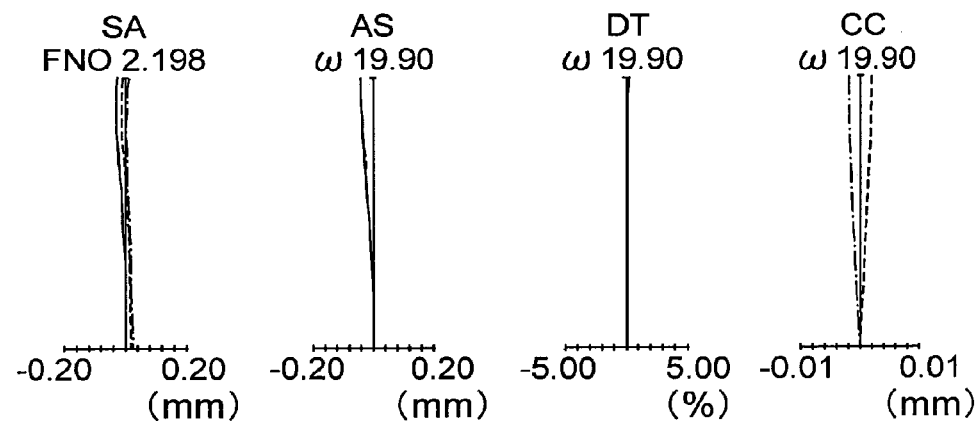
Figure 16C:
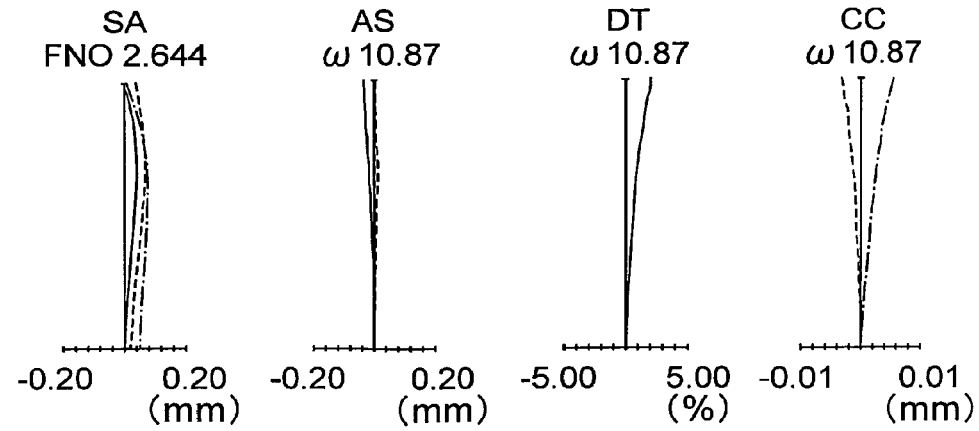
Figure 17A:
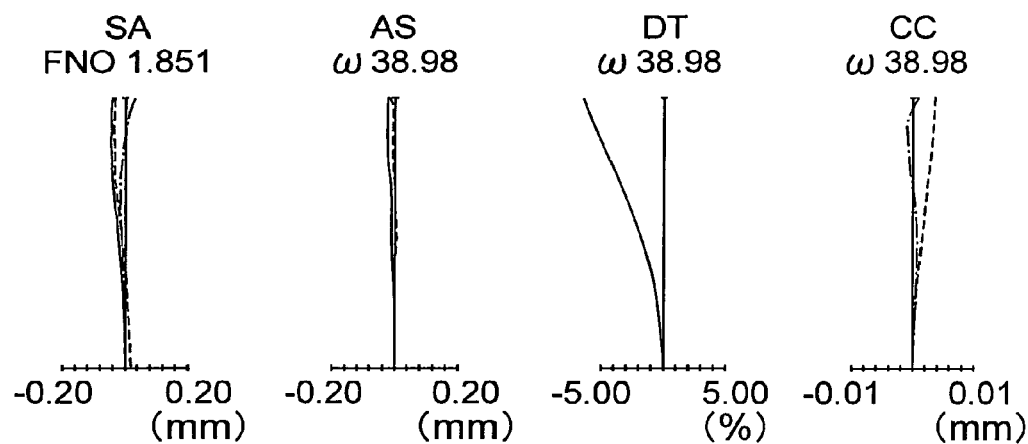
FIG. 17A, FIG. 17B, and FIG. 17C are aberration diagrams at the time of infinite object point focusing, of the sixth embodiment.
Figure 17B:
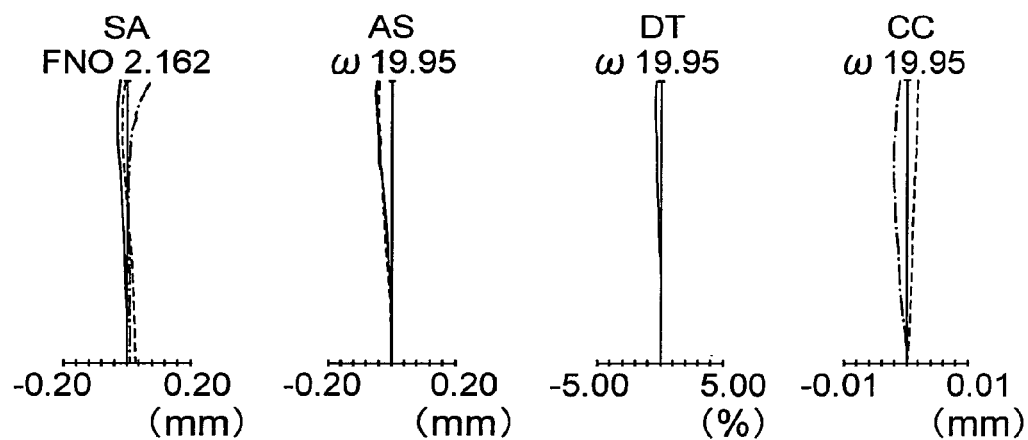
Figure 17C:
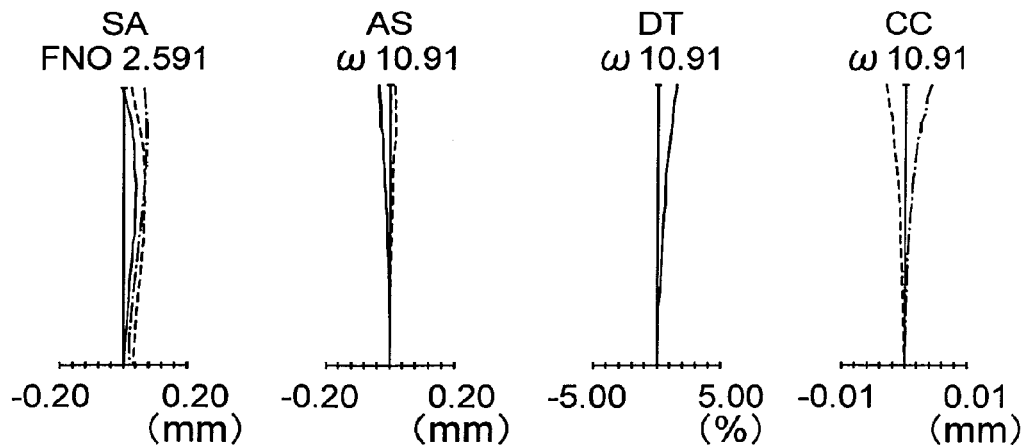
Figure 18A:
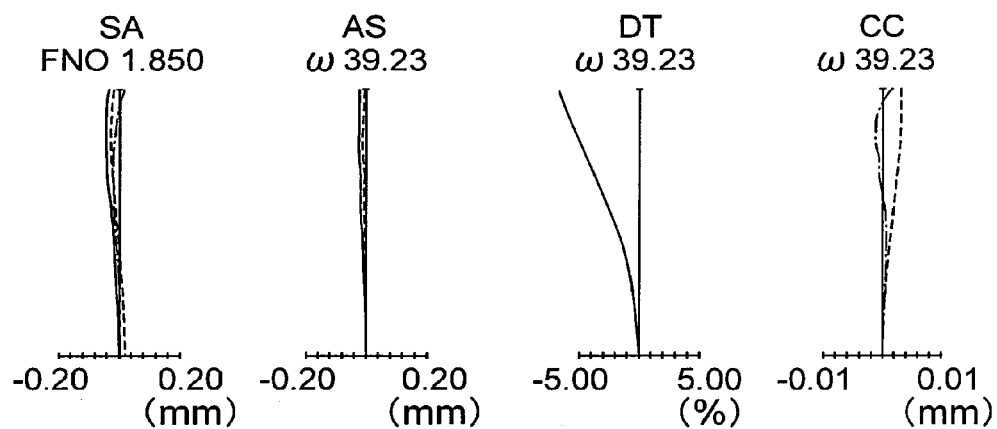
FIG. 18A, FIG. 18B, and FIG. 18C are aberration diagrams at the time of infinite object point focusing of the seventh embodiment.
Figure 18B:
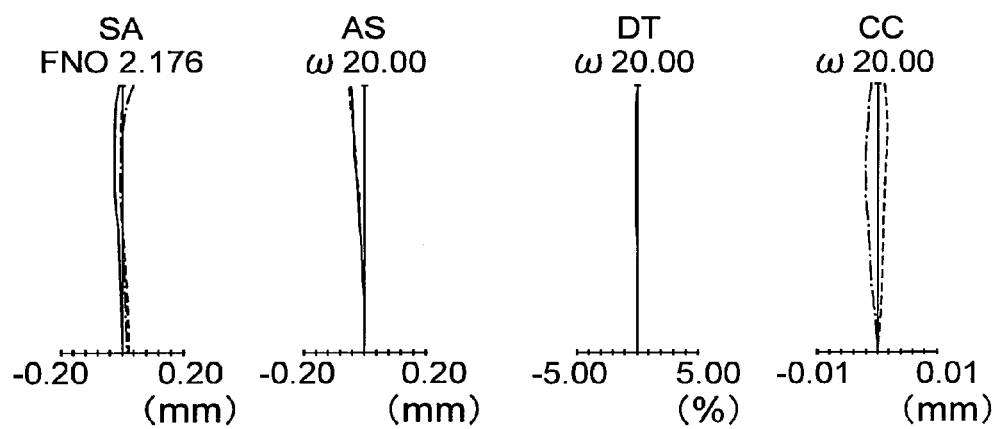
Figure 18C:
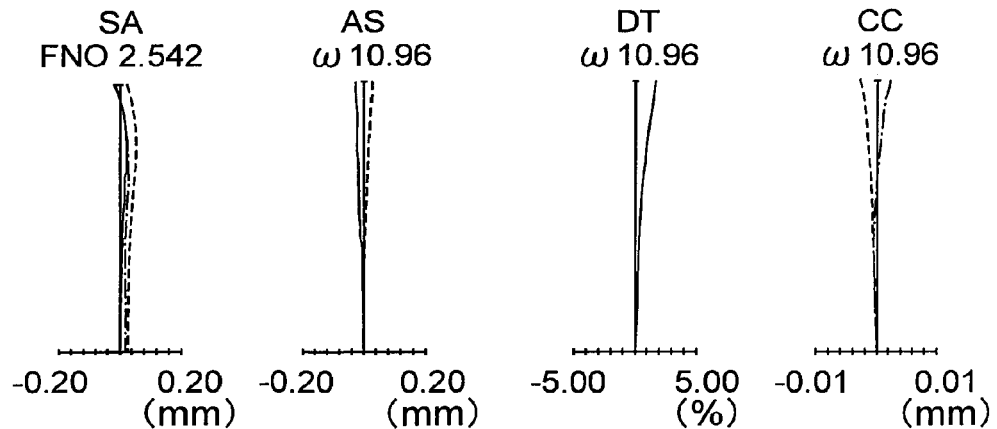
Figure 19A:
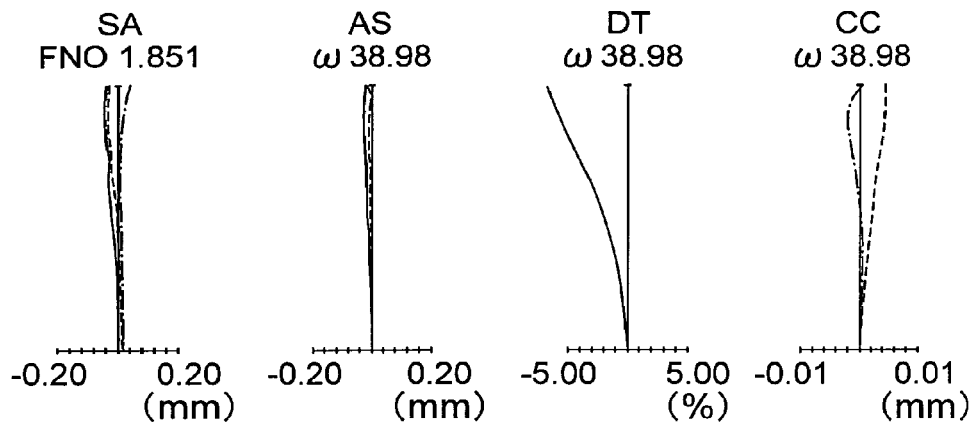
FIG. 19A, FIG. 19B, and FIG. 19C are aberration diagrams at the time of infinite object point focusing of the eighth embodiment.
Figure 19B:
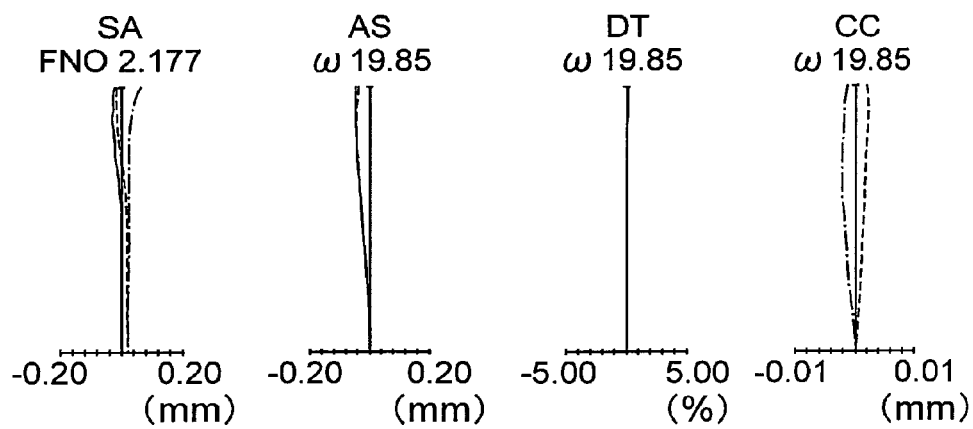
Figure 19C:
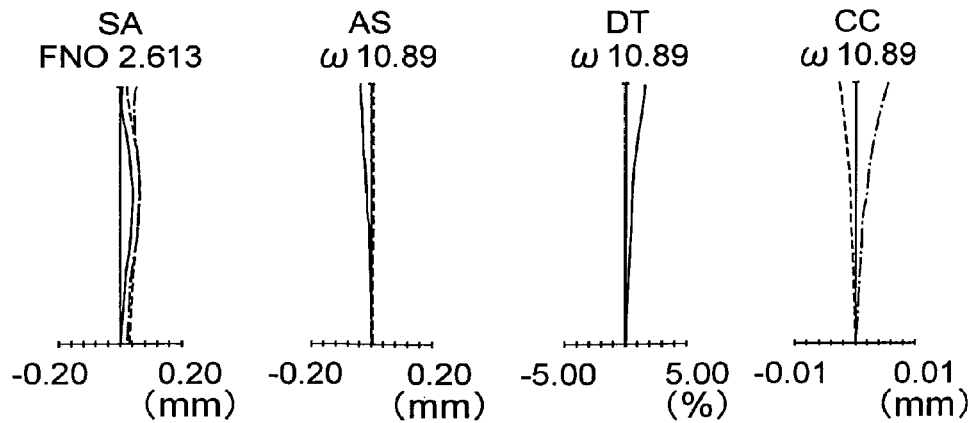
Figure 20A:
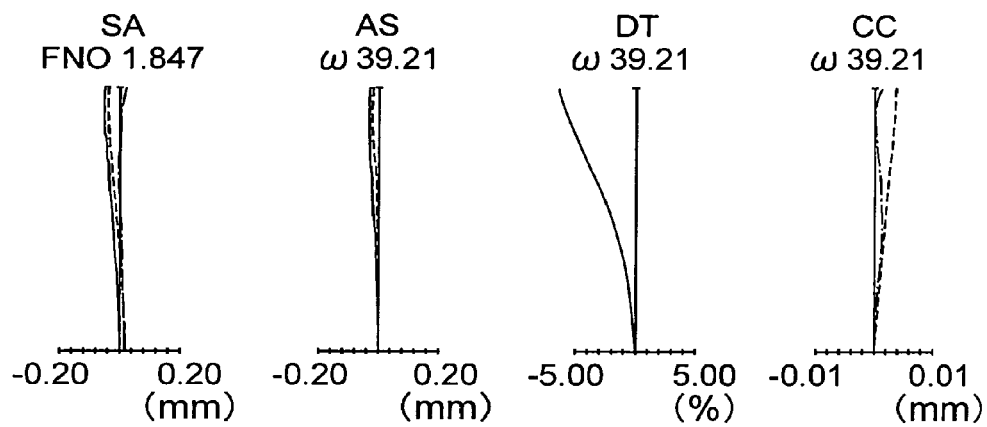
FIG. 20A, FIG. 20B, and FIG. 20C are aberration diagrams at the time of infinite object point focusing of the ninth embodiment.
Figure 20B:
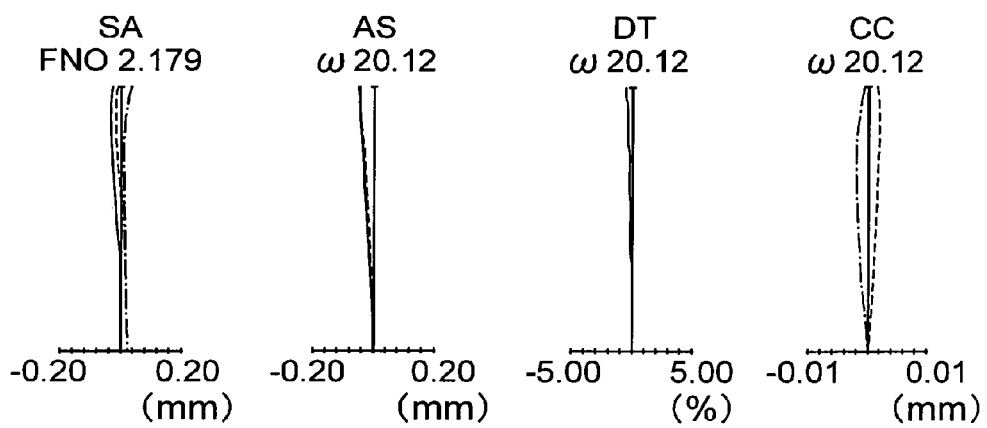
Figure 20C:
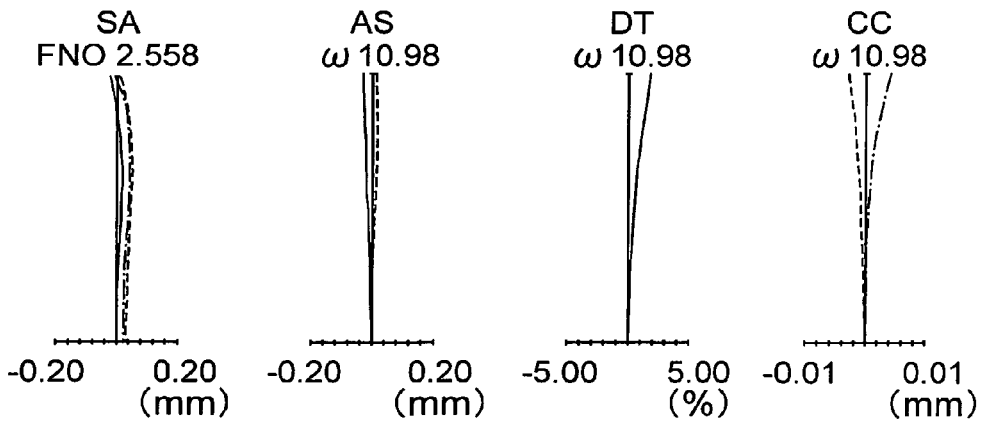
Figure 21A:
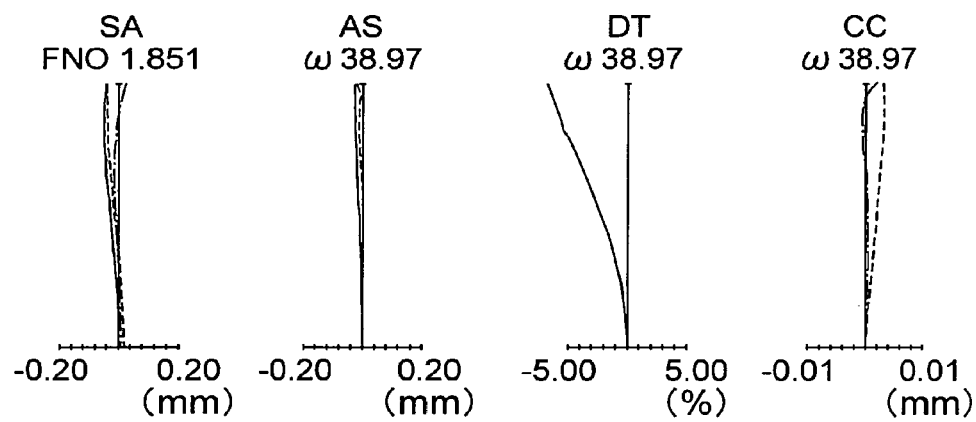
FIG. 21A, FIG. 21B, and FIG. 21C are aberration diagrams at the time of infinite object point focusing of the tenth embodiment.
Figure 21B:
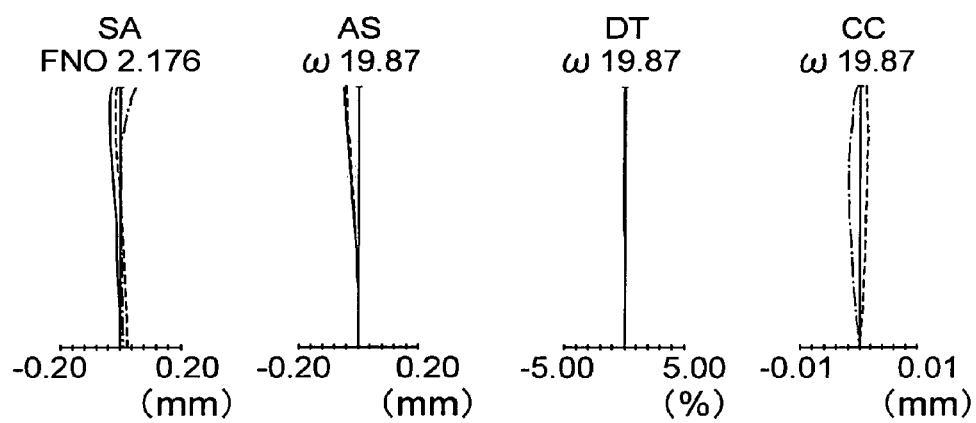
Figure 21C:
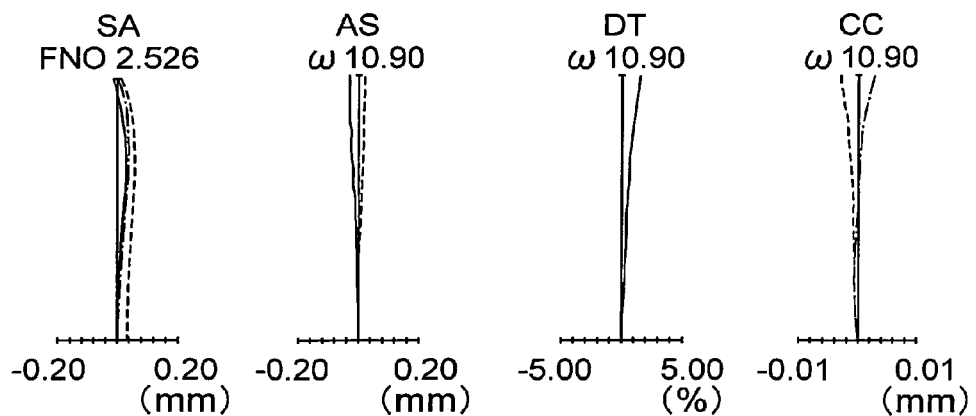
Figure 22A:
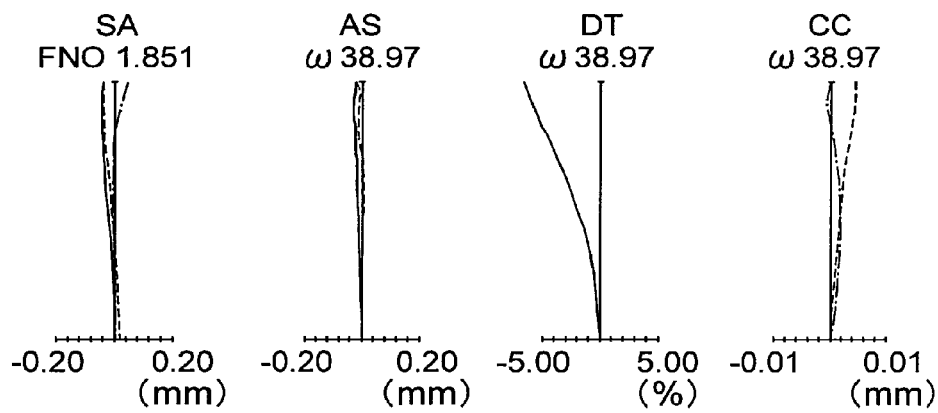
FIG. 22A, FIG. 22B, and FIG. 22C are aberration diagrams at the time of infinite object point focusing of the eleventh embodiment.
Figure 22B:
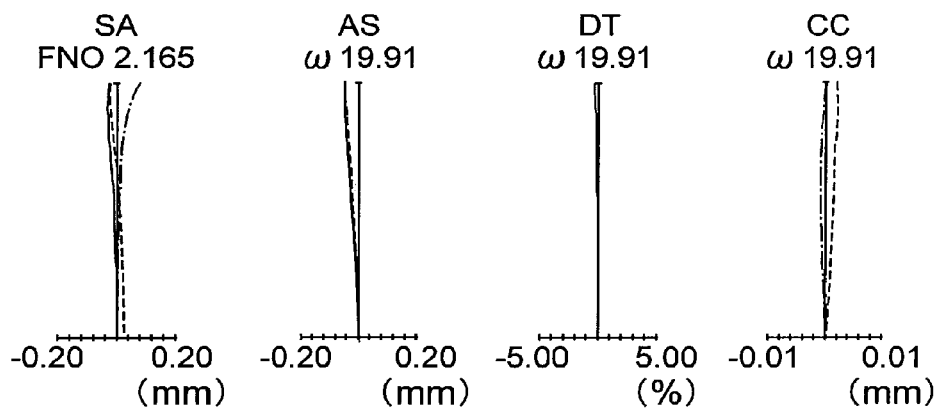
Figure 22C:
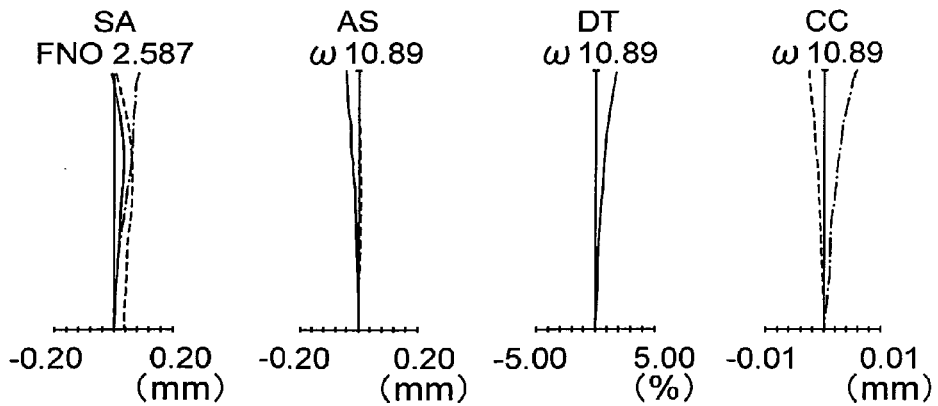

A zoom lens system according to an eleventh embodiment, as shown in FIG. 11A, FIG. 11B, and FIG. 11C, includes in order from an object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1, first moves toward the image side, and upon inverting a direction of movement between the wide angle end and the intermediate focal length state, moves toward the object side. The first lens unit is positioned on the object side at the telephoto end, than at the wide angle end.

The second lens unit G2, first moves toward the image side, and upon inverting a direction of movement between the intermediate focal length state and the telephoto end, moves toward the object side. The second lens unit G2 is positioned on the image side at the telephoto end, than at the wide angle end.

The third lens unit G3 moves only toward the object side.

The fourth lens unit G4, first moves toward the object side, and upon inverting a direction of movement between the intermediate focal length state and the telephoto end, moves toward the object side. The fourth lens unit G4 is positioned on the object side at the telephoto end, than at the wide angle end.

In order from the object side, the first lens unit G1 includes a cemented lens of a negative meniscus lens having a convex surface directed toward the object side and a positive meniscus lens having a convex surface directed toward the object side.

The second lens unit G2 includes a negative meniscus lens having a convex surface directed toward the object side, a negative meniscus lens having a convex surface directed toward the object side, and a positive meniscus lens having a convex surface directed toward the object side.

The third lens unit G3 includes a biconvex positive lens, a cemented lens of a positive meniscus lens having a convex surface directed toward the object side and a biconcave negative lens, and a cemented lens of a negative meniscus lens having a convex surface directed toward the image side and a positive meniscus lens having a convex surface directed toward the image side.

The fourth lens unit G4 includes a positive meniscus lens having a convex surface directed toward the object side.

An aspheric surface is used for six surfaces namely both surfaces of the negative meniscus lens having the convex surface directed toward the object side in the second lens unit G2, both surfaces of the biconvex positive lens on the object side and a surface on the image side of the positive meniscus lens having the convex surface directed toward the image side in the third lens unit G3, and a surface on the object side of the positive meniscus lens having the convex surface directed toward the object side in the fourth lens unit G4.

Numerical data of each embodiment described above is shown below. Apart from symbols described above, f denotes a focal length of the entire zoom lens system, $F_{NO}$ denotes an F number, ω denotes a half angle of field, WE denotes a wide angle end, ST denotes an intermediate state, TE denotes a telephoto end, each of r denotes radius of curvature of each lens surface, each of d denotes a distance between two lenses, each of nd denotes a refractive index of each lens for a d-line, and each of νd denotes an Abbe's number for each lens. Further, * denotes an aspheric data, S denotes a stop.

BF (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$X=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Zoom data of each embodiment are values in a state in which, an object at an infinite object point is focused.

From left, zoom data are values at the wide angle end WE, the intermediate focal length state ST1, the telephoto end TE, a state ST2 between the wide angle end and the intermediate focal length state, a state ST3 between the intermediate focal length state and the telephoto end.

Moreover, aberration diagrams show aberrations at the wide angle end, the intermediate focal length state, and the telephoto end.

Numerical Example 1

Unit: mm

Surface data

| Surface no. | r | d | nd | νd |
|---|---|---|---|---|
| object plane | ∞ | ∞ | | |
| 1 | 32.407 | 1.00 | 1.94595 | 17.98 |
| 2 | 24.711 | 3.71 | 1.81600 | 46.62 |
| 3 | 181.957 | Variable | | |
| 4 | 62.535 | 1.00 | 1.88300 | 40.76 |
| 5 | 8.539 | 4.99 | | |
| 6* | −35.795 | 0.80 | 1.58313 | 59.38 |
| 7* | 15.195 | 1.40 | | |
| 8 | 23.234 | 2.08 | 2.00069 | 25.46 |
| 9 | −202.836 | Variable | | |
| 10(Stop) | ∞ | 0.50 | | |
| 11* | 11.020 | 2.44 | 1.58313 | 59.38 |
| 12* | −53.044 | 0.00 | | |
| 13 | ∞ | 0.10 | | |
| 14 | 9.183 | 2.40 | 1.80100 | 34.97 |
| 15 | 17.413 | 0.70 | 1.80518 | 25.42 |
| 16 | 6.265 | 1.80 | | |
| 17 | −40.899 | 0.70 | 1.69895 | 30.13 |
| 18 | 12.775 | 2.64 | 1.49700 | 81.61 |
| 19* | −10.249 | Variable | | |
| 20* | 12.126 | 2.49 | 1.49700 | 81.54 |
| 21 | 63.255 | Variable | | |
| 22 | ∞ | 0.50 | 1.54771 | 62.84 |
| 23 | ∞ | 0.50 | | |
| 24 | ∞ | 0.50 | 1.51633 | 64.14 |
| 25 | ∞ | 1.01 | | |
| Image plane (Light receiving surface) | ∞ | | | |

Aspherical surface data

6th surface k = 0.000
A4 = 8.82324e−05, A6 = −3.16588e−06, A8 = 3.95523e−08,
A10 = −3.06841e−10

7th surface k = 0.000
A4 = −2.34654e−05, A6 = −3.40520e−06, A8 = 3.18367e−08,
A10 = −1.86747e−10

11th surface k = 0.000
A4 = −5.09661e−05, A6 = −4.13815e−08, A8 = −5.03716e−09,

12th surface k = 0.000
A4 = 1.14214e−04, A6 = 8.07123e−08

19th surface k = 0.000
A4 = −8.26476e−06, A63.14592e−07 =, A8 = −8.73717e−08

20th surface k = 0.000
A4 = −2.99323e−05, A6 = 2.94977e−08

Zoom data(∞)

| | WE | ST1 | TE | ST2 | ST3 |
|---|---|---|---|---|---|
| Focal length | 6.06 | 12.72 | 23.50 | 8.22 | 18.76 |
| Fno. | 1.85 | 2.19 | 2.54 | 1.97 | 2.39 |
| Angle of field 2ω | 78.41 | 39.96 | 21.95 | 59.83 | 27.50 |
| fb (in air) | 7.33 | 8.97 | 8.27 | 8.10 | 9.19 |
| Total length (in air) | 60.49 | 57.99 | 65.85 | 57.26 | 62.17 |
| d3 | 0.30 | 7.62 | 16.02 | 2.82 | 12.89 |
| d9 | 21.11 | 6.50 | 1.10 | 13.63 | 2.44 |
| d19 | 3.00 | 6.15 | 11.72 | 3.96 | 8.90 |
| d21 | 5.17 | 6.82 | 6.10 | 5.94 | 7.03 |

Unit focal length

| f1 = 50.47 | f2 = −11.67 | f3 = 16.15 | f4 = 29.71 |
|---|---|---|---|

Numerical Example 2

Unit: mm

Surface data

| Surface no. | r | d | nd | νd |
|---|---|---|---|---|
| object plane | ∞ | ∞ | | |
| 1 | 34.234 | 1.00 | 1.94595 | 17.98 |
| 2 | 26.431 | 3.40 | 1.81600 | 46.62 |
| 3 | 304.697 | Variable | | |

-continued

Unit: mm

| | | | | |
|---|---|---|---|---|
| 4 | 58.742 | 1.00 | 1.88300 | 40.76 |
| 5 | 8.027 | 4.28 | | |
| 6* | −37.316 | 1.00 | 1.69350 | 53.21 |
| 7* | 27.854 | 1.53 | | |
| 8 | 25.275 | 1.91 | 1.92286 | 20.88 |
| 9 | −1287.866 | Variable | | |
| 10(Stop) | ∞ | 0.50 | | |
| 11* | 14.062 | 2.11 | 1.85135 | 40.10 |
| 12* | −229.434 | 0.01 | | |
| 13 | ∞ | 0.16 | | |
| 14 | 8.396 | 2.43 | 1.58913 | 61.14 |
| 15 | 25.547 | 0.70 | 1.74077 | 27.79 |
| 16 | 6.543 | 1.66 | | |
| 17 | −45.415 | 0.70 | 1.76182 | 26.52 |
| 18 | 13.788 | 2.50 | 1.58313 | 59.38 |
| 19* | −12.682 | Variable | | |
| 20* | 14.086 | 3.00 | 1.74320 | 49.34 |
| 21 | −61.445 | 0.80 | 1.69895 | 30.13 |
| 22 | 50.317 | Variable | | |
| 23 | ∞ | 0.50 | 1.54771 | 62.84 |
| 24 | ∞ | 0.50 | | |
| 25 | ∞ | 0.50 | 1.51633 | 64.14 |
| 26 | ∞ | 1.02 | | |
| Image plane (Light receiving surface) | ∞ | | | |

Aspherical surface data

6th surface k = 0.000
A4 = 1.22305e−04, A6 = −3.78786e−06, A8 = 1.63670e−08,
A10 = −3.83663e−10
7th surface k = 0.000
A4 = 4.70833e−05, A6 = −3.49825e−06, A8 = −1.99464e−08,
A10 = 2.89545e−10
11th surface k = −0.862
A4 = 5.16574e−05, A6 = 1.85386e−07,
12th surface k = 0.000
A4 = 9.42257e−05
19th surface k = 0.000
A4 = 1.62253e−05, A6 = 1.15227e−07
20th surface k = 0.000
A4 = −5.48767e−06

Zoom data(∞)

| | WE | ST1 | TE | ST2 | ST3 |
|---|---|---|---|---|---|
| Focal length | 6.06 | 12.73 | 23.49 | 8.18 | 18.78 |
| Fno. | 1.88 | 2.23 | 2.71 | 2.00 | 2.51 |
| Angle of field 2ω | 78.00 | 39.61 | 21.84 | 59.63 | 27.44 |
| fb (in air) | 5.41 | 7.35 | 7.15 | 6.33 | 8.09 |
| Total length (in air) | 59.89 | 59.47 | 68.50 | 57.53 | 63.90 |
| d3 | 0.48 | 7.72 | 14.78 | 2.99 | 11.70 |
| d9 | 19.49 | 6.24 | 1.19 | 12.74 | 2.09 |

-continued

Unit: mm

| | | | | | |
|---|---|---|---|---|---|
| d19 | 5.81 | 9.46 | 16.68 | 6.78 | 13.34 |
| d22 | 3.23 | 5.18 | 4.97 | 4.16 | 5.91 |

Unit focal length

| f1 = 49.36 | f2 = −10.76 | f3 = 15.93 | f4 = 24.31 |

Numerical Example 3

Unit: mm

Surface data

| Surface no. | r | d | nd | νd |
|---|---|---|---|---|
| object plane | ∞ | ∞ | | |
| 1 | 37.516 | 1.00 | 1.94595 | 17.98 |
| 2 | 28.269 | 3.65 | 1.81600 | 46.62 |
| 3 | 308.051 | Variable | | |
| 4 | 85.041 | 1.00 | 1.88300 | 40.76 |
| 5 | 8.923 | 4.16 | | |
| 6* | −199.432 | 1.00 | 1.59201 | 67.02 |
| 7* | 14.964 | 2.30 | | |
| 8 | 20.381 | 2.02 | 1.92286 | 20.88 |
| 9 | 76.402 | Variable | | |
| 10(Stop) | ∞ | 0.50 | | |
| 11* | 13.680 | 2.11 | 1.85135 | 40.10 |
| 12* | −448.191 | 0.00 | | |
| 13 | ∞ | 0.10 | | |
| 14 | 8.472 | 2.34 | 1.65160 | 58.55 |
| 15 | 25.860 | 0.70 | 1.74077 | 27.79 |
| 16 | 6.299 | 1.87 | | |
| 17 | −39.809 | 0.70 | 1.78472 | 25.68 |
| 18 | 15.491 | 2.60 | 1.58313 | 59.38 |
| 19* | −12.041 | Variable | | |
| 20* | 11.431 | 2.80 | 1.49700 | 81.54 |
| 21 | 83.333 | Variable | | |
| 22 | ∞ | 0.50 | 1.54771 | 62.84 |
| 23 | ∞ | 0.50 | | |
| 24 | ∞ | 0.50 | 1.51633 | 64.14 |
| 25 | ∞ | 1.02 | | |
| Image plane (Light receiving surface) | ∞ | | | |

Aspherical surface data

6th surface k = 0.000
A4 = 1.83861e−04, A6 = −4.87899e−06, A8 = 5.56765e−08,
A10 = −4.48996e−10
6th surface
7th surface k = 0.000
A4 = 8.73933e−05, A6 = −5.31729e−06, A8 = 3.79977e−08,
A10 = −2.41882e−10
11th surface k = 0.000
A4 = 2.06870e−05, A6 = 1.06760e−07
12th surface k = 0.000
A4 = 1.05879e−04
19th surface k = 0.000
A4 = 2.54312e−05, A6 = 2.25398e−08

-continued

Unit: mm

20th surface k = 0.000
A4 = −2.05812e−05

Zoom data(∞)

|  | WE | ST1 | TE | ST2 | ST3 |
|---|---|---|---|---|---|
| Focal length | 6.06 | 12.73 | 23.49 | 8.18 | 18.79 |
| Fno. | 1.88 | 2.24 | 2.70 | 2.00 | 2.52 |
| Angle of field 2ω | 77.99 | 39.78 | 21.84 | 59.61 | 27.53 |
| fb (in air) | 5.67 | 7.66 | 7.18 | 6.59 | 8.33 |
| Total length (in air) | 61.42 | 60.78 | 70.68 | 59.16 | 65.58 |
| d3 | 0.73 | 8.38 | 16.98 | 3.59 | 12.88 |
| d9 | 20.29 | 6.35 | 1.47 | 13.32 | 2.16 |
| d19 | 5.89 | 9.55 | 16.20 | 6.82 | 13.36 |
| d21 | 3.50 | 5.48 | 5.00 | 4.42 | 6.16 |

Unit focal length

| f1 = 55.03 | f2 = −11.03 | f3 = 15.85 | f4 = 26.32 |
|---|---|---|---|

Numerical Example 4

Unit: mm

Surface data

| Surface no. | r | d | nd | vd |
|---|---|---|---|---|
| object plane | ∞ | ∞ |  |  |
| 1 | 37.599 | 1.00 | 1.94595 | 17.98 |
| 2 | 28.758 | 3.40 | 1.81600 | 46.62 |
| 3 | 326.912 | Variable |  |  |
| 4 | 69.595 | 1.00 | 1.88300 | 40.76 |
| 5 | 8.468 | 4.32 |  |  |
| 6* | −55.584 | 0.80 | 1.58313 | 59.38 |
| 7* | 20.238 | 2.05 |  |  |
| 8 | 23.491 | 1.57 | 1.92286 | 20.88 |
| 9 | 143.909 | Variable |  |  |
| 10(Stop) | ∞ | 0.50 |  |  |
| 11* | 14.093 | 2.09 | 1.85135 | 40.10 |
| 12* | −220.843 | 0.00 |  |  |
| 13 | ∞ | 0.10 |  |  |
| 14 | 8.187 | 2.38 | 1.65160 | 58.55 |
| 15 | 20.827 | 0.60 | 1.75520 | 27.51 |
| 16 | 6.246 | 1.89 |  |  |
| 17 | −35.712 | 0.60 | 1.74077 | 27.79 |
| 18 | 12.006 | 2.60 | 1.58313 | 59.38 |
| 19* | −11.961 | Variable |  |  |
| 20* | 11.612 | 2.80 | 1.49700 | 81.54 |
| 21 | 90.909 | Variable |  |  |
| 22 | ∞ | 0.50 | 1.54771 | 62.84 |
| 23 | ∞ | 0.50 |  |  |
| 24 | ∞ | 0.50 | 1.51633 | 64.14 |
| 25 | ∞ | 1.02 |  |  |
| Image plane (Light receiving surface) | ∞ |  |  |  |

Aspherical surface data

6th surface k = 0.000
A4 = 1.65903e−04, A6 = −4.84257e−06, A8 = 3.83218e−08,
A10 = −3.82278e−10

-continued

Unit: mm

7th surface k = 0.000
A4 = 7.51457e−05, A6 = −4.81271e−06, A8 = 6.36274e−09,
A10 = 9.70635e−11
11th surface k = 0.000
A4 = 1.63367e−05, A6 = 7.98464e−08
12th surface k = 0.000
A4 = 9.89562e−05
19th surface k = 0.000
A4 = 2.58997e−05, A6 = −2.09003e−07
20th surface k = 0.000
A4 = −1.87694e−05

Zoom data(∞)

|  | WE | ST1 | TE | ST2 | ST3 |
|---|---|---|---|---|---|
| Focal length | 6.06 | 12.75 | 23.49 | 8.21 | 18.78 |
| Fno. | 1.85 | 2.21 | 2.66 | 1.97 | 2.47 |
| Angle of field 2ω | 77.99 | 39.72 | 21.84 | 59.38 | 27.46 |
| fb (in air) | 5.65 | 7.65 | 7.20 | 6.55 | 8.21 |
| Total length (in air) | 60.03 | 59.08 | 68.76 | 57.73 | 64.04 |
| d3 | 0.81 | 8.28 | 16.74 | 3.67 | 13.13 |
| d9 | 20.18 | 6.19 | 1.28 | 13.18 | 2.20 |
| d19 | 5.69 | 9.27 | 15.85 | 6.64 | 12.81 |
| d21 | 3.48 | 5.48 | 5.03 | 4.38 | 6.03 |

Unit focal length

| f1 = 54.55 | f2 = −11.10 | f3 = 15.67 | f4 = 26.48 |
|---|---|---|---|

Numerical Example 5

Unit: mm

Surface data

| Surface no. | r | d | nd | vd |
|---|---|---|---|---|
| object plane | ∞ | ∞ |  |  |
| 1 | 32.479 | 1.00 | 1.94595 | 17.98 |
| 2 | 24.920 | 3.63 | 1.81600 | 46.62 |
| 3 | 181.444 | Variable |  |  |
| 4 | 82.126 | 1.00 | 1.88300 | 40.76 |
| 5 | 8.608 | 3.75 |  |  |
| 6* | −461.718 | 0.80 | 1.58313 | 59.38 |
| 7* | 14.319 | 2.80 |  |  |
| 8 | 25.709 | 1.61 | 1.92286 | 20.88 |
| 9 | 444.290 | Variable |  |  |
| 10(Stop) | ∞ | 0.50 |  |  |
| 11* | 11.650 | 2.65 | 1.74320 | 49.34 |
| 12* | −64.594 | 0.00 |  |  |
| 13 | ∞ | 0.10 |  |  |
| 14 | 7.535 | 2.52 | 1.49700 | 81.54 |
| 15 | 18.245 | 0.60 | 1.75520 | 27.51 |
| 16 | 5.784 | 2.09 |  |  |
| 17 | −26.961 | 0.59 | 1.84666 | 23.78 |
| 18 | 75.476 | 1.92 | 1.49700 | 81.54 |
| 19* | −10.082 | Variable |  |  |
| 20* | 12.332 | 2.30 | 1.58313 | 59.38 |
| 21 | 49.198 | Variable |  |  |
| 22 | ∞ | 0.50 | 1.54771 | 62.84 |
| 23 | ∞ | 0.50 |  |  |

-continued

Unit: mm

| | | | | |
|---|---|---|---|---|
| 24 | ∞ | 0.50 | 1.51633 | 64.14 |
| 25 | ∞ | 1.00 | | |
| Image plane (Light receiving surface) | ∞ | | | |

Aspherical surface data

6th surface k = 0.000
A4 = −1.34305e−04, A6 = −3.35475e−08, A8 = 2.12158e−08,
A10 = −3.98495e−10

7th surface k = 0.000
A4 = −2.72863e−04, A6 = 1.41606e−08, A8 = 7.26216e−09,
A10 = −2.57845e−10

11th surface k = 0.000
A4 = −2.26557e−05, A6 = 3.87409e−08

12th surface k = 0.000
A4 = 1.03062e−04

19th surface k = 0.000
A4 = 1.10738e−04, A6 = 1.58748e−07

20th surface k = 0.000
A4 = 4.43250e−06, A6 = 1.78804e−07

Zoom data(∞)

| | WE | ST1 | TE | ST2 | ST3 |
|---|---|---|---|---|---|
| Focal length | 6.05 | 12.70 | 23.48 | 8.21 | 18.74 |
| Fno. | 1.85 | 2.20 | 2.64 | 1.96 | 2.45 |
| Angle of field 2ω | 77.99 | 39.80 | 21.74 | 59.43 | 27.44 |
| fb (in air) | 5.81 | 7.65 | 6.15 | 6.84 | 7.71 |
| Total length (in air) | 60.06 | 57.43 | 65.90 | 56.75 | 61.72 |
| d3 | 0.85 | 7.94 | 16.10 | 3.52 | 12.82 |
| d9 | 21.10 | 6.57 | 1.91 | 13.58 | 2.68 |
| d19 | 4.43 | 7.40 | 13.88 | 4.94 | 10.64 |
| d21 | 3.66 | 5.50 | 3.99 | 4.69 | 5.56 |

Unit focal length

| f1 = 50.57 | f2 = −11.30 | f3 = 15.49 | f4 = 27.59 |
|---|---|---|---|

Numerical Example 6

Unit: mm

Surface data

| Surface no. | r | d | nd | vd |
|---|---|---|---|---|
| object plane | ∞ | ∞ | | |
| 1 | 32.304 | 1.00 | 1.94595 | 17.98 |
| 2 | 24.943 | 3.64 | 1.81600 | 46.62 |
| 3 | 172.655 | Variable | | |
| 4 | 71.002 | 1.00 | 1.88300 | 40.76 |
| 5 | 8.475 | 4.64 | | |
| 6* | −53.111 | 0.80 | 1.58313 | 59.38 |
| 7* | 14.386 | 1.69 | | |
| 8 | 26.088 | 1.95 | 2.00069 | 25.46 |
| 9 | −134.426 | Variable | | |
| 10(Stop) | ∞ | 0.50 | | |
| 11* | 13.456 | 2.07 | 1.85135 | 40.10 |
| 12* | −118.344 | 0.00 | | |
| 13 | ∞ | 0.10 | | |
| 14 | 7.116 | 2.48 | 1.49700 | 81.54 |
| 15 | 17.554 | 0.60 | 1.80518 | 25.42 |
| 16 | 5.880 | 1.75 | | |
| 17 | −29.806 | 0.60 | 1.75520 | 27.51 |
| 18 | 19.475 | 2.65 | 1.58313 | 59.38 |
| 19* | −11.467 | Variable | | |
| 20* | 11.705 | 2.67 | 1.49700 | 81.54 |
| 21 | 129.496 | Variable | | |
| 22 | ∞ | 0.50 | 1.54771 | 62.84 |
| 23 | ∞ | 0.50 | | |
| 24 | ∞ | 0.50 | 1.51633 | 64.14 |
| 25 | ∞ | 1.02 | | |
| Image plane (Light receiving surface) | ∞ | | | |

Aspherical surface data

6th surface k = 0.000
A4−1.28981e−04=, A6 = 2.69614e−06, A8 = −4.77413e−08,
A10 = 1.62318e−10

7th surface k = 0.000
A4 = −2.71603e−04, A6 = 2.76804e−06, A8 = −6.52305e−08,
A10 = 3.78272e−10

11th surface k = 0.000
A4 = 7.65870e−06, A6 = −4.40696e−07, A8 = −3.41785e−09

12th surface k = 0.000
A4 = 9.62632e−05, A6 = −6.84479e−07

19th surface k = 0.000
A4 = 3.81210e−05, A6 = 2.22804e−07, A8 = −2.27952e−08

20th surface k = 0.000
A4 = −1.04608e−05, A6 = 4.43120e−08

Zoom data(∞)

| | WE | ST1 | TE | ST2 | ST3 |
|---|---|---|---|---|---|
| Focal length | 6.07 | 12.73 | 23.52 | 8.23 | 18.79 |
| Fno. | 1.85 | 2.16 | 2.59 | 1.95 | 2.39 |
| Angle of field 2ω | 77.96 | 39.90 | 21.81 | 59.40 | 27.49 |
| fb (in air) | 5.84 | 7.68 | 6.44 | 6.73 | 7.81 |
| Total length (in air) | 60.37 | 57.46 | 65.71 | 57.26 | 61.62 |
| d3 | 0.46 | 7.90 | 15.96 | 3.38 | 12.87 |
| d9 | 21.11 | 6.06 | 1.08 | 13.53 | 1.98 |

-continued

Unit: mm

| | | | | | |
|---|---|---|---|---|---|
| d19 | 4.84 | 7.68 | 14.10 | 5.48 | 10.83 |
| d21 | 3.67 | 5.51 | 4.26 | 4.56 | 5.64 |

Unit focal length

| | | | |
|---|---|---|---|
| f1 = 50.70 | f2 = −11.72 | f3 = 15.94 | f4 = 25.70 |

Numerical Example 7

Unit: mm

Surface data

| Surface no. | r | d | nd | vd |
|---|---|---|---|---|
| object plane | ∞ | ∞ | | |
| 1 | 32.493 | 1.00 | 1.94595 | 17.98 |
| 2 | 24.819 | 3.71 | 1.81600 | 46.62 |
| 3 | 183.549 | Variable | | |
| 4 | 63.282 | 1.00 | 1.88300 | 40.76 |
| 5 | 8.498 | 5.04 | | |
| 6* | −36.519 | 0.80 | 1.58313 | 59.38 |
| 7* | 15.608 | 1.32 | | |
| 8 | 23.651 | 2.08 | 2.00069 | 25.46 |
| 9 | −188.878 | Variable | | |
| 10(Stop) | ∞ | 0.50 | | |
| 11* | 11.952 | 2.24 | 1.69350 | 53.21 |
| 12* | −84.433 | 0.00 | | |
| 13 | ∞ | 0.10 | | |
| 14 | 9.560 | 2.44 | 1.77250 | 49.60 |
| 15 | 17.376 | 0.70 | 1.74000 | 28.30 |
| 16 | 6.253 | 1.97 | | |
| 17 | −40.030 | 0.70 | 1.69895 | 30.13 |
| 18 | 12.750 | 2.61 | 1.49700 | 81.61 |
| 19* | −10.553 | Variable | | |
| 20* | 11.804 | 2.55 | 1.49700 | 81.54 |
| 21 | 71.445 | Variable | | |
| 22 | ∞ | 0.50 | 1.54771 | 62.84 |
| 23 | ∞ | 0.50 | | |
| 24 | ∞ | 0.50 | 1.51633 | 64.14 |
| 25 | ∞ | 1.03 | | |
| Image plane (Light receiving surface) | ∞ | | | |

Aspherical surface data

6th surface k = 0.000
A4 = 3.88874e−05, A6 = −1.28328e−06, A8 = 3.13845e−09,
A10 = −8.86196e−11

7th surface k = 0.000
A4 = −7.29768e−05, A6 = −1.42649e−06, A8 = −9.39329e−09,
A10 = 1.05903e−10

11th surface k = 0.000
A4 = −2.87417e−05, A6 = −3.33033e−07, A8 = −3.40624e−09

12th surface k = 0.000
A4 = 9.32699e−05, A6 = −2.78366e−07

19th surface k = 0.000
A4 = 7.48009e−06, A6 = 1.98580e−07, A8 = −8.10780e−08

20th surface k = 0.000
A4 = −2.49722e−05, A6 = −7.43539e−09

Zoom data(∞)

| | WE | ST1 | TE | ST2 | ST3 |
|---|---|---|---|---|---|
| Focal length | 6.07 | 12.73 | 23.52 | 8.24 | 18.77 |
| Fno. | 1.85 | 2.18 | 2.54 | 1.97 | 2.38 |
| Angle of field 2ω | 78.46 | 40.01 | 21.91 | 59.80 | 27.51 |
| fb (in air) | 6.52 | 8.31 | 7.47 | 7.27 | 8.49 |
| Total length (in air) | 60.45 | 57.63 | 65.64 | 57.23 | 61.93 |
| d3 | 0.30 | 7.57 | 16.03 | 2.83 | 12.94 |
| d9 | 21.11 | 6.31 | 1.09 | 13.62 | 2.35 |
| d19 | 3.77 | 6.69 | 12.30 | 4.76 | 9.41 |
| d21 | 4.34 | 6.13 | 5.29 | 5.08 | 6.31 |

Unit focal length

| | | | |
|---|---|---|---|
| f1 = 50.52 | f2 = −11.66 | f3 = 15.93 | f4 = 28.05 |

Numerical Example 8

Unit: mm

Surface data

| Surface no. | r | d | nd | vd |
|---|---|---|---|---|
| object plane | ∞ | ∞ | | |
| 1 | 32.650 | 1.00 | 1.94595 | 17.98 |
| 2 | 25.397 | 3.62 | 1.81600 | 46.62 |
| 3 | 179.536 | Variable | | |
| 4 | 69.450 | 1.00 | 1.88300 | 40.76 |
| 5 | 8.584 | 3.91 | | |
| 6* | 151.215 | 0.80 | 1.58313 | 59.38 |
| 7* | 13.194 | 2.66 | | |
| 8 | 25.436 | 1.65 | 1.92286 | 20.88 |
| 9 | 272.152 | Variable | | |
| 10(Stop) | ∞ | 0.50 | | |
| 11* | 13.592 | 2.27 | 1.74320 | 49.34 |
| 12* | −48.258 | 0.00 | | |
| 13 | ∞ | 0.10 | | |
| 14 | 6.860 | 2.68 | 1.49700 | 81.54 |
| 15 | 17.551 | 0.59 | 1.75520 | 27.51 |
| 16 | 5.593 | 1.95 | | |
| 17 | −20.066 | 0.60 | 1.92286 | 20.88 |
| 18 | −80.822 | 2.00 | 1.58313 | 59.38 |
| 19* | −10.406 | Variable | | |
| 20* | 11.944 | 2.62 | 1.49700 | 81.54 |
| 21 | 84.174 | Variable | | |
| 22 | ∞ | 0.50 | 1.54771 | 62.84 |
| 23 | ∞ | 0.50 | | |
| 24 | ∞ | 0.50 | 1.51633 | 64.14 |
| 25 | ∞ | 1.02 | | |
| Image plane (Light receiving surface) | ∞ | | | |

Aspherical surface data

6th surface k = 0.000
A4 = −4.47230e−04, A6 = 1.02657e−05, A8 = −1.53720e−07,
A10 = 7.29943e−10

-continued

Unit: mm

7th surface k = 0.000
A4 = −6.03831e−04, A6 = 1.14883e−05, A8 = −2.01411e−07,
A10 = 1.19791e−09
11th surface k = 0.000
A4 = −1.43577e−05, A6 = −5.53403e−07, A8 = −8.85897e−09
12th surface k = 0.000
A4 = 8.95102e−05, A6 = −1.03207e−06
19th surface k = 0.000
A4 = 8.70021e−05, A6 = 3.84489e−07, A8 = −1.40489e−08
20th surface k = 0.000
A4 = −2.65103e−06, A6 = 1.62547e−07

Zoom data(∞)

|  | WE | ST1 | TE | ST2 | ST3 |
|---|---|---|---|---|---|
| Focal length | 6.07 | 12.74 | 23.52 | 8.22 | 18.78 |
| Fno. | 1.85 | 2.18 | 2.61 | 1.96 | 2.43 |
| Angle of field 2ω | 77.96 | 39.69 | 21.78 | 59.32 | 27.42 |
| fb (in air) | 5.69 | 7.68 | 6.44 | 6.64 | 7.85 |
| Total length (in air) | 59.96 | 57.05 | 65.23 | 56.76 | 61.05 |
| D3 | 0.63 | 7.89 | 15.90 | 3.36 | 12.57 |
| D9 | 21.10 | 6.33 | 1.39 | 13.62 | 2.26 |
| D19 | 4.58 | 7.19 | 13.55 | 5.18 | 10.42 |
| D21 | 3.51 | 5.51 | 4.26 | 4.47 | 5.68 |

Unit focal length

| f1 = 50.84 | f2 = −11.43 | f3 = 15.48 | f4 = 27.67 |
|---|---|---|---|

Numerical Example 9

Unit: mm

Surface data

| Surface no. | r | d | nd | νd |
|---|---|---|---|---|
| object plane | ∞ | ∞ | | |
| 1 | 31.634 | 1.00 | 1.94595 | 17.98 |
| 2 | 24.337 | 3.70 | 1.81600 | 46.62 |
| 3 | 169.931 | Variable | | |
| 4 | 71.400 | 1.00 | 1.88300 | 40.76 |
| 5 | 8.713 | 4.86 | | |
| 6* | −49.021 | 0.80 | 1.58313 | 59.38 |
| 7* | 13.893 | 1.48 | | |
| 8 | 22.967 | 2.10 | 2.00069 | 25.46 |
| 9 | −221.415 | Variable | | |
| 10(Stop) | ∞ | 0.50 | | |
| 11* | 12.253 | 2.10 | 1.74320 | 49.34 |
| 12* | −277.973 | 0.00 | | |
| 13 | ∞ | 0.10 | | |
| 14 | 8.188 | 2.34 | 1.64000 | 60.08 |
| 15 | 17.842 | 0.70 | 1.74000 | 28.30 |
| 16 | 6.012 | 2.18 | | |
| 17 | −38.264 | 0.70 | 1.72825 | 28.46 |
| 18 | 12.558 | 2.56 | 1.58313 | 59.38 |
| 19* | −12.311 | Variable | | |
| 20* | 11.747 | 2.67 | 1.49700 | 81.54 |
| 21 | 95.158 | Variable | | |
| 22 | ∞ | 0.50 | 1.54771 | 62.84 |
| 23 | ∞ | 0.50 | | |

-continued

Unit: mm

| 24 | ∞ | 0.50 | 1.51633 | 64.14 |
|---|---|---|---|---|
| 25 | ∞ | 0.97 | | |
| Image plane (Light receiving surface) | ∞ | | | |

Aspherical surface data

6th surface k −= 0.000
A4 = 1.25719e−05, A6 = −1.15184e−06, A8 = 1.25233e−08,
A10 = −1.37009e−10
7th surface k = 0.000
A4 = −1.19585e−04, A6 = −1.40665e−06, A8 = 5.70135e−09,
A10 = −5.59580e−11
11th surface k = 0.000
A4 = 5.20165e−06, A6 = −4.97308e−07, A8 = −2.78846e−09
12th surface k = 0.000
A4 = 1.03347e−04, A6 = −6.492506e−07
19th surface k = 0.000
A4 = 3.38150e−05, A6 = −4.08974e−07, A8 = 9.72395e−10
20th surface k = 0.000
A4 = −2.09352e−05, A6 = 5.82527e−08

Zoom data(∞)

|  | WE | ST1 | TE | ST2 | ST3 |
|---|---|---|---|---|---|
| Focal length | 6.05 | 12.70 | 23.47 | 8.22 | 18.74 |
| Fno. | 1.85 | 2.18 | 2.56 | 1.97 | 2.38 |
| Angle of field 2ω | 78.42 | 40.23 | 21.95 | 59.92 | 27.65 |
| fb (in air) | 6.65 | 8.19 | 6.85 | 7.35 | 8.18 |
| Total length (in air) | 60.21 | 56.86 | 65.13 | 56.77 | 61.17 |
| d3 | 0.30 | 7.24 | 15.77 | 2.81 | 12.60 |
| d9 | 21.11 | 5.99 | 1.08 | 13.46 | 2.06 |
| d19 | 3.36 | 6.66 | 12.64 | 4.37 | 9.55 |
| d21 | 4.53 | 6.06 | 4.73 | 5.22 | 6.06 |

Unit focal length

| f1 = 49.61 | f2 = −11.93 | f3 = 16.15 | f4 = 26.68 |
|---|---|---|---|

Numerical Example 10

Unit: mm

Surface data

| Surface no. | r | d | nd | νd |
|---|---|---|---|---|
| object plane | ∞ | ∞ | | |
| 1 | 31.866 | 1.00 | 1.94595 | 17.98 |
| 2 | 24.559 | 3.71 | 1.81600 | 46.62 |
| 3 | 174.804 | Variable | | |
| 4 | 60.047 | 1.00 | 1.88300 | 40.76 |
| 5 | 8.506 | 5.02 | | |
| 6* | −37.235 | 0.80 | 1.58313 | 59.38 |
| 7* | 14.856 | 1.33 | | |

-continued

Unit: mm

| | | | | |
|---|---|---|---|---|
| 8 | 23.081 | 2.10 | 2.00069 | 25.46 |
| 9 | −193.679 | Variable | | |
| 10(Stop) | ∞ | 0.50 | | |
| 11* | 12.728 | 2.10 | 1.74320 | 49.34 |
| 12* | −166.062 | 0.00 | | |
| 13 | ∞ | 0.10 | | |
| 14 | 8.533 | 2.26 | 1.64000 | 60.08 |
| 15 | 18.398 | 0.70 | 1.72825 | 28.46 |
| 16 | 6.251 | 2.21 | | |
| 17 | −39.806 | 0.70 | 1.68893 | 31.07 |
| 18 | 14.820 | 2.58 | 1.49700 | 81.54 |
| 19* | −10.625 | Variable | | |
| 20* | 11.681 | 2.50 | 1.49700 | 81.61 |
| 21 | 65.043 | Variable | | |
| 22 | ∞ | 0.50 | 1.54771 | 62.84 |
| 23 | ∞ | 0.50 | | |
| 24 | ∞ | 0.50 | 1.51633 | 64.14 |
| 25 | ∞ | 1.01 | | |
| Image plane (Light receiving surface) | ∞ | | | |

Aspherical surface data

6th surface k = 0.000
A4 = 1.39775e−05, A6 = −5.89083e−07, A8 = −3.00001e−09,
A10 = −4.86913e−11

7th surface k = 0.000
A4 = −9.60358e−05, A6 = −8.97426e−07, A8 = −1.12664e−08,
A10 = 9.31137e−11

11th surface k = 0.000
A4 = 5.78306e−07, A6 = −2.26619e−07, A8 = −3.05673e−09

12th surface k = 0.000
A4 = 1.03740e−04, A6 = −2.68617e−07

19th surface k = 0.000
A4 = 1.30548e−05, A6 = −2.48736e−08, A8 = −5.88997e−08

20th surface k = 0.000
A4 = −3.17374e−05, A6 = −8.92951e−08

Zoom data(∞)

| | WE | ST1 | TE | ST2 | ST3 |
|---|---|---|---|---|---|
| Focal length | 6.07 | 12.74 | 23.52 | 8.23 | 18.77 |
| Fno. | 1.85 | 2.18 | 2.53 | 1.98 | 2.37 |
| Angle of field 2ω | 77.93 | 39.75 | 21.81 | 59.39 | 7.33 |
| fb (in air) | 7.34 | 8.95 | 8.21 | 7.94 | 9.06 |
| Total length (in air) | 60.48 | 58.01 | 65.81 | 57.81 | 62.31 |
| d3 | 0.30 | 7.65 | 15.93 | 3.02 | 13.00 |
| d9 | 21.11 | 6.47 | 1.10 | 13.93 | 2.52 |
| d19 | 3.12 | 6.34 | 11.96 | 4.32 | 9.12 |
| d21 | 5.19 | 6.79 | 6.04 | 5.78 | 6.90 |

Unit focal length

| f1 = 49.72 | f2 = −11.70 | f3 = 16.42 | f4 = 28.21 |
|---|---|---|---|

Numerical Example 11

Unit: mm

Surface data

| Surface no. | r | d | nd | νd |
|---|---|---|---|---|
| object plane | ∞ | ∞ | | |
| 1 | 32.422 | 1.00 | 1.94595 | 17.98 |
| 2 | 24.982 | 3.65 | 1.81600 | 46.62 |
| 3 | 173.616 | Variable | | |
| 4 | 85.877 | 1.00 | 1.88300 | 40.76 |
| 5 | 8.673 | 3.97 | | |
| 6* | 307.488 | 0.80 | 1.58313 | 59.38 |
| 7* | 14.178 | 2.64 | | |
| 8 | 24.905 | 1.63 | 1.92286 | 20.88 |
| 9 | 243.771 | Variable | | |
| 10(Stop) | ∞ | 0.50 | | |
| 11* | 14.962 | 2.07 | 1.85135 | 40.10 |
| 12* | −65.687 | 0.00 | | |
| 13 | ∞ | 0.10 | | |
| 14 | 6.929 | 2.69 | 1.49700 | 81.54 |
| 15 | 18.683 | 0.59 | 1.80518 | 25.42 |
| 16 | 5.804 | 1.78 | | |
| 17 | −22.605 | 0.73 | 1.92286 | 20.88 |
| 18 | −1284.735 | 2.24 | 1.58313 | 59.38 |
| 19* | −10.215 | Variable | | |
| 20* | 11.801 | 2.62 | 1.49700 | 81.54 |
| 21 | 107.003 | Variable | | |
| 22 | ∞ | 0.50 | 1.54771 | 62.84 |
| 23 | ∞ | 0.50 | | |
| 24 | ∞ | 0.50 | 1.51633 | 64.14 |
| 25 | ∞ | 1.01 | | |
| Image plane (Light receiving surface) | ∞ | | | |

Aspherical surface data

6th surface k = 0.000
A4 = −1.59918e−04, A6 = 2.84008e−06, A8 = −4.46572e−08,
A10 = 8.52526e−11

7th surface k = 0.000
A4 = −3.00603e−04, A6 = 2.98377e−06, A8 = −7.14642e−08,
A10 = 3.51419e−10

11th surface k = 0.000
A4 = 3.05204e−06, A6 = −4.79667e−07, A8 = −5.23699e−09

12th surface k = 0.000
A4 = 8.81792e−05, A6 = −7.55380e−07

19th surface k = 0.000
A4 = 6.29657e−05, A6 = 1.43686e−07, A8 = −3.38587e−08

20th surface k = 0.000
A4 = −1.25621e−05, A6 = 3.85445e−07, A8 = −5.46258e−09

Zoom data(∞)

| | WE | ST1 | TE | ST2 | ST3 |
|---|---|---|---|---|---|
| Focal length | 6.07 | 12.73 | 23.51 | 8.23 | 18.78 |
| Fno. | 1.85 | 2.16 | 2.59 | 1.95 | 2.40 |
| Angle of field 2ω | 77.94 | 39.81 | 21.79 | 59.38 | 27.49 |
| fb (in air) | 5.66 | 7.68 | 6.42 | 6.68 | 7.92 |
| Total length (in air) | 60.51 | 57.37 | 65.78 | 57.07 | 61.41 |
| d3 | 0.71 | 7.96 | 16.17 | 3.45 | 12.76 |
| d9 | 21.11 | 6.03 | 1.20 | 13.39 | 1.91 |

-continued

| Unit: mm | | | | | |
|---|---|---|---|---|---|
| d19 | 5.03 | 7.70 | 13.98 | 5.54 | 10.81 |
| d21 | 3.50 | 5.51 | 4.26 | 4.52 | 5.76 |

| Unit focal length | | | |
|---|---|---|---|
| f1 = 50.89 | f2 = −11.52 | f3 = 15.72 | f4 = 26.44 |

Values in each embodiment are showed as below.

| Example 1 | Example 2 | Example 3 | Example 4 | Example 5 | Example 6 |
|---|---|---|---|---|---|
| Zoom ratio | | | | | |
| 3.88 | 3.88 | 3.88 | 3.88 | 3.88 | 3.88 |
| Total length at wide angle end | | | | | |
| 60.49 | 59.89 | 61.42 | 60.03 | 60.06 | 60.37 |
| Total length at telephoto end | | | | | |
| 65.85 | 68.50 | 70.68 | 68.76 | 65.90 | 65.71 |
| Back focus at wide angle end | | | | | |
| 7.33 | 5.41 | 5.67 | 5.65 | 5.81 | 5.84 |
| Back focus at telephoto end | | | | | |
| 8.27 | 7.15 | 7.18 | 7.20 | 6.15 | 6.44 |
| Focal length of first lens unit | | | | | |
| 50.47 | 49.36 | 55.03 | 54.55 | 50.57 | 50.70 |
| Focal length of second lens unit | | | | | |
| −11.67 | −10.76 | −11.03 | −11.10 | −11.30 | −11.72 |
| Focal length of third lens unit | | | | | |
| 16.15 | 15.93 | 15.85 | 15.67 | 15.49 | 15.94 |
| Focal length of fourth lens unit | | | | | |
| 29.71 | 24.31 | 26.32 | 26.48 | 27.59 | 25.70 |

| Example 7 | Example 8 | Example 9 | Example 10 | Example 11 |
|---|---|---|---|---|
| Zoom ratio | | | | |
| 3.88 | 3.88 | 3.88 | 3.89 | 3.88 |
| Total length at wide angle end | | | | |
| 60.45 | 59.96 | 60.21 | 60.48 | 60.51 |
| Total length at telephoto end | | | | |
| 65.64 | 65.23 | 65.13 | 65.81 | 65.78 |
| Back focus at wide angle end | | | | |
| 6.52 | 5.69 | 6.65 | 7.34 | 5.66 |
| Back focus at telephoto end | | | | |
| 7.47 | 6.44 | 6.85 | 8.21 | 6.42 |
| Focal length of first lens unit | | | | |
| 50.52 | 50.84 | 49.61 | 49.72 | 50.89 |
| Focal length of second lens unit | | | | |
| −11.66 | −11.43 | −11.93 | −11.70 | −11.52 |
| Focal length of third lens unit | | | | |
| 15.93 | 15.48 | 16.15 | 16.42 | 15.72 |
| Focal length of fourth lens unit | | | | |
| 28.05 | 27.67 | 26.68 | 28.21 | 26.44 |

Here, regarding the total length at wide angle end, the total length at telephoto end, the back focus at wide angle end and the back focus at telephoto end, these values are expressed in consideration of thickness of a filter which is expressed upon air conversion of a distance.

Aberration diagrams at the time of infinite object point focusing in the embodiments from the first embodiment to the eleventh embodiment described above are shown in diagrams from FIG. 12A to FIG. 22C. In these aberration diagrams, FIG. 12A, FIG. 13A, FIG. 14A, FIG. 15A, FIG. 16A, FIG. 17A, FIG. 18A, FIG. 19A, FIG. 20A, FIG. 21A, and FIG. 22A show a spherical aberration (SA), an astigmatism (AS), a distortion, (DT), and a chromatic aberration of magnification (CC) at the wide angle end, FIG. 12B, FIG. 13B, FIG. 14B, FIG. 15B, FIG. 16B, FIG. 17B, FIG. 18B, FIG. 19B, FIG. 20B, FIG. 21B, and FIG. 22B show a spherical aberration (SA), an astigmatism (AS), a distortion (DT), and a chromatic aberration of magnification (CC) in an intermediate focal length state, and FIG. 12C, FIG. 13C, FIG. 14C, FIG. 15C, FIG. 16C, FIG. 17C, FIG. 18C, FIG. 19C, FIG. 20C, FIG. 21C, and FIG. 22C show a spherical aberration (SA), an astigmatism (AS), a distortion (DT), and a chromatic aberration of magnification (CC) at the telephoto end. In these diagrams, 'ω' denotes a half angle of field.

Values of conditional expressions (1)-(20) in each embodiment are shown below:

Conditional expression (1) $SF_{3n}$
Conditional expression (2) $vd_3$
Conditional expression (3) $D_3/f_3$
Conditional expression (4) $UY_{1G}/f_w$
Conditional expression (5) $UY_{3G}/f_3$
Conditional expression (6) $UY_{3G}/f_w$
Conditional expression (7) $f_1/f_w$
Conditional expression (8) $|f_2/f_w|$
Conditional expression (9) $(\beta_{2t}/\beta_{2w}) \times (\beta_{3t}/\beta_{3w}) \times (N_t/N_w)$
Conditional expression (10) $f_3/f_w$
Conditional expression (11) $f_4/f_w$
Conditional expression (12) $L_w/f_w$
Conditional expression (13) $(\beta_{2t}/\beta_{2w})/(\beta_{3t}/\beta_{3w})$
Conditional expression (14) $\beta_{2t}/\beta_{2w}$
Conditional expression (15) $\beta_{3t}/\beta_{3w}$
Conditional expression (16) $\beta_{4t}/\beta_{4w}$
Conditional expression (17) $D_{2w}/f_w$
Conditional expression (18) $\Delta 3G/f_w$
Conditional expression (19) $IH/f_w$
Conditional expression (20) $D_{2w}/L_{11r}$

| | Example 1 | Example 2 | Example 3 | Example 4 | Example 5 | Example 6 |
|---|---|---|---|---|---|---|
| Conditional expression (1) | | | | | | |
| | −0.73 | −0.75 | −0.73 | −0.70 | −0.65 | −0.67 |
| Conditional expression (2) | | | | | | |
| | 61.03 | 66.21 | 64.46 | 62.63 | 111.79 | 87.99 |
| Conditional expression (3) | | | | | | |
| | 0.11 | 0.10 | 0.12 | 0.12 | 0.13 | 0.11 |
| Conditional expression (4) | | | | | | |
| | 0.27 | 0.27 | 0.27 | 0.27 | 0.27 | 0.27 |
| Conditional expression (5) | | | | | | |
| | 0.29 | 0.29 | 0.30 | 0.31 | 0.31 | 0.30 |
| Conditional expression (6) | | | | | | |
| | 0.78 | 0.77 | 0.80 | 0.80 | 0.80 | 0.78 |
| Conditional expression (7) | | | | | | |
| | 8.33 | 8.15 | 9.08 | 9.00 | 8.35 | 8.35 |

-continued

| Conditional expression (8) | | | | | |
|---|---|---|---|---|---|
| 1.93 | 1.78 | 1.82 | 1.83 | 1.87 | 1.93 |
| Conditional expression (9) | | | | | |
| 3.88 | 3.88 | 3.88 | 3.88 | 3.88 | 3.88 |
| Conditional expression (10) | | | | | |
| 2.67 | 2.63 | 2.62 | 2.59 | 2.56 | 2.63 |
| Conditional expression (11) | | | | | |
| 4.90 | 4.01 | 4.34 | 4.37 | 4.56 | 4.24 |
| Conditional expression (12) | | | | | |
| 9.66 | 9.42 | 9.77 | 9.55 | 9.63 | 9.60 |
| Conditional expression (13) | | | | | |
| 0.80 | 0.65 | 0.67 | 0.66 | 0.78 | 0.78 |
| Conditional expression (14) | | | | | |
| 1.80 | 1.68 | 1.68 | 1.67 | 1.75 | 1.77 |
| Conditional expression (15) | | | | | |
| 2.26 | 2.58 | 2.51 | 2.53 | 2.25 | 2.27 |
| Conditional expression (16) | | | | | |
| 0.95 | 0.89 | 0.92 | 0.92 | 0.98 | 0.97 |
| Conditional expression (17) | | | | | |
| 3.57 | 3.30 | 3.43 | 3.41 | 3.57 | 3.56 |
| Conditional expression (18) | | | | | |
| 1.59 | 2.08 | 1.95 | 1.93 | 1.62 | 1.62 |
| Conditional expression (19) | | | | | |
| 0.76 | 0.76 | 0.76 | 0.76 | 0.76 | 0.76 |
| Conditional expression (20) | | | | | |
| 0.67 | 0.58 | 0.55 | 0.55 | 0.67 | 0.67 |

| | Example 7 | Example 8 | Example 9 | Example 10 | Example 11 |
|---|---|---|---|---|---|
| Conditional expression (1) | | | | | |
| | −0.73 | −0.56 | −0.73 | −0.73 | −0.59 |
| Conditional expression (2) | | | | | |
| | 72.78 | 92.53 | 62.70 | 82.09 | 94.62 |
| Conditional expression (3) | | | | | |
| | 0.12 | 0.13 | 0.13 | 0.13 | 0.11 |
| Conditional expression (4) | | | | | |
| | 0.27 | 0.27 | 0.27 | 0.27 | 0.27 |
| Conditional expression (5) | | | | | |
| | 0.30 | 0.31 | 0.29 | 0.29 | 0.30 |
| Conditional expression (6) | | | | | |
| | 0.78 | 0.79 | 0.77 | 0.77 | 0.79 |
| Conditional expression (7) | | | | | |
| | 8.33 | 8.38 | 8.20 | 8.19 | 8.39 |
| Conditional expression (8) | | | | | |
| | 1.92 | 1.88 | 1.97 | 1.93 | 1.90 |
| Conditional expression (9) | | | | | |
| | 3.88 | 3.88 | 3.88 | 3.88 | 3.88 |
| Conditional expression (10) | | | | | |
| | 2.63 | 2.55 | 2.67 | 2.71 | 2.59 |
| Conditional expression (11) | | | | | |
| | 4.62 | 4.56 | 4.41 | 4.65 | 4.36 |
| Conditional expression (12) | | | | | |
| | 9.63 | 9.57 | 9.60 | 9.64 | 9.64 |
| Conditional expression (13) | | | | | |
| | 0.79 | 0.76 | 0.84 | 0.82 | 0.77 |
| Conditional expression (14) | | | | | |
| | 1.80 | 1.75 | 1.82 | 1.82 | 1.76 |
| Conditional expression (15) | | | | | |
| | 2.27 | 2.31 | 2.16 | 2.23 | 2.29 |
| Conditional expression (16) | | | | | |
| | 0.95 | 0.96 | 0.99 | 0.95 | 0.96 |
| Conditional expression (17) | | | | | |
| | 3.56 | 3.56 | 3.57 | 3.56 | 3.56 |
| Conditional expression (18) | | | | | |
| | 1.56 | 1.60 | 1.57 | 1.60 | 1.60 |
| Conditional expression (19) | | | | | |
| | 0.76 | 0.76 | 0.76 | 0.76 | 0.76 |
| Conditional expression (20) | | | | | |
| | 0.67 | 0.66 | 0.68 | 0.68 | 0.67 |

(Correction of Distortion)

Incidentally, when the zoom lens system of the present invention is used, a digital correction of distortion of an image is carried out electrically. A basic concept for the digital correction of the distortion of an image will be described below.

Figure 23:
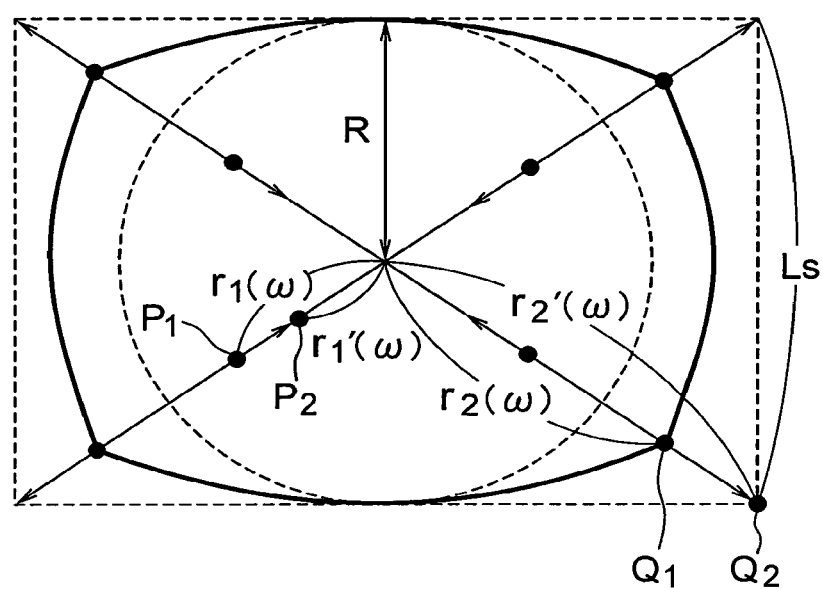
FIG. 23 is a diagram describing a correction of distortion.

For example, as shown in FIG. 23, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 23, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega) = \alpha \cdot f \cdot \tan \omega \, (0 \leq \alpha \leq 1)$$

where, $\omega$ is a half angle of field of an object and f is a focal length of an imaging optical system (the zoom lens system in the present invention).

Here, when an ideal image height corresponding to a circle (image height) of radius R is let to be Y, then $$\alpha = R/Y = R/(f \cdot \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half angle of field and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6Ls$$

where, Ls is a length of a short side of the effective image pickup surface.

It is preferable that the radius R satisfies the following conditional expression.

$$0.3Ls \leq R \leq 0.6Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \cdot \tan \omega$$

near a telephoto end in the focal point zones which are divided.

However, in this case, at a wide angle end in the focal point zones which are divided, a barrel-shape distortion at the wide angle end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \cdot \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half angle of field) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of ω becomes large.

(Digital Camera)

Figure 24:
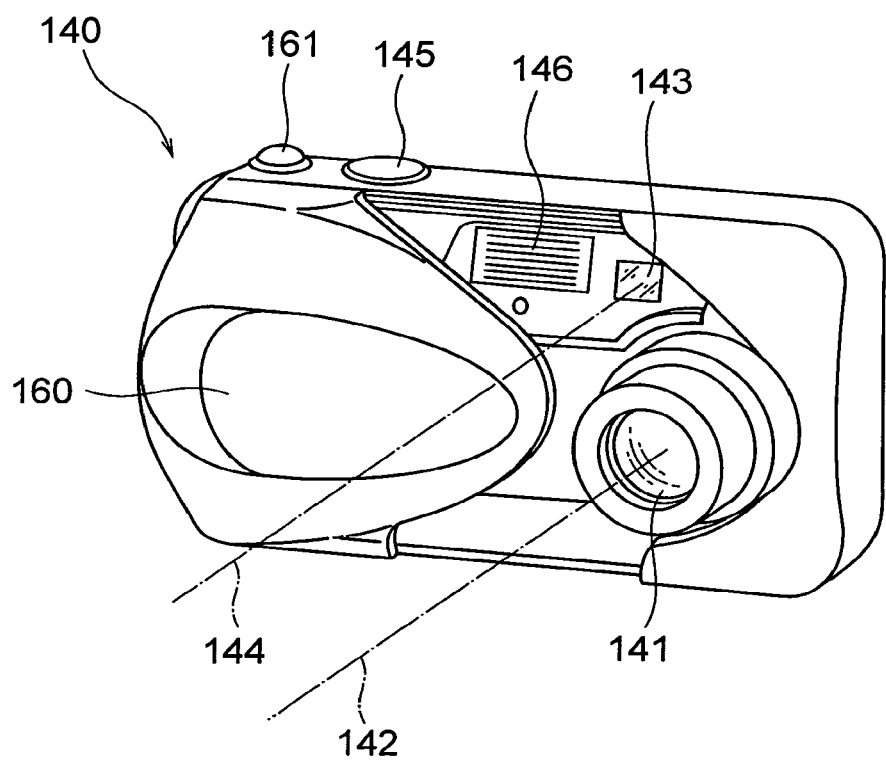
FIG. 24 is a front perspective view showing an appearance of a digital camera in which, a zoom lens system according to the present invention is incorporated.
Figure 25:
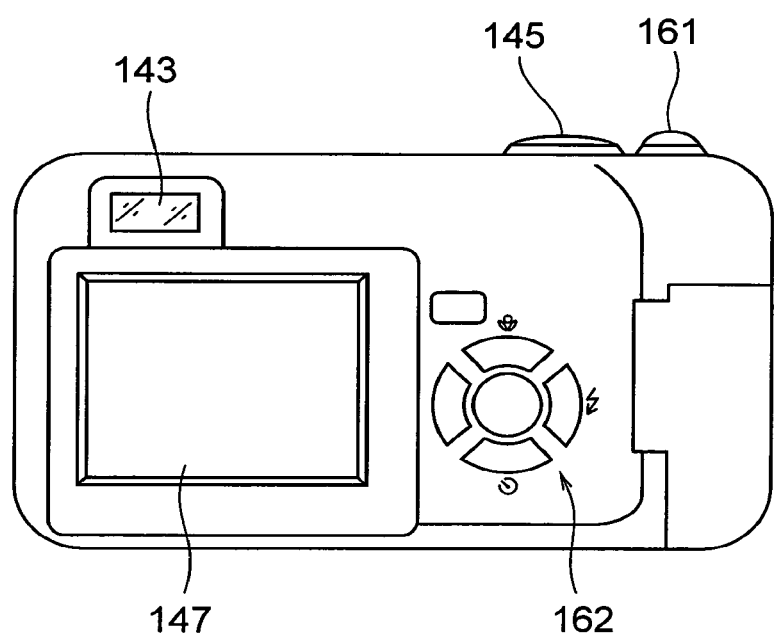
FIG. 25 is a rear perspective view of the digital camera.
Figure 26:
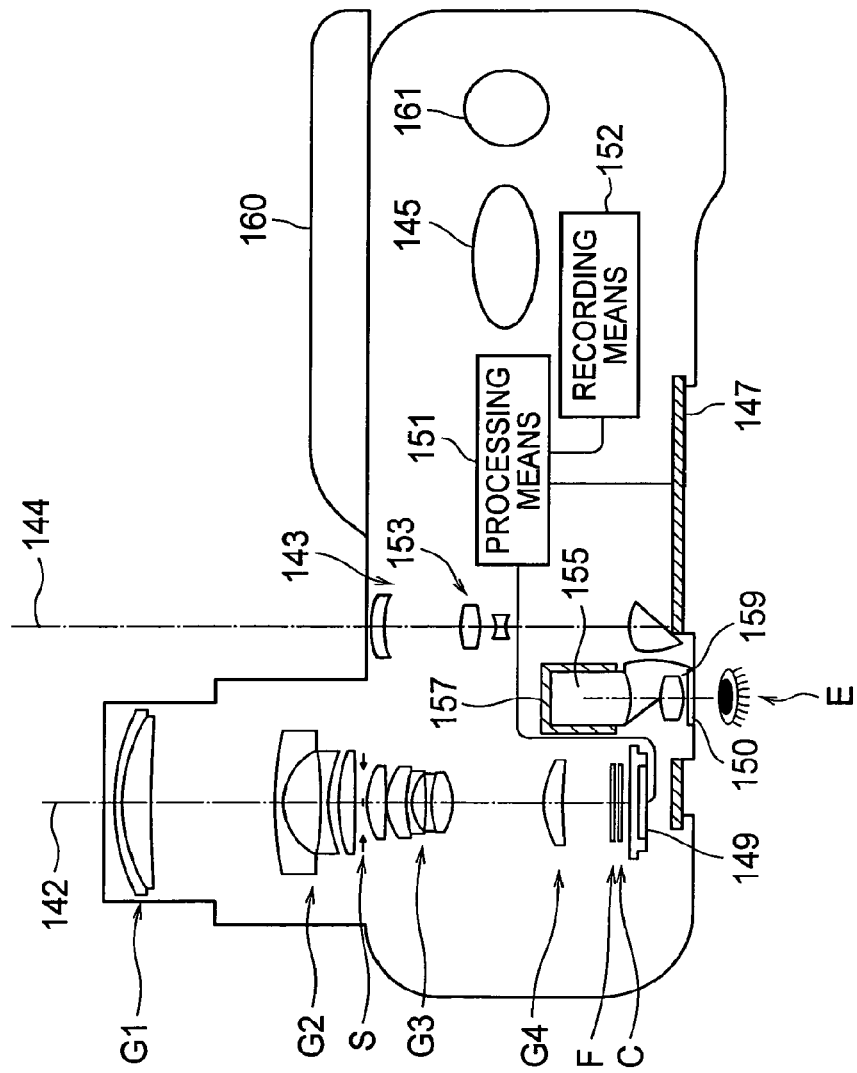
FIG. 26 is a cross-sectional view of the digital camera.

FIG. 24 to FIG. 26 are conceptual diagrams of a structure of a digital camera according to the present invention in which a zoom lens system described above is incorporated in a taking optical system 141. FIG. 24 is a front perspective view showing an appearance of a digital camera 140, FIG. 25 is a rear view of the same, and FIG. 26 is a schematic cross-sectional view showing a structure of the digital camera 140. In FIG. 24 and FIG. 26, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 26, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle of field.

(Internal Circuit Structure)

FIG. 27 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 27, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As it has been described above, the present invention is useful for a zoom lens system in which, it is easy to have a favorable image forming performance while securing an angle of field, a zooming ratio, and an F value.

According to the present invention, it is possible to provide a zoom lens system in which, it is easy to have a favorable image forming performance while securing the angle of field, the zooming ratio, and the F value.

Furthermore, it is possible to provide an image pickup apparatus which includes such zoom lens system.

What is claimed is:

1. A zoom lens system comprising, in order from an object side to an image side:
   a first lens unit having a positive refracting power;
   a second lens unit having a negative refracting power;
   a third lens unit having a positive refracting power; and
   a fourth lens unit having a positive refracting power, wherein
   at the time of zooming from a wide angle end to a telephoto end, each of distances between the first lens unit and the second lens unit, between the second lens unit and the third lens unit, and between the third lens unit and the fourth lens unit is changed,
   the first lens unit comprises a lens component having a positive refracting power,
   a total number of lens components included in the first lens unit is one,
   the third lens unit comprises five lens elements,
   the third lens unit comprises, in order from the object side to the image side, a first positive lens element, a second positive lens element, a first negative lens element, a second negative lens element, and a third positive lens element,
   wherein the third lens unit satisfies the following expression:

$2.0 < f_3/f_w < 3.0$ where,
   $f_3$ denotes a focal length of the third lens unit, and
   $f_w$ denotes a focal length of an overall zoom lens system at the wide angle end.

2. The zooming lens system according to claim 1, wherein the lens component in the first lens unit is a cemented lens component including a positive lens element and a negative lens element.

3. The zooming lens system according to claim 1, wherein the second lens unit comprises an aspherical lens element, and the second lens unit comprises, in order from the object side to the image side, a first negative lens element, a second negative lens element, and a first positive lens element.

4. The zooming lens system according to claim 3, wherein the second negative lens element in the second lens unit is a bi-concave negative lens element.

5. The zooming lens system according to claim 3, wherein the second negative lens element in the second lens unit is the aspherical lens element.

6. The zooming lens system according to claim 3, wherein the aspherical lens element in the second lens unit is a negative lens element having an aspheric object-side surface and an aspheric image-side surface.

7. The zooming lens system according to claim 1, wherein the first positive lens element in the third lens unit is an aspherical lens element.

8. The zooming lens system according to claim 7, wherein the second positive lens element and the first negative lens element in the third lens unit are cemented each other.

9. The zooming lens system according to claim 1, wherein the second positive lens element and the first negative lens element in the third lens unit are cemented each other.

10. The zooming lens system according to claim 1, wherein the first positive lens element in the third lens unit has an aspheric object-side surface and an aspheric image-side surface.

11. The zooming lens system according to claim 1, wherein the first positive lens element in the third lens unit is an aspherical positive lens element having a convex object-side surface directed toward the object side,
    the second positive lens element in the third lens unit is a positive lens element having a convex object-side surface directed toward the object side,
    the third positive lens element in the third lens unit is a bi-convex positive lens element, and
    the second positive lens element and the first negative lens element in the third lens unit are cemented each other.

12. The zooming lens system according to claim 1, wherein the fourth lens unit is a focusing lens unit.

13. The zooming lens system according to claim 1, wherein the fourth lens unit includes a positive meniscus lens and the positive meniscus lens in the fourth lens unit has an aspheric surface.

14. The zoom lens system according to claim 1, wherein the zoom lens system satisfies the following conditional expressions $3.5 < (\beta_{2t}/\beta_{2w}) \times (\beta_{3t}/\beta_{3w}) \times (\beta_{4t}/\beta_{4w}) < 5.0$ $0.26 < UY_{1G}/f_w < 0.28$ where,
$\beta_{2w}$ and $\beta_{2t}$ denote a lateral magnification of the second lens unit, at the wide angle end and the telephoto end, respectively,
$\beta_{3w}$ and $\beta_{3t}$ denote a lateral magnification of the third lens unit, at the wide angle end and the telephoto end, respectively,
$\beta_{4w}$ and $\beta_{4t}$ denote a lateral magnification of the fourth lens unit, at the wide angle end and the telephoto end, respectively,
$f_w$ denotes the focal length of the overall zoom lens system at the wide angle end, and
$UY_{1G}$ denotes a height from an optical axis of axial marginal light rays at a surface on an object side of the first lens unit, at the wide angle end.

15. An image pickup apparatus comprising:
    a zoom lens system according to claim 1; and
    an image pickup element, which is disposed on an image side of the zoom lens system, and which converts an image formed by the zoom lens system, to an electric signal.

16. The zooming lens system according to claim 1, wherein the fourth lens unit includes a positive meniscus lens having a convex surface directed toward the object side, and a total number of lenses included in the fourth lens unit is one.

* * * * *